(12) United States Patent
Outhred et al.

(10) Patent No.: US 7,886,041 B2
(45) Date of Patent: Feb. 8, 2011

(54) DESIGN TIME VALIDATION OF SYSTEMS

(75) Inventors: Geoffrey Outhred, Seattle, WA (US); Kevin Grealish, Seattle, WA (US); Rob Mensching, Redmond, WA (US); Bassam Tabbara, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1394 days.

(21) Appl. No.: 10/791,222

(22) Filed: Mar. 1, 2004

(65) Prior Publication Data

US 2004/0193388 A1 Sep. 30, 2004

Related U.S. Application Data

(63) Continuation-in-part of application No. 10/693,838, filed on Oct. 24, 2003.

(60) Provisional application No. 60/452,736, filed on Mar. 6, 2003.

(51) Int. Cl.
*G06F 9/44* (2006.01)

(52) U.S. Cl. .................... 709/224; 717/104; 703/21; 703/22

(58) Field of Classification Search ............... 709/223, 709/220, 242; 703/21, 22; 717/104, 135, 717/108
See application file for complete search history.

(56) References Cited

U.S. PATENT DOCUMENTS

| | | | |
|---|---|---|---|
| 4,200,770 A | 4/1980 | Hellman et al. | |
| 4,218,582 A | 8/1980 | Hellman et al. | |
| 4,405,829 A | 9/1983 | Rivest et al. | |
| 4,424,414 A | 1/1984 | Hellman et al. | |
| 5,031,089 A | 7/1991 | Liu et al. | |
| 5,220,621 A | 6/1993 | Saitoh | |
| 5,430,810 A | 7/1995 | Saeki | |
| 5,490,276 A | 2/1996 | Doli, Jr. et al. | |
| 5,495,610 A | 2/1996 | Shing et al. | |
| 5,499,357 A | 3/1996 | Sonty et al. | |
| 5,504,921 A | 4/1996 | Dev et al. | |
| 5,557,774 A * | 9/1996 | Shimabukuro et al. | 703/21 |
| 5,579,482 A | 11/1996 | Einkauf et al. | |
| 5,668,995 A | 9/1997 | Bhat | |
| 5,686,940 A | 11/1997 | Kuga | |
| 5,724,508 A | 3/1998 | Harple, Jr. et al. | |

(Continued)

FOREIGN PATENT DOCUMENTS

CN 1368694 9/2002

(Continued)

OTHER PUBLICATIONS

Chen, et al., "Performance Prediction of Component-based Applications", Journal of Systems and Software, vol. 74, Issue 1, Jan. 2005, pp. 1-12.

(Continued)

*Primary Examiner*—Kevin Bates
(74) *Attorney, Agent, or Firm*—Lee & Hayes, PLLC

(57) ABSTRACT

In accordance with certain aspects of the design time validation of systems, a description of a system being designed and a description of an environment are received. Both of the received descriptions are used to validate the system against the environment while the system is being designed and prior to attempting to deploy the system.

11 Claims, 27 Drawing Sheets

U.S. PATENT DOCUMENTS

| | | | |
|---|---|---|---|
| 5,748,958 A | 5/1998 | Badovinatz | |
| 5,758,351 A | 5/1998 | Gibson et al. | |
| 5,768,271 A | 6/1998 | Seid et al. | |
| 5,774,689 A | 6/1998 | Curtis et al. | |
| 5,784,463 A | 7/1998 | Chen et al. | |
| 5,790,895 A | 8/1998 | Krontz et al. | |
| 5,818,937 A | 10/1998 | Watson et al. | |
| 5,822,531 A | 10/1998 | Gorczyca et al. | |
| 5,826,015 A | 10/1998 | Schmidt | |
| 5,845,124 A * | 12/1998 | Berman | 703/2 |
| 5,845,277 A | 12/1998 | Pfeil et al. | |
| 5,867,706 A | 2/1999 | Martin et al. | |
| 5,872,928 A | 2/1999 | Lewis et al. | |
| 5,878,220 A | 3/1999 | Olkin et al. | |
| 5,895,499 A | 4/1999 | Chu | |
| 5,905,728 A | 5/1999 | Han et al. | |
| 5,917,730 A | 6/1999 | Rittie et al. | |
| 5,920,705 A | 7/1999 | Lyon et al. | |
| 5,930,798 A | 7/1999 | Lawler et al. | |
| 5,958,009 A | 9/1999 | Friedrich et al. | |
| 5,968,126 A | 10/1999 | Ekstrom et al. | |
| 6,035,405 A | 3/2000 | Gage et al. | |
| 6,041,054 A | 3/2000 | Westberg | |
| 6,047,323 A | 4/2000 | Krause | |
| 6,049,528 A | 4/2000 | Hendel et al. | |
| 6,052,469 A | 4/2000 | Johnson et al. | |
| 6,059,842 A | 5/2000 | Dumarot et al. | |
| 6,065,058 A | 5/2000 | Hailpern et al. | |
| 6,075,776 A | 6/2000 | Tanimoto et al. | |
| 6,076,108 A | 6/2000 | Courts et al. | |
| 6,081,826 A | 6/2000 | Masuoka et al. | |
| 6,085,238 A | 7/2000 | Yuasa et al. | |
| 6,086,618 A | 7/2000 | Al-Hilali et al. | |
| 6,108,702 A | 8/2000 | Wood | |
| 6,112,243 A | 8/2000 | Downs et al. | |
| 6,115,393 A | 9/2000 | Engel et al. | |
| 6,118,785 A | 9/2000 | Araujo et al. | |
| 6,125,442 A | 9/2000 | Maves et al. | |
| 6,125,447 A | 9/2000 | Gong | |
| 6,134,594 A | 10/2000 | Helland et al. | |
| 6,147,995 A | 11/2000 | Dobbins et al. | |
| 6,151,688 A | 11/2000 | Wipfel et al. | |
| 6,167,052 A | 12/2000 | McNeill et al. | |
| 6,167,383 A | 12/2000 | Henson | |
| 6,178,529 B1 | 1/2001 | Short et al. | |
| 6,182,275 B1 | 1/2001 | Beelitz et al. | |
| 6,192,401 B1 | 2/2001 | Modiri et al. | |
| 6,195,091 B1 | 2/2001 | Harple et al. | |
| 6,195,355 B1 | 2/2001 | Demizu | |
| 6,208,345 B1 | 3/2001 | Sheard et al. | |
| 6,208,649 B1 | 3/2001 | Kloth | |
| 6,209,099 B1 | 3/2001 | Saunders | |
| 6,212,559 B1 | 4/2001 | Bixler et al. | |
| 6,226,788 B1 | 5/2001 | Schoening et al. | |
| 6,230,312 B1 | 5/2001 | Hunt | |
| 6,233,610 B1 | 5/2001 | Hayball et al. | |
| 6,236,365 B1 | 5/2001 | LeBlanc et al. | |
| 6,236,901 B1 | 5/2001 | Goss | |
| 6,237,020 B1 | 5/2001 | Leymann et al. | |
| 6,253,230 B1 | 6/2001 | Couland et al. | |
| 6,256,773 B1 | 7/2001 | Bowman-Amuah | |
| 6,263,089 B1 | 7/2001 | Otsuka et al. | |
| 6,266,707 B1 | 7/2001 | Boden et al. | |
| 6,269,076 B1 | 7/2001 | Shamir et al. | |
| 6,269,079 B1 | 7/2001 | Marin et al. | |
| 6,304,972 B1 | 10/2001 | Shavit | |
| 6,305,015 B1 | 10/2001 | Akriche et al. | |
| 6,308,174 B1 | 10/2001 | Hayball et al. | |
| 6,311,144 B1 * | 10/2001 | Abu El Ata | 703/2 |
| 6,311,270 B1 | 10/2001 | Challener et al. | |
| 6,330,605 B1 | 12/2001 | Christensen et al. | |
| 6,336,138 B1 | 1/2002 | Caswell et al. | |
| 6,338,112 B1 | 1/2002 | Wipfel et al. | |
| 6,351,685 B1 | 2/2002 | Dimitri et al. | |
| 6,353,806 B1 * | 3/2002 | Gehlot | 703/21 |
| 6,353,861 B1 | 3/2002 | Dolin, Jr. et al. | |
| 6,353,898 B1 | 3/2002 | Wipfel et al. | |
| 6,360,265 B1 | 3/2002 | Falck et al. | |
| 6,367,010 B1 | 4/2002 | Venkatram et al. | |
| 6,370,573 B1 | 4/2002 | Bowman-Amuah | |
| 6,370,584 B1 | 4/2002 | Bestavros et al. | |
| 6,377,996 B1 | 4/2002 | Lumelsky et al. | |
| 6,389,464 B1 | 5/2002 | Krishnamurthy et al. | |
| 6,393,386 B1 | 5/2002 | Zager et al. | |
| 6,393,456 B1 | 5/2002 | Ambler et al. | |
| 6,393,474 B1 | 5/2002 | Eichert et al. | |
| 6,393,485 B1 | 5/2002 | Chao et al. | |
| 6,408,390 B1 | 6/2002 | Saito | |
| 6,418,554 B1 | 7/2002 | Delo et al. | |
| 6,424,718 B1 | 7/2002 | Holloway | |
| 6,424,992 B2 | 7/2002 | Devarakonda et al. | |
| 6,427,163 B1 | 7/2002 | Arendt | |
| 6,427,171 B1 | 7/2002 | Craft et al. | |
| 6,434,598 B1 | 8/2002 | Gish | |
| 6,438,100 B1 | 8/2002 | Halpern et al. | |
| 6,442,557 B1 * | 8/2002 | Buteau et al. | 707/102 |
| 6,442,713 B1 | 8/2002 | Block et al. | |
| 6,449,650 B1 | 9/2002 | Westfall et al. | |
| 6,457,048 B2 | 9/2002 | Sondur et al. | |
| 6,463,536 B2 | 10/2002 | Saito | |
| 6,466,985 B1 | 10/2002 | Goyal et al. | |
| 6,470,025 B1 | 10/2002 | Wilson et al. | |
| 6,470,464 B2 | 10/2002 | Bertram et al. | |
| 6,473,791 B1 | 10/2002 | Al-Ghosein et al. | |
| 6,480,955 B1 | 11/2002 | DeKoning et al. | |
| 6,484,261 B1 | 11/2002 | Wiegel | |
| 6,502,131 B1 | 12/2002 | Vaid et al. | |
| 6,505,244 B1 | 1/2003 | Natarajan et al. | |
| 6,519,615 B1 | 2/2003 | Wollrath et al. | |
| 6,529,953 B1 | 3/2003 | Van Renesse | |
| 6,539,494 B1 | 3/2003 | Abramson et al. | |
| 6,546,423 B1 | 4/2003 | Dutta et al. | |
| 6,546,553 B1 | 4/2003 | Hunt | |
| 6,549,934 B1 | 4/2003 | Peterson et al. | |
| 6,564,261 B1 | 5/2003 | Gudjonsson et al. | |
| 6,570,847 B1 | 5/2003 | Hosein | |
| 6,570,875 B1 | 5/2003 | Hegde | |
| 6,574,195 B2 | 6/2003 | Roberts | |
| 6,584,499 B1 | 6/2003 | Jantz et al. | |
| 6,587,876 B1 | 7/2003 | Mahon et al. | |
| 6,597,956 B1 | 7/2003 | Aziz et al. | |
| 6,598,077 B2 | 7/2003 | Primak et al. | |
| 6,598,173 B1 | 7/2003 | Sheikh et al. | |
| 6,598,223 B1 | 7/2003 | Vrhel, Jr. et al. | |
| 6,601,101 B1 | 7/2003 | Lee et al. | |
| 6,601,233 B1 | 7/2003 | Underwood | |
| 6,606,708 B1 | 8/2003 | Devine et al. | |
| 6,609,148 B1 | 8/2003 | Salo et al. | |
| 6,609,213 B1 | 8/2003 | Nguyen et al. | |
| 6,611,522 B1 | 8/2003 | Zheng et al. | |
| 6,628,671 B1 | 9/2003 | Dynarski et al. | |
| 6,631,141 B1 | 10/2003 | Kumar et al. | |
| 6,640,303 B1 | 10/2003 | Vu | |
| 6,651,101 B1 | 11/2003 | Gai et al. | |
| 6,651,240 B1 | 11/2003 | Yamamoto et al. | |
| 6,654,782 B1 | 11/2003 | O'Brien et al. | |
| 6,654,796 B1 | 11/2003 | Slater et al. | |
| 6,665,714 B1 | 12/2003 | Blumenau et al. | |
| 6,671,699 B1 | 12/2003 | Black et al. | |
| 6,675,308 B1 | 1/2004 | Thomsen | |
| 6,678,821 B1 | 1/2004 | Waugh et al. | |
| 6,678,835 B1 | 1/2004 | Shah et al. | |
| 6,681,262 B1 | 1/2004 | Rimmer | |
| 6,691,148 B1 | 2/2004 | Zinky et al. | |

| Patent No. | Date | Name |
|---|---|---|
| 6,691,165 B1 | 2/2004 | Bruck et al. |
| 6,691,168 B1 | 2/2004 | Bal et al. |
| 6,694,436 B1 | 2/2004 | Audebert |
| 6,701,363 B1 | 3/2004 | Chiu et al. |
| 6,717,949 B1 | 4/2004 | Boden et al. |
| 6,718,361 B1 | 4/2004 | Basani et al. |
| 6,718,379 B1 | 4/2004 | Krishna et al. |
| 6,725,253 B1 | 4/2004 | Okano et al. |
| 6,728,885 B1 | 4/2004 | Taylor et al. |
| 6,735,596 B2 | 5/2004 | Corynen |
| 6,738,736 B1 * | 5/2004 | Bond .......................... 703/2 |
| 6,741,266 B1 | 5/2004 | Kamiwada et al. |
| 6,742,020 B1 | 5/2004 | Dimitroff et al. |
| 6,748,447 B1 | 6/2004 | Basani et al. |
| 6,754,716 B1 | 6/2004 | Sharma et al. |
| 6,754,816 B1 | 6/2004 | Layton et al. |
| 6,757,744 B1 | 6/2004 | Narisi et al. |
| 6,760,765 B1 | 7/2004 | Asai et al. |
| 6,760,775 B1 | 7/2004 | Anerousis et al. |
| 6,769,008 B1 | 7/2004 | Kumar |
| 6,769,060 B1 | 7/2004 | Dent et al. |
| 6,779,016 B1 | 8/2004 | Aziz et al. |
| 6,782,408 B1 | 8/2004 | Chandra et al. |
| 6,789,090 B1 | 9/2004 | Miyake et al. |
| 6,801,528 B2 | 10/2004 | Nassar |
| 6,801,937 B1 | 10/2004 | Novaes |
| 6,801,949 B1 | 10/2004 | Bruck et al. |
| 6,804,783 B1 | 10/2004 | Wesinger et al. |
| 6,813,778 B1 | 11/2004 | Poli et al. |
| 6,816,897 B2 | 11/2004 | McGuire |
| 6,820,042 B1 | 11/2004 | Cohen et al. |
| 6,820,121 B1 | 11/2004 | Callis et al. |
| 6,823,299 B1 | 11/2004 | Contreras et al. |
| 6,823,373 B1 | 11/2004 | Pancha et al. |
| 6,823,382 B2 | 11/2004 | Stone |
| 6,829,639 B1 | 12/2004 | Lawson et al. |
| 6,829,770 B1 | 12/2004 | Hinson et al. |
| 6,836,750 B2 | 12/2004 | Wong et al. |
| 6,845,160 B1 | 1/2005 | Aoki |
| 6,853,841 B1 | 2/2005 | St. Pierre |
| 6,854,069 B2 | 2/2005 | Kampe et al. |
| 6,856,591 B1 | 2/2005 | Ma et al. |
| 6,862,613 B1 | 3/2005 | Kumar et al. |
| 6,868,062 B1 | 3/2005 | Yadav et al. |
| 6,868,454 B1 | 3/2005 | Kubota et al. |
| 6,879,926 B2 | 4/2005 | Schmit et al. |
| 6,880,002 B2 | 4/2005 | Hirschfeld et al. |
| 6,886,038 B1 | 4/2005 | Tabbara et al. |
| 6,888,807 B2 | 5/2005 | Heller et al. |
| 6,895,534 B2 | 5/2005 | Wong et al. |
| 6,898,791 B1 | 5/2005 | Chandy et al. |
| 6,904,458 B1 | 6/2005 | Bishop et al. |
| 6,907,395 B1 | 6/2005 | Hunt et al. |
| 6,912,568 B1 | 6/2005 | Nishiki et al. |
| 6,915,338 B1 | 7/2005 | Hunt et al. |
| 6,922,791 B2 | 7/2005 | Mashayekhi et al. |
| 6,928,482 B1 | 8/2005 | Ben Nun et al. |
| 6,944,183 B1 | 9/2005 | Iyer et al. |
| 6,944,759 B1 | 9/2005 | Crisan |
| 6,947,987 B2 | 9/2005 | Boland |
| 6,954,930 B2 | 10/2005 | Drake et al. |
| 6,957,186 B1 | 10/2005 | Guheen et al. |
| 6,963,981 B1 | 11/2005 | Bailey et al. |
| 6,968,291 B1 | 11/2005 | Desai |
| 6,968,535 B2 | 11/2005 | Stelting et al. |
| 6,968,550 B2 | 11/2005 | Branson et al. |
| 6,968,551 B2 | 11/2005 | Hediger et al. |
| 6,971,063 B1 * | 11/2005 | Rappaport et al. .......... 715/733 |
| 6,971,072 B1 | 11/2005 | Stein |
| 6,973,620 B2 | 12/2005 | Gusler et al. |
| 6,973,622 B1 | 12/2005 | Rappaport et al. |
| 6,976,079 B1 | 12/2005 | Ferguson et al. |
| 6,976,269 B1 | 12/2005 | Avery, IV et al. |
| 6,978,379 B1 | 12/2005 | Goh et al. |
| 6,983,317 B1 | 1/2006 | Bishop et al. |
| 6,985,956 B2 | 1/2006 | Luke et al. |
| 6,986,133 B2 | 1/2006 | O'Brien et al. |
| 6,986,135 B2 | 1/2006 | Leathers et al. |
| 6,990,666 B2 | 1/2006 | Hirschfeld et al. |
| 7,003,562 B2 | 2/2006 | Mayer |
| 7,003,574 B1 | 2/2006 | Bahl |
| 7,012,919 B1 | 3/2006 | So et al. |
| 7,013,462 B2 | 3/2006 | Zara et al. |
| 7,016,950 B2 | 3/2006 | Tabbara et al. |
| 7,024,451 B2 | 4/2006 | Jorgenson |
| 7,027,412 B2 | 4/2006 | Miyamoto et al. |
| 7,028,228 B1 | 4/2006 | Lovy et al. |
| 7,035,786 B1 | 4/2006 | Abu El Ata et al. |
| 7,035,930 B2 * | 4/2006 | Graupner et al. ............ 709/226 |
| 7,043,407 B2 | 5/2006 | Lynch et al. |
| 7,043,545 B2 | 5/2006 | Tabbara et al. |
| 7,046,680 B1 | 5/2006 | McDysan et al. |
| 7,047,279 B1 | 5/2006 | Beams et al. |
| 7,047,518 B2 * | 5/2006 | Little et al. ................. 717/108 |
| 7,050,961 B1 | 5/2006 | Lee et al. |
| 7,054,943 B1 | 5/2006 | Goldszmidt et al. |
| 7,055,149 B2 | 5/2006 | Birkholz et al. |
| 7,058,704 B1 | 6/2006 | Mangipudi et al. |
| 7,058,826 B2 | 6/2006 | Fung |
| 7,058,858 B2 | 6/2006 | Wong et al. |
| 7,062,718 B2 | 6/2006 | Kodosky et al. |
| 7,069,204 B1 | 6/2006 | Solden et al. |
| 7,069,480 B1 | 6/2006 | Lovy et al. |
| 7,069,553 B2 | 6/2006 | Narayanaswamy et al. |
| 7,072,807 B2 | 7/2006 | Brown et al. |
| 7,072,822 B2 | 7/2006 | Humenansky et al. |
| 7,076,633 B2 | 7/2006 | Tormasov et al. |
| 7,080,143 B2 | 7/2006 | Hunt et al. |
| 7,082,464 B2 | 7/2006 | Hasan et al. |
| 7,089,281 B1 | 8/2006 | Kazemi et al. |
| 7,089,293 B2 | 8/2006 | Grosner et al. |
| 7,089,530 B1 | 8/2006 | Dardinski et al. |
| 7,093,005 B2 | 8/2006 | Patterson |
| 7,093,288 B1 | 8/2006 | Hydrie et al. |
| 7,096,258 B2 | 8/2006 | Hunt et al. |
| 7,099,936 B2 | 8/2006 | Chase et al. |
| 7,103,185 B1 | 9/2006 | Srivastava et al. |
| 7,103,874 B2 | 9/2006 | McCollum et al. |
| 7,113,900 B1 | 9/2006 | Hunt et al. |
| 7,117,261 B2 | 10/2006 | Kryskow, Jr. et al. |
| 7,120,154 B2 | 10/2006 | Bavant et al. |
| 7,124,289 B1 | 10/2006 | Suorsa |
| 7,127,625 B2 | 10/2006 | Farkas et al. |
| 7,130,881 B2 | 10/2006 | Volkov et al. |
| 7,131,123 B2 | 10/2006 | Suorsa et al. |
| 7,134,011 B2 | 11/2006 | Fung |
| 7,134,122 B1 * | 11/2006 | Sero et al. ................... 717/177 |
| 7,139,930 B2 | 11/2006 | Mashayekhi et al. |
| 7,139,999 B2 | 11/2006 | Bowman-Amuah |
| 7,140,000 B2 * | 11/2006 | Yucel ......................... 717/104 |
| 7,143,420 B2 | 11/2006 | Radhakrishnan |
| 7,146,353 B2 | 12/2006 | Garg et al. |
| 7,150,015 B2 | 12/2006 | Pace et al. |
| 7,152,109 B2 | 12/2006 | Suorsa et al. |
| 7,152,157 B2 | 12/2006 | Murphy et al. |
| 7,155,380 B2 | 12/2006 | Hunt et al. |
| 7,155,490 B1 | 12/2006 | Malmer et al. |
| 7,162,427 B1 * | 1/2007 | Myrick et al. ................... 705/1 |
| 7,162,509 B2 | 1/2007 | Brown et al. |
| 7,174,379 B2 | 2/2007 | Agarwal et al. |
| 7,181,731 B2 | 2/2007 | Pace et al. |
| 7,188,335 B1 | 3/2007 | Darr et al. |
| 7,191,344 B2 | 3/2007 | Lin et al. |
| 7,191,429 B2 | 3/2007 | Brassard et al. |
| 7,194,439 B2 | 3/2007 | Kassan et al. |
| 7,194,616 B2 | 3/2007 | Axnix et al. |

| Patent/Pub No. | Date | Inventor(s) |
|---|---|---|
| 7,197,418 B2 | 3/2007 | Fuller, III et al. |
| 7,200,530 B2 | 4/2007 | Brown et al. |
| 7,200,655 B2 | 4/2007 | Hunt et al. |
| 7,203,911 B2 | 4/2007 | Williams |
| 7,210,143 B2 | 4/2007 | Or et al. |
| 7,213,231 B1 | 5/2007 | Bandhole et al. |
| 7,222,147 B1 | 5/2007 | Black et al. |
| 7,225,441 B2 | 5/2007 | Kozuch et al. |
| 7,231,410 B1 | 6/2007 | Walsh et al. |
| 7,246,351 B2 | 7/2007 | Bloch et al. |
| 7,254,634 B1 | 8/2007 | Davis et al. |
| 7,257,584 B2 | 8/2007 | Hirschfeld et al. |
| 7,275,156 B2 | 9/2007 | Balfanz et al. |
| 7,278,273 B1 | 10/2007 | Whitted et al. |
| 7,281,154 B2 | 10/2007 | Mashayekhi et al. |
| 7,302,608 B1 | 11/2007 | Acharya et al. |
| 7,305,549 B2 | 12/2007 | Hunt et al. |
| 7,305,561 B2 | 12/2007 | Hunt et al. |
| 7,313,573 B2 | 12/2007 | Leung et al. |
| 7,315,801 B1 | 1/2008 | Dowd et al. |
| 7,318,216 B2 | 1/2008 | Diab |
| 7,333,000 B2 | 2/2008 | Vassallo |
| 7,343,601 B2 | 3/2008 | Azagury et al. |
| 7,349,891 B2 | 3/2008 | Charron et al. |
| 7,350,068 B2 | 3/2008 | Anderson et al. |
| 7,350,186 B2 | 3/2008 | Coleman et al. |
| 7,366,755 B1 | 4/2008 | Cuomo et al. |
| 7,367,028 B2 | 4/2008 | Kodosky et al. |
| 7,370,103 B2 | 5/2008 | Hunt et al. |
| 7,370,323 B2 | 5/2008 | Marinelli et al. |
| 7,376,125 B1 | 5/2008 | Hussain et al. |
| 7,379,982 B2 | 5/2008 | Tabbara |
| 7,386,721 B1 | 6/2008 | Vilhuber et al. |
| 7,395,320 B2 | 7/2008 | Hunt et al. |
| 7,403,901 B1 | 7/2008 | Carley et al. |
| 7,404,175 B2 | 7/2008 | Lee et al. |
| 7,406,517 B2 | 7/2008 | Hunt et al. |
| 7,406,692 B2 | 7/2008 | Halpern et al. |
| 7,409,420 B2 | 8/2008 | Pullara et al. |
| 7,461,249 B1 | 12/2008 | Pearson et al. |
| 7,464,147 B1 | 12/2008 | Fakhouri et al. |
| 7,478,381 B2 | 1/2009 | Roberts et al. |
| 7,478,385 B2 | 1/2009 | Sierer et al. |
| 7,480,907 B1 | 1/2009 | Marolia et al. |
| 7,496,911 B2 | 2/2009 | Rowley et al. |
| 7,506,338 B2 | 3/2009 | Alpern et al. |
| 7,512,942 B2 | 3/2009 | Brown et al. |
| 7,587,453 B2 | 9/2009 | Bhrara et al. |
| 7,594,224 B2 | 9/2009 | Patrick et al. |
| 7,624,086 B2 | 11/2009 | Keith, Jr. |
| 7,653,187 B2 | 1/2010 | Clark et al. |
| 7,653,903 B2 | 1/2010 | Purkeypile et al. |
| 7,743,373 B2 | 6/2010 | Avram et al. |
| 7,765,540 B2 | 7/2010 | McCollum et al. |
| 2001/0014158 A1 | 8/2001 | Baltzley |
| 2001/0016909 A1 | 8/2001 | Gehrmann |
| 2001/0020228 A1 | 9/2001 | Cantu et al. |
| 2001/0039586 A1 | 11/2001 | Primak et al. |
| 2001/0047400 A1 | 11/2001 | Coates et al. |
| 2001/0051937 A1 | 12/2001 | Ross et al. |
| 2002/0009079 A1 | 1/2002 | Jungck et al. |
| 2002/0010771 A1 | 1/2002 | Mandato |
| 2002/0022952 A1 | 2/2002 | Zager et al. |
| 2002/0040402 A1 | 4/2002 | Levy-Abegnoli et al. |
| 2002/0049573 A1* | 4/2002 | El Ata ............ 703/2 |
| 2002/0057684 A1 | 5/2002 | Miyamoto et al. |
| 2002/0069267 A1 | 6/2002 | Thiele |
| 2002/0069369 A1 | 6/2002 | Tremain |
| 2002/0075844 A1 | 6/2002 | Hagen |
| 2002/0082820 A1 | 6/2002 | Ferguson et al. |
| 2002/0087264 A1 | 7/2002 | Hills et al. |
| 2002/0090089 A1 | 7/2002 | Branigan et al. |
| 2002/0120761 A1 | 8/2002 | Berg |
| 2002/0131601 A1 | 9/2002 | Ninomiya et al. |
| 2002/0138551 A1 | 9/2002 | Erickson |
| 2002/0152086 A1 | 10/2002 | Smith et al. |
| 2002/0156900 A1 | 10/2002 | Marquette et al. |
| 2002/0161839 A1 | 10/2002 | Colasurdo et al. |
| 2002/0171690 A1 | 11/2002 | Fox et al. |
| 2002/0184327 A1 | 12/2002 | Major et al. |
| 2002/0188941 A1 | 12/2002 | Cicciarelli et al. |
| 2002/0194342 A1 | 12/2002 | Lu et al. |
| 2002/0194345 A1 | 12/2002 | Lu et al. |
| 2002/0194369 A1 | 12/2002 | Rawlings et al. |
| 2002/0198995 A1 | 12/2002 | Liu et al. |
| 2003/0008712 A1 | 1/2003 | Poulin |
| 2003/0009559 A1 | 1/2003 | Ikeda |
| 2003/0014644 A1 | 1/2003 | Burns et al. |
| 2003/0028642 A1 | 2/2003 | Agarwal et al. |
| 2003/0028770 A1 | 2/2003 | Litwin, Jr. et al. |
| 2003/0041142 A1 | 2/2003 | Zhang et al. |
| 2003/0041159 A1 | 2/2003 | Tinsley et al. |
| 2003/0046615 A1 | 3/2003 | Stone |
| 2003/0051049 A1 | 3/2003 | Noy et al. |
| 2003/0056063 A1 | 3/2003 | Hochmuth et al. |
| 2003/0065743 A1 | 4/2003 | Jenny et al. |
| 2003/0069369 A1 | 4/2003 | Belenkaya et al. |
| 2003/0074395 A1 | 4/2003 | Eshghi et al. |
| 2003/0101284 A1 | 5/2003 | Cabrera et al. |
| 2003/0105963 A1 | 6/2003 | Slick et al. |
| 2003/0120763 A1 | 6/2003 | Voilpano |
| 2003/0126464 A1 | 7/2003 | McDaniel et al. |
| 2003/0130833 A1 | 7/2003 | Brownell et al. |
| 2003/0138105 A1 | 7/2003 | Challener et al. |
| 2003/0165140 A1 | 9/2003 | Tang et al. |
| 2003/0200293 A1 | 10/2003 | Fearn et al. |
| 2003/0204734 A1 | 10/2003 | Wheeler |
| 2003/0214908 A1 | 11/2003 | Kumar et al. |
| 2003/0217263 A1 | 11/2003 | Sakai |
| 2003/0225563 A1 | 12/2003 | Gonos |
| 2004/0002878 A1 | 1/2004 | Maria Hinton |
| 2004/0049365 A1 | 3/2004 | Keller et al. |
| 2004/0049509 A1 | 3/2004 | Keller et al. |
| 2004/0059812 A1 | 3/2004 | Assa |
| 2004/0068631 A1 | 4/2004 | Ukeda et al. |
| 2004/0073443 A1 | 4/2004 | Gabrick et al. |
| 2004/0073795 A1 | 4/2004 | Jablon |
| 2004/0078787 A1 | 4/2004 | Borek et al. |
| 2004/0111315 A1 | 6/2004 | Sharma et al. |
| 2004/0117438 A1 | 6/2004 | Considine et al. |
| 2004/0117476 A1 | 6/2004 | Steele et al. |
| 2004/0160386 A1 | 8/2004 | Michelitsch et al. |
| 2004/0161111 A1 | 8/2004 | Sherman |
| 2004/0193388 A1 | 9/2004 | Outhred et al. |
| 2004/0199572 A1 | 10/2004 | Hunt et al. |
| 2004/0205179 A1 | 10/2004 | Hunt et al. |
| 2004/0208292 A1 | 10/2004 | Winterbottom |
| 2004/0220792 A1 | 11/2004 | Gallanis et al. |
| 2004/0226010 A1 | 11/2004 | Suorsa |
| 2004/0261079 A1 | 12/2004 | Sen |
| 2004/0264481 A1 | 12/2004 | Darling et al. |
| 2004/0267920 A1 | 12/2004 | Hydrie et al. |
| 2004/0268357 A1 | 12/2004 | Joy et al. |
| 2004/0268358 A1 | 12/2004 | Darling et al. |
| 2005/0008001 A1 | 1/2005 | Williams et al. |
| 2005/0021742 A1 | 1/2005 | Yemini et al. |
| 2005/0055435 A1 | 3/2005 | Gbadegesin et al. |
| 2005/0080811 A1 | 4/2005 | Speeter et al. |
| 2005/0086502 A1 | 4/2005 | Rayes et al. |
| 2005/0091078 A1 | 4/2005 | Hunt et al. |
| 2005/0091227 A1 | 4/2005 | McCollum et al. |
| 2005/0097097 A1 | 5/2005 | Hunt et al. |
| 2005/0097146 A1 | 5/2005 | Konstantinou et al. |
| 2005/0102154 A1 | 5/2005 | Dodd et al. |
| 2005/0102388 A1 | 5/2005 | Tabbara et al. |
| 2005/0102513 A1 | 5/2005 | Alve |

| | | | |
|---|---|---|---|
| 2005/0125212 A1 | 6/2005 | Hunt et al. | |
| 2005/0138416 A1 | 6/2005 | Qian et al. | |
| 2005/0152270 A1 | 7/2005 | Gomez Paredes et al. | |
| 2005/0192971 A1 | 9/2005 | Tabbara et al. | |
| 2005/0193103 A1 | 9/2005 | Drabik | |
| 2005/0246529 A1 | 11/2005 | Hunt et al. | |
| 2005/0246771 A1 | 11/2005 | Hunt et al. | |
| 2005/0251783 A1 | 11/2005 | Torone et al. | |
| 2005/0257244 A1 | 11/2005 | Joly et al. | |
| 2005/0268325 A1 | 12/2005 | Kuno et al. | |
| 2006/0025984 A1 | 2/2006 | Papaefstathiou et al. | |
| 2006/0025985 A1 | 2/2006 | Vinberg et al. | |
| 2006/0031248 A1 | 2/2006 | Vinberg et al. | |
| 2006/0034263 A1 | 2/2006 | Outhred et al. | |
| 2006/0037002 A1 | 2/2006 | Vinberg et al. | |
| 2006/0048017 A1 | 3/2006 | Anerousis et al. | |
| 2006/0123040 A1 | 6/2006 | McCarthy et al. | |
| 2006/0149838 A1 | 7/2006 | Hunt et al. | |
| 2006/0155708 A1 | 7/2006 | Brown et al. | |
| 2006/0161879 A1 | 7/2006 | Lubrecht et al. | |
| 2006/0161884 A1 | 7/2006 | Lubrecht et al. | |
| 2006/0232927 A1 | 10/2006 | Vinberg et al. | |
| 2006/0235664 A1 | 10/2006 | Vinberg et al. | |
| 2006/0259609 A1 | 11/2006 | Hunt et al. | |
| 2006/0259610 A1 | 11/2006 | Hunt et al. | |
| 2006/0271341 A1 | 11/2006 | Brown et al. | |
| 2007/0006177 A1 | 1/2007 | Aiber et al. | |
| 2007/0112847 A1 | 5/2007 | Dublish et al. | |
| 2007/0192769 A1 | 8/2007 | Mimura et al. | |
| 2008/0059214 A1 | 3/2008 | Vinberg et al. | |

FOREIGN PATENT DOCUMENTS

| | | |
|---|---|---|
| CN | 1375685 | 10/2002 |
| EP | 0964546 | 12/1999 |
| EP | 1180886 A1 | 2/2002 |
| EP | 1307018 A1 | 5/2003 |
| EP | 1550969 A2 | 7/2005 |
| JP | 6250956 A | 9/1994 |
| JP | 8297567 | 11/1996 |
| JP | 8305609 A | 11/1996 |
| JP | 9034723 A | 2/1997 |
| JP | 9091143 A | 4/1997 |
| JP | 10124343 A | 5/1998 |
| JP | 10150470 A | 6/1998 |
| JP | 10240576 A | 9/1998 |
| JP | 10285216 A | 10/1998 |
| JP | 11110256 A | 4/1999 |
| JP | 11007407 | 12/1999 |
| JP | 11340980 A | 12/1999 |
| JP | 11345180(A) | 12/1999 |
| JP | 2000151574 A | 5/2000 |
| JP | 2000268012 A | 9/2000 |
| JP | 2000293497 A | 10/2000 |
| JP | 2001339437 A | 12/2001 |
| JP | 2001526814 | 12/2001 |
| JP | 2002084302 | 3/2002 |
| JP | 2002354006 A | 12/2002 |
| JP | 2003006170(A) | 1/2003 |
| JP | 2003030424 A | 1/2003 |
| JP | 2003058698(A) | 2/2003 |
| JP | 2003532784 | 11/2003 |
| JP | 2005155729 | 6/2005 |
| KR | 10-2002-0026751 | 4/2002 |
| KR | 10-2004-0008275 | 1/2004 |
| RU | 2112625 C1 | 5/1998 |
| RU | 2189072 C2 | 9/2002 |
| WO | WO9728505(A1) | 8/1997 |
| WO | WO9853410 | 11/1998 |
| WO | WO9930514 A2 | 6/1999 |
| WO | WO9963439 | 12/1999 |
| WO | WO0022526 | 4/2000 |
| WO | WO0031945 | 6/2000 |
| WO | WO0073929 | 12/2000 |
| WO | WO0230044 A2 | 4/2002 |
| WO | WO0237748 | 5/2002 |
| WO | WO02085051 | 10/2002 |
| WO | WO03027876 | 4/2003 |
| WO | WO03039104 | 5/2003 |

OTHER PUBLICATIONS

Dekhil, et al., "Generalized Policy Model for Application and Service Management", Hewlett-Packard Laboratories, 1999, 3 pages.

Garschhammer, et al., "Towards Generic Service Management Concepts A Service Model Based Approach", IEEE/IFIP International Symposium, Integrated Network Management Proceedings, 2001, 14 pages.

Harbour, et al., "MAST: An Open Environment for Modeling, Analysis, and Design of Real-Time Systems", 2001, pp. 1-16.

Hardwick, et al., "Modeling the Performance of E-Commerce Site", Journal of Computer Resource Management, 2002, 11 pages.

"Integrated Security Management", OpenPMF (Policy Management Framework), retrieved as early as Apr. 23, 2007 from <<http://www.objectsecurity.com/doc/openpmf-A4.pdf>>, 2 pages.

Kounev, "A Capacity Planning Methodology for Distributed E-Commerce Applications", Jan. 2, 2001, pp. 1-13.

Mahon, "OpenView PolicyXpert: Heterogeneous Configuration and Control", OpenView Policy-Based Network Management, Feb. 1999, pp. 1-4.

Norton, "Simalytic Hybrid Modeling Planning the Capacity of Client/Server Applications", Colorado Technical University, Aug. 24-29, 1997, pp. 1-7.

Selic, "A Generic Framework for Modeling Resources with UML", IEEE, vol. 33, Issue 6, Jun. 2000, pp. 64-69.

Yuhui, e-Commerce Based on ERP for Enterprize by Utilizing DNA and XML, Computer Engineering, vol. 27, No. 6, p. 165,166,182.

Araki, "Linux Security Diary, Use VLAN in Linux" , Linux Japan, Itsutsubashi Research Co.,ltd., vol. 3, No. 11,Nov. 1, 2008, pp. 110-113 (CSDB: National Academy Paper 200300158009.

"C.O.B.A.S Centralized Out-Of-Band Authentication System", OT Worldtel Inc., Sep. 8-9, 2003, pp. 14.

"Enhanced IP Services for Cisco Networks", retrieved on Jun. 19, 2007, at <<http://proquest.safaribooksonline.com/1578701066>>, Sep. 23, 1999, pp. 11.

Frolund, et al., "Design-Time Simulation of a Large-Scale, Distrubuted object System" ACM 1998, pp. 374-400.

Harbour, et al., "MAST An Open Environment for Modeling, Analysis, and Design of Real-Time Systems", available at least as early as Jan. 10, 2007, at <<http://citeseer.ist.psu.edu/cache/papers/cs/30959/http:zSzzSzvvww.ctr.unican. eszSzpublicationszSzmgh-jlm-jjg-jcp-jmd-2002a.pdf/mast-an-open-environment.pdf>>, pp. 1-16.

Howard et al., "Designing Secure Web-Based Applications for Microsoft Windows 2000", 2000.

Levillain, et al., "Switch-Based Server Load Balancing for Enterprises," Alcatel Telecommunications Review; No. 4 pp. 298-302; 2002.

Liu et al., "Visualization in Network Topology Optimization", ACM, 1992, pp. 131-138.

Miyamoto, et al., "VLAN Management System on Large-scale Network," Journal of Information Processing Society of Japan, vol. 41, No. 12, pp. 3234-3244, The Information Processing Society of Japan, Dec. 15, 2000. (CSDB: National Academy Paper 200200108005).

Nerurkar, "Security Analysis and Design", Dr. Dobb's Journal, Nov. 2000, pp. 50-56.

Nestor, "Security Modeling Using Hierarchical State Machines", IEEE 1991, pp. 110-119.

"Pretty Good Privacy PGP for Personal Privacy, Version 5.0 For Windows 95 Windows NT", Pretty Good Privacy Inc., 1997, pp. 137.

Shi et al., "An Effective Model for Composition of Secure Systems", The Journal of Systems and Software, 1998, pp. 233-244.

Somers, "Hybrid: Unifying Centralised and Distributed Network Management using Intelligent Agents" IEEE Network Operations and Management Symposium Kyoto Apr. 15-19, 1996. pp. 34-43.

Sultan, et al., "Migratory TCP: Connection Migration for Service Continuity," in the Internet Proceedings 22nd Intl. Conference on Distributed Computing Systems; Jul. 2002; pp. 469-740.

Wen-Chen Wang, "How a SCVP client authenticates the SCVP server", Online! Sep. 12, 2003, Retrieved from the Internet: URL:http://www.imc.org/ietf-pkix/old-archive-03/msg01323.html], p. 1.

Cardelli, L., "Type Systems," CRC Handbook of Computer Science and Engineering, 2nd Edition, Ch. 97, Wednesday, Feb. 25, 2004, 8:00pm CRC Press., http://research.microsoft.com/Users/luca/Papers/TypeSystems.pdf.

Chunxiao, et al, Using XML Schema to Configure Mobile E-Commerce Transaction Model, Applications of the Computer Systems, No. 2, Feb. 28, 2002, 9 pages.

"Core Principles of the Dynamic Systems Initiative: Leveraging System Knowledge, Captured in Software Models, to Address Challenges Across the IT Life Cycle," Windows Server System, Published Nov. 15, 2004, http://www.microsoft.com/windowsserversystem/dsi/dsicore.mspx.

Menezes, et al., "Handbook of Applied Cryptography", CRC Press, 1996, Chapters 8 & 12, pp. 283-319 and 489-541.

Iwasaki, Hideki "IP Troubles Q & A—The Prevention of Network Troubles and the Risk Management", Computer & Network LAN, Japan Ohmsha, Ltd., vol. 18, No. 8, (Jul. 14, 2000), pp. 29-39.

Translated the Japanese Office Action mailed on Jan. 26, 2007 for Japanese Patent Application No. 2001-326848, a counterpart foreign application of US Patent No. 6,886,038.

Translated the Japanese Office Action mailed on Dec. 14, 2007 for Japanese Patent Application No. 2001-326848, a counterpart foreign application of US Patent No. 6,886,038.

Kitjongthawonkul, S., et al., "Modeling Information Systems Using Objects, Agents, and Task-Based Problem Solving Adapters," Proc. 10th Australasian Conference on Information Systems, 1999, http://www.vuw.ac.nz/acis99/Papers/PaperKitjongthawonkul-077.pdf.

Lee, et al., "Community Services: A Toolkit for Rapid Deployment of Network Services", Proceedings of the IEEE International Conference on Cluster Computing, Cluster 2002, IEEE, 2002, 4 pages.

Meader, P., "Build Distributed Apps a New Way," VSLive!Show Daily, San Francisco, Mar. 25, 2004, http://www.ftponline.com/reports/vslivesf/2004/whitehorse2/.

Meader, P., "Model Apps More Effectively," VSLive!ShowDaily, San Francisco, Mar. 24, 2004, http://www.ftponline.com/reports/vslivesf/2004/whitehorse/.

Meli, "Measuring Change Requests to support effective project management practices", Proc of the ESCOM 2001, London, Apr. 2001, pp. 25-34.

Microsoft.com, "System Definition Model", retrived at <<http://web.archive.org/web/20040405230803/www.microsoft.com/windowsserversystem/dsi/sdm.mspx>>, Mar. 31, 2004.

PCT Intl Search Report and Written Opinion for Application No. PCT/US2006/038856, dated Feb. 20, 2007, 9 pgs.

"System Definition Model," Windows Server System Home, Published Dec. 15, 2003, http://www.microsoft.com/windowsserversystem/dsi/sdm.mspx.

"The Age Changed by Information Network and System: The Internet Releasing Enterprises and Society A? The New Century created by an E Service and a Terabit Network Service: Disappearance of Enterprise Servers, Service Components behind the Internet", Nikkei Internet Technology, Japan, Nikkei BUsiness Publications, Inc. No. 30, (Dec. 22, 1999), pp. 76-81.

Tofts, C., "HOLOS—A Simulation and Multi Mathematical Modelling Tool," Hewlett-Packard Company, Oct. 31, 2001, http://www.hpl.hp.com/techreports/2001/HPL-2001-276.pdf.

Heinl, et al., "A Comprehensive Approach to Flexibility in Workflow Management Systems", WACC 1999, ACM, 1999, pp. 79-88.

"Remote Operating System Installation", retrieved on Feb. 13, 2009 at <<http://technet.microsoft.com/en-us/library/bb742501.aspx>>, Microsoft TechNet, Sep. 9, 1999, pp. 1-28.

Barrett et al., "Model Driven Distrution Pattern Design for Dynamic Web Service Compositions", ACM ICWE 2006, Jul. 11-14, 2006, Palo Alto, CA, USA, pp. #129-pp. #136.

Dolstra et al., "Imposing a Memory Management Discipline on Software Deployment", IEEE Procedeeding of the 26th International Conference on Software Engineering 2004, pp. #1-pp. #10.

Heilala et al., "Modeling and Simulation for Customer Driven Manufacturing System Design and Operations Planning", IEEE, Proceedings of the 2007 Winter Simulation Conference, 2007, pp. #1853-pp. #1862.

Morimotoet al., "Compatability Testing for Windows Server 2003", Microsoft Windows Server 2003 Unlesahed, Chapter 18, Section 1, Jun. 14, 2004, 2 pages.

Yamasaki et al., "Model-Based Resource Selection for Effiecient Virtual Cluster Deployment", ACM VTDC 2007, Nov. 12, 2007, Reno, NV, USA, pp. #1-pp. #7.

W3C: "Resourse Description Framework (RDF), Concepts and Abstract Syntax", <<http://www.w3.org/TR2004/REC-rdf-concepts-20040210>>, Feb. 10, 2004, XP002570908.

Notice of Rejection mailed May 28, 2010 (translation) for Japanese Patent Application No. 2004-064566, 8 pages.

Sloman, "Policy Driven Management for Distributed Systems", Journal of Network and System Mangement, 1994, vol. 2, No. 4, Plenum Publishing Corporation, Dec. 1994, pp. 333-360.

Yonezawa, "Feature Article UML-Compatible Modeling Tool Front Line, Ensure Consistence Between Code and Model, Applicable to a Large-Scale Team Development", DB Magazine, Japan, Mar. 1, 2002, vol. 11, No. 13. pp. 97-105.

Yuura, "Component-Oriented Development Method and Environment for Advanced Enterprises Information Systems", Japan, May 1, 1998, vol. 80 No. 5, pp. 25-30.

Chunxiao, et al., Configure and move the e-Commerce Business Model by Utilizing XML, Applications of Computer Systems, No. 2, p. 8-11.

Yuhui, e-Commerce Based on ERP for Enterprize by Utilizing DNA and XML, Computer Engineering, vol. 27, No. 6, p. 165,166,182.

Burns, et al., "Allocation and Data Placement Using Virtual Contiguity", p. 6.

Vadim, "On Virtual Data Centers and Their Operating Environments", Computer Systems and Technology Laboratory, Mar. 8, 2001, pp. 20.

Hitchens et al., "Design and specification of role based access control policies", IEEE Proceedings, Aug. 2000, pp. 117-129.

Michael et al., "Natural-Language Processing Support for Developing Policy-Governed Software Systems", 39th International Conference and Exhibition on Technology of Object-Oriented Languages and Systems, Jul./Aug. 2001, pp. 263-274.

Nagase, "Catalysis: Development of Component Based Application by Using UML", bit, vol. 31, No. 7, pp. 37-45, Kyoritsu Publishing, Co., Ltd., Japan, Jul. 1, 1999.

Notice of Rejection from JP 2004-063225, dated Sep. 14, 2010 (contains reference to article by Nagase), 5 pgs.

Siganos et al., "Analyzing BGP Policies: Methodology an Tool", 23rd Annual Joint Conference of the IEEE Computer and Communications Societies, Mar. 2004, pp. 1640-1651.

Toktar et al., "RSVP Policy Control using XACML", 5th IEEE International Workshop on Policies for Distributed Systems and Networks, Jun. 2004, pp. 87-96.

UML, "OMG Unified Modeling Language Specification", Sep. 2001, Version 1.4, Retrvied from <<www.omg.org/spec/UML/1.4>>, pp. 1-566.

* cited by examiner

DESIGN TIME VALIDATION OF SYSTEMS

RELATED APPLICATIONS

This application claims the benefit of U.S. Provisional Application No. 60/452,736, filed Mar. 6, 2003, entitled "Architecture for Distributed Computing System and Automated Design, Deployment, and Management of Distributed Applications", which is hereby incorporated herein by reference. Additionally, this application is a continuation-in-part of U.S. application Ser. No. 10/693,838, filed Oct. 24, 2003, entitled "Integrating Design, Deployment, and Management Phases for Systems", which is hereby incorporated herein by reference.

TECHNICAL FIELD

The invention relates to the design of systems, and more particularly to design time validation of systems.

BACKGROUND

Internet usage has exploded over the past several years and continues to grow. People have become very comfortable with many services offered on the World Wide Web (or simply "Web"), such as electronic mail, online shopping, gathering news and information, listening to music, viewing video clips, looking for jobs, and so forth. To keep pace with the growing demand for Internet-based services, there has been tremendous growth in the computer systems dedicated to hosting Websites, providing backend services for those sites, and storing data associated with the sites.

One type of distributed computer system is a data center (such as an Internet data center (IDC) or an Enterprise Data Center (EDC)), which is a specifically designed complex that houses many computers for hosting network-based services. Data centers, which may also go by the names of "Webfarms" or "server farms", typically house hundreds to thousands of computers in climate-controlled, physically secure buildings. Data centers typically provide reliable Internet access, reliable power supplies, and a secure operating environment.

Different data centers can have different requirements that they impose on applications run in the data centers. For example, different data centers may require different types of security to be enforced, or require that applications support different communication protocols. Additionally, some data centers may change these requirements over time. These differences among data centers makes the design process of applications difficult, as the designers must be aware of these different requirements and account for them in the design of their applications in order for their applications to be able to be run on the desired data center(s).

Furthermore, currently a designer is typically only able to evaluate whether their application will run in a particular data center when they are deploying their application to the data center. If the deployment is unsuccessful because one or more of the requirements of the data center are not satisfied by the application, then the designer is required to attempt to fix the problem(s) with the application and then re-attempt deployment of the application at the data center. This process can be repeated many times, and can result in an inefficient and frustrating design process.

The design time validation of systems described herein solves these and other problems.

SUMMARY

Design time validation of systems is described herein.

In accordance with certain aspects of the design time validation of systems, a description of a system being designed and a description of an environment are received. Both of the received descriptions are used to validate the system against the environment while the system is being designed and prior to attempting to deploy the system.

BRIEF DESCRIPTION OF THE DRAWINGS

The same numbers are used throughout the drawings to reference like features.

DETAILED DESCRIPTION

The following disclosure describes a number of aspects pertaining to an architecture for design time validation of systems. The disclosure includes discussion of a system definition model (SDM), which may also be referred to as a service definition model (SDM). The SDM provides tools and a context for an application architect to design distributed computer applications and data centers in an abstract manner. The model defines a set of elements that represent functional units of the applications that will eventually be implemented by physical computer resources and software. Associated with the model elements is a schema that dictates how functional operations represented by the components are to be specified.

As used herein, the term "wire" may also be referred to as "connections", "communication", or "communication relationship". Also, the term "system" may be referred to as "module" and the term "resource space" may be referred to as "resources". Additionally, the term "application space" may also be referred to as "applications", and the term "instance space" may also be referred to as "instances". Further, the term "class" may also be referred to as "abstract definition", the term "port" may also be referred to as "endpoint", and the term "type" may also be referred to as "definition".

Figure 1:
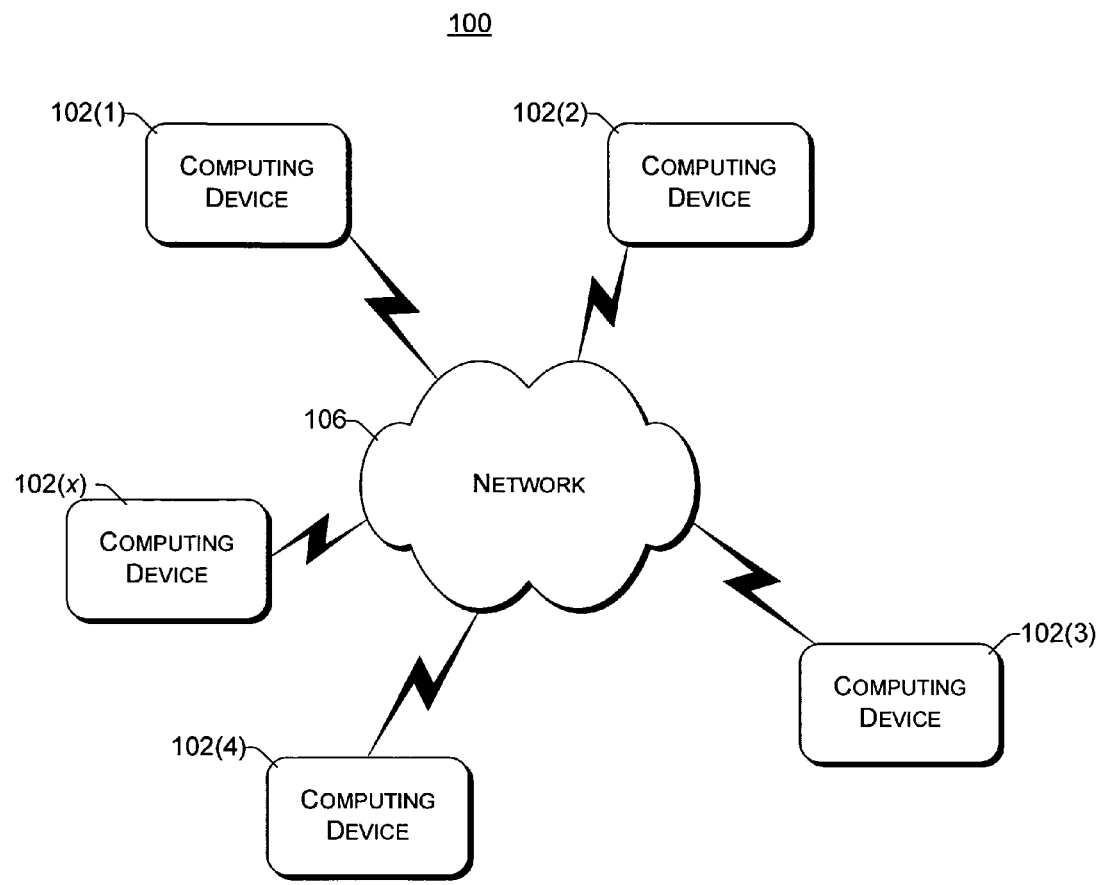
FIG. 1 illustrates an example network setting.

FIG. 1 illustrates an example network setting 100. In setting 100, multiple (x) computing devices 102(1), 102(2), . . . , 102(x) are coupled to a network 106. Network 106 is intended to represent any of a variety of conventional network topologies and types (including wire and/or wireless networks), employing any of a variety of conventional network protocols (including public and/or proprietary protocols). Network 106 may include, for example, a local area network (LAN), a wide area network (WAN), portions of the Internet, and so forth. Setting 100 represents any of a wide variety of settings, including, for example, data centers (e.g., Internet data centers (IDCs)), office or business settings, home settings, educational or research facilities, retail or sales settings, data storage settings, and so forth.

Computing devices 102 can be any of a variety of conventional computing devices, including desktop PCs, workstations, mainframe computers, server computers, Internet appliances, gaming consoles, handheld computers, cellular telephones, personal digital assistants (PDAs), etc. One or more of devices 102 can be the same types of devices, or alternatively different types of devices. Additionally, even if multiple devices are the same types of devices, the multiple devices may still be configured differently (e.g., two devices 102 may be server computers, but may have different hardware configurations, such as different processors, different amounts of RAM, different sizes of hard disk drives, and so forth).

One or more computing devices 102 may also be re-configured after being added to setting 100. For example, a particular computing device 102 may operate for a period of time (e.g., on the order of minutes, hours, days, months, etc.) performing one function, and then an administrator may decide that a different function is desirable (e.g., change from being a server computer to a workstation computer, from a web server to a local file server, etc.).

Figure 2:
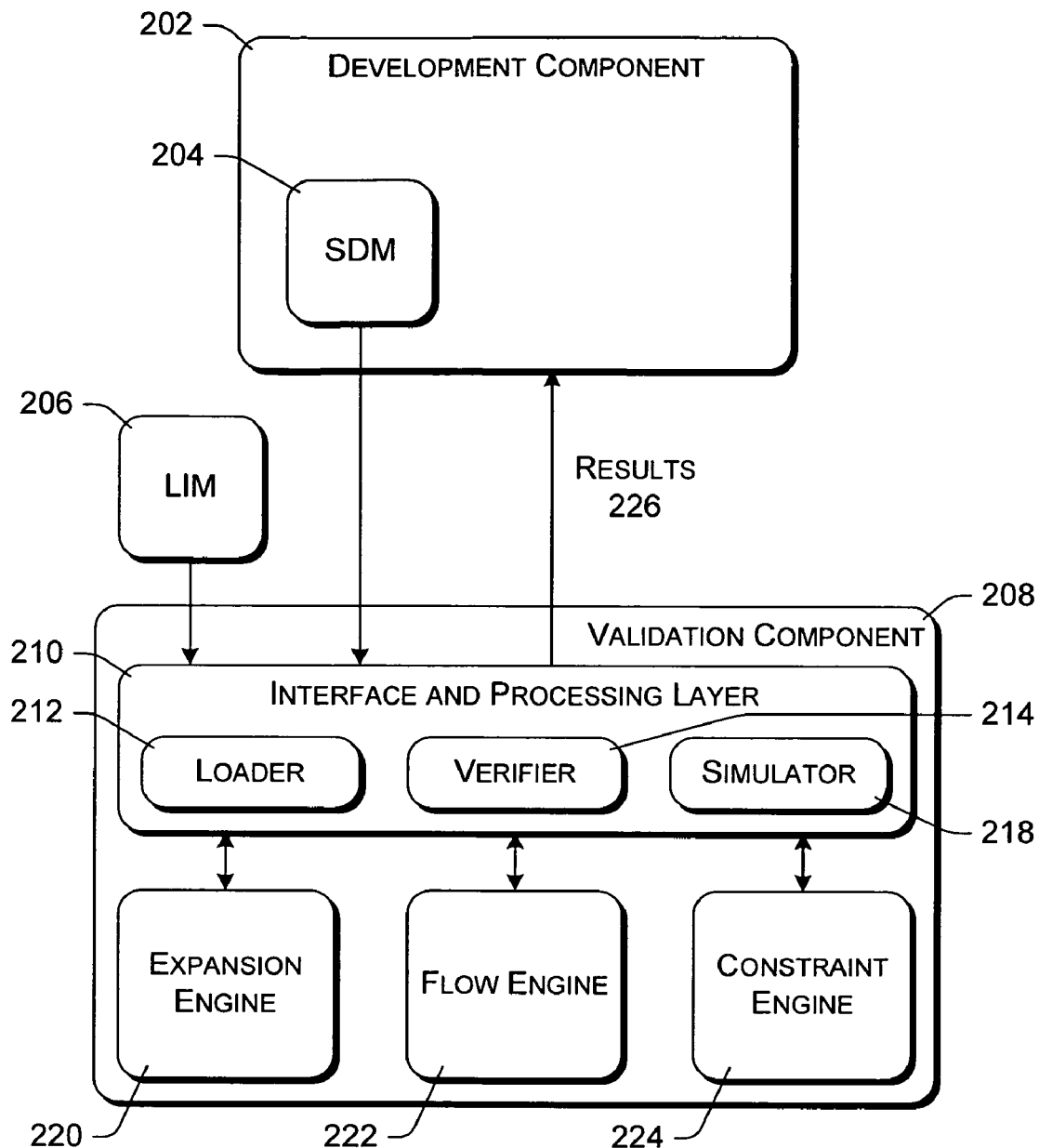
FIG. 2 is a block diagram illustrating an example architecture using system definition model.

FIG. 2 is a block diagram illustrating an example architecture 200 using the SDM. The SDM is designed to be used during the design process of systems, and may also be used for deployment and/or management of a system after the design process is complete. A system is a set of related software and/or hardware resources that can work together to accomplish a common function. One example of such a system is an application, which refers to a set of instructions that can be run or executed by a computing device to perform various functionality. Examples of applications include entertainment applications such as games, productivity applications such as word processors, reference applications such as electronic encyclopedias, distributed applications such as may be used for web services or financial analysis, and so forth. Another example of such a system is an environment on which an application (or another environment) can be deployed. An environment refers to the software and/or hardware resources on which an application (or another environment) is deployed. Such environments can be layered on top of one another.

Generally, during the design process or phase for a system (also referred to as the development process or phase), development tools leveraging the SDM are used to define a system comprised of communicating software and/or hardware components. A system definition contains all information necessary to deploy and operate a distributed system, including required resources, configuration, operational features, policies, etc. After the design phase is complete, a deployment phase can also use the system definition to automatically deploy the system and dynamically allocate and configure the software and hardware (e.g., server, storage and networking) resources required. The same system definition can be used for deployments to different host environments and to different scales.

The architecture 200 employs the SDM definition model as well as a schema that defines functional operations within the SDM definition model. The definition model includes various different kinds of data structures which are collectively referred to as "definitions". Functionality of the SDM is exposed through one or more platform services, such as application program interfaces (APIs).

During the design phase for a system, a development component 202 generates a document that contains the system definition, such as an SDM document 204. Development component 202 can be any of a variety of development components, such as the Visual Studio® development system available from Microsoft® Corporation of Redmond, Wash. SDM document 204 defines all information (also referred to herein as knowledge) related to the deployment (and optionally management) of the system. Any knowledge necessary for or used when deploying the system or managing the system is included in SDM document 204. Although described herein as a single document, it is to be appreciated that the knowledge could alternatively be spread out and maintained in multiple documents.

A system definition defines a system in terms of one or more of resources, endpoints, relationships and subsystems. A system definition is declared in an SDM document (e.g., an XML document). Resources may be hardware resources or software resources. Endpoints represent communications across systems. Relationships define associations between systems, resources and endpoints. Subsystems can be treated as complete systems and are typically part of a larger system.

A system definition captures the basic structure of a dynamic system. It can be viewed as the skeleton on which all other information is added. This structure is typically specified during the development process, by designers and developers, and typically does not change frequently. In addition to the structure, the SDM can contain deployment information, installation processes, schemas for configuration, events and instrumentation, automation tasks, health models, operational policies, etc. Other information can be added by the operations staff, by vendors, and/or by management systems across the lifetime of a distributed system.

SDM document 204 includes one or more constraints (also referred to as requirements) of the system that an environment in which the system is to be deployed and/or run must satisfy. The environment itself is also described using an SDM document referred to as the "logical infrastructure" (LIM) document 206, or as a data center description or data center model. Analogous to SDM document 204, LIM document 206 can be a single document or alternatively made up of two or more documents. LIM document 206 can be generated using any of a variety of development components, such as a component similar to development component 202. LIM document 206 may also be developed using development component 202 (that is, the same development component may be used to generate both SDM document 204 and LIM document 206).

The environment described by LIM document 206 can be single computing devices, or alternatively collections of computing devices (e.g., data centers), application hosts, etc. Different systems, or even the same system, can be installed to different environments. For example, a data center may include fifty computing devices, and one system may be deployed to five of those computing devices, while another system may be deployed to thirty five of those computing devices. These requirements can take a variety of forms, such as: hardware requirements regarding the computing device(s) on which the system is to be deployed (e.g., a minimum processor speed, a minimum amount of memory, a minimum amount of free hard drive space, a minimum amount of network bandwidth available, particular security mechanisms available, and so forth), software requirements regarding the computing device(s) on which the system is to be deployed (e.g., a particular operating system, one or more other applications that also must be installed, specifications regarding how a particular system and/or the operating system is to be configured, a particular type of security or encryption in use, and so forth), other requirements regarding the computing device(s) on which the system is to be deployed (e.g., particular security keys available, data center policies that must be enforced, authentication that is used, environment topology, etc.). A single system as described in SDM document 204 can be validated against multiple different environments as described in different LIMs 206.

Requirements can also go in the other direction—that is, the environment can have constraints or requirements on the configuration of the system that is to be installed (e.g., to implement the standards or policies of the environment). These can be "explicit" requirements that are created by the operator of the environment, such as particular settings or configurations the system must have, particular functionality the system must provide or support, particular security mechanisms the system must support, and so forth. These can also be "implicit" requirements that arise because of a particular configuration of the environment. For example, if a host computing device in the environment is using a particular type of file system then it may not be possible for some actions to be performed using that file system (although it may be possible for those same actions to be performed using another file system).

During the design phase of the system, SDM document 204 can be used to validate the system for one or more particular environment(s) by validation component 208. This is a two-way validation: the system is validated for the environment and the environment is validated for the system. Validation component 208 can validate the environment for the system by comparing the requirements identified in the SDM document 204 with the environment as described in the LIM document 206, and determining whether all of the requirements are satisfied by the environment. Validation component 208 can validate the system for the environment by comparing the requirements identified in the LIM document 206 with the system as described in the SDM document 204 and determining whether all of the requirements are satisfied by the system. If all of the requirements are satisfied by the environment and the system, then the designer or developer knows that the system can be deployed in and will run in the environment. However, if all of the requirements are not satisfied by the environment and/or the system, then validation component 208 can inform the designer or developer of the requirements that were not satisfied, thereby informing the designer or developer of what changes should be made to the SDM document 204 (and correspondingly to the system) and/or to the environment in order for the system to be deployed and run in that environment.

The LIM document 206 can be for an actual environment or alternatively a simulated environment. For an actual environment, the LIM describes an environment that exists or that has been described but not yet created. For example, an actual environment could be a data center currently in existence, or a data center that has been designed but not actually implemented yet. For a simulated environment, the LIM describes an anticipated environment which may not necessarily exist. Various assumptions about the anticipated environment may be made, whereas for an actual environment such assumptions need not be made. Typically, during the design process for a system, the LIM document 206 describes a simulated environment. However, a LIM document 206 describing an actual environment as the environment exists at a particular point in time may alternatively be used during the design phase.

Validation component 208 can be one or more computing devices that are separate from a data center at which the system being developed will be deployed. For example, validation component 208 may be a single computing device or alternatively the validation responsibilities may be distributed across multiple devices. Alternatively, validation component 208 can be one or more of computing devices 102 of a data center at which the system being developed will be deployed.

The SDM enables the functional composition of systems across a horizontal and vertical axis. Composition along the horizontal axis is done with systems and subsystems. Composition along the vertical axis is done with "layers". Applications, services, network topologies, and hardware fulfill a role in a distributed system, but are typically defined independently and owned by different teams or organizations. Layering is accomplished by components defining a set of constraints on a host and vice versa.

Figure 3:
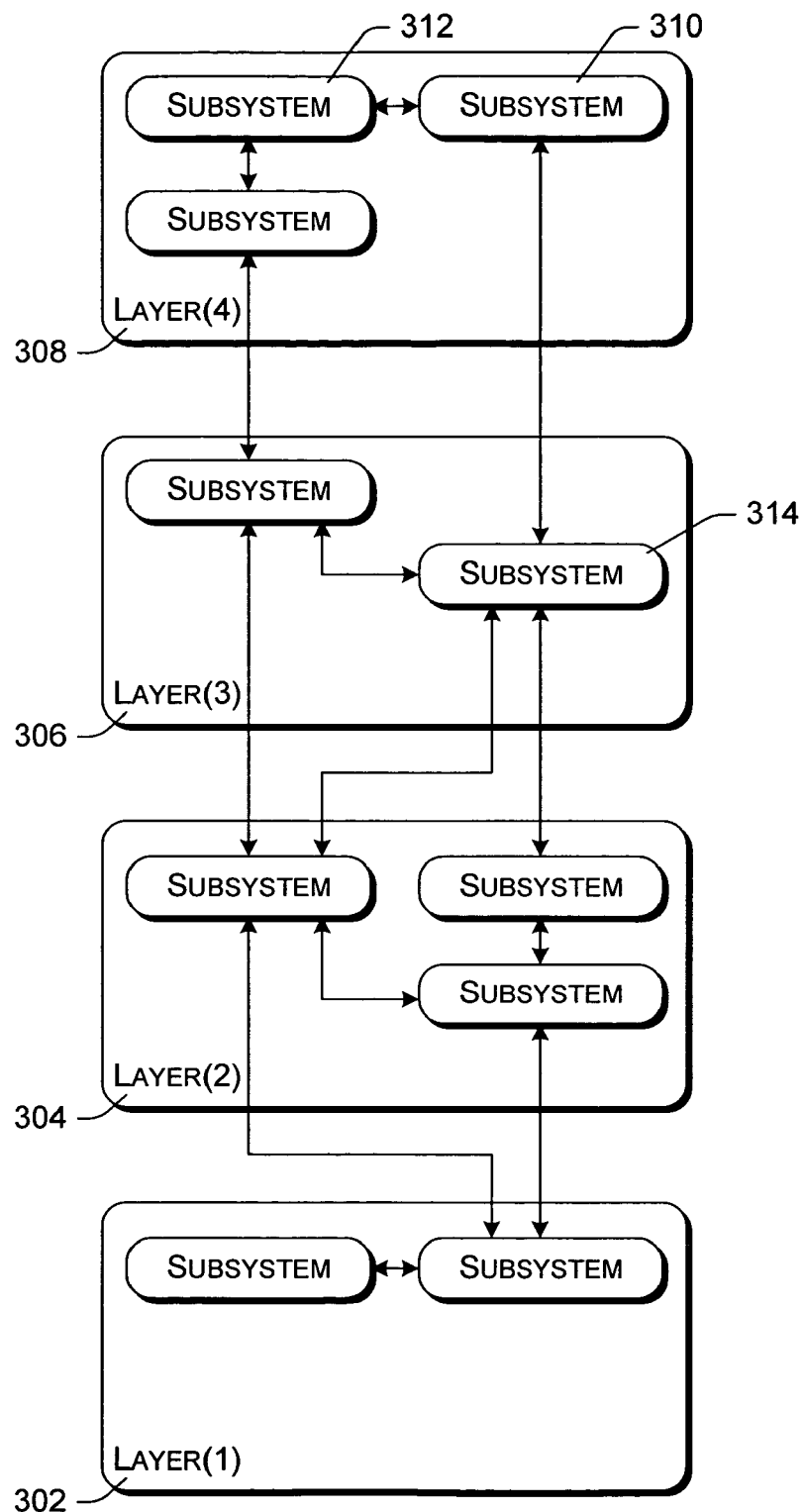
FIG. 3 illustrates an example layered setting.

FIG. 3 illustrates an example layered setting. Four layers are illustrated in FIG. 3: layer 302, layer 304, layer 306, and layer 308. Although four layers are shown in FIG. 3, the actual number of layers can vary, and can be greater or less than four. Additionally, the content of different layers can vary in different embodiments. As can be seen in FIG. 3, the different layers are situated above and/or below other layers (e.g., layer 306 is above layer 304 but below layer 308).

Different systems and subsystems within a layer can interact with one another, and also can interact with systems and subsystems of different layers. For example, a subsystem 310 in layer 308 can interact with a subsystem 312 in layer 308, as well as a subsystem 314 in layer 306. Additionally, each layer can be viewed as the environment for the next higher layer. For example layer 306 is the environment for systems and subsystems in layer 308, while layer 304 is the environment for systems and subsystems in layer 306. Each layer 302, 304, 306, and 308 has its own associated SDM document.

The different layers 302, 304, 306, and 308 can represent different content. In certain embodiments, layer 302 is a hardware layer, layer 304, is a network topology and operating systems layer, layer 306 is an application hosts layer, and layer 308 is an applications layer. The hardware layer represents the physical devices (e.g., computing devices) on which the layered system is built (e.g., devices 102 of FIG. 1). The network topology and operating systems layer represents the network topology of the computing devices (e.g., network setting 100 of FIG. 1) as well as the operating systems installed on those computing devices. The application hosts layer represents applications installed on the computing devices that can host other applications (e.g., SQL Server, IIS, and so forth). The application layer represents applications that are installed on the computing devices that do not host other applications (e.g., entertainment applications such as games, productivity applications such as word processors, reference applications such as electronic encyclopedias, distributed applications such as may be used for web services or financial analysis, and so forth).

Returning to FIG. 2, an application developer is able to design and develop an application using development component 202. As the developer defines various parts of his or her system and how these parts relate to one another, an SDM file 204 that captures these parts and relationships is generated. The developer is able to use validation component 208 to validate the system description against the environment described in LIM file 206. This validation during the design phase is also referred to as "design time validation".

The SDM, which is discussed in more detail below in the section "Example SDM Implementation" is designed to support description of the configuration, interaction and changes to the components in a distributed system (the modeled system). SDM is based on an object-relational model. "Objects" describe entities that exist in a system and "relationships" identify the links between the various entities. Objects and relationships are further defined to capture semantic information relevant to the SDM. In particular, objects are divided into components, endpoints and resources. Relationships are divided into the following: connections (also referred to as communication), containment, hosting, delegation and reference. Further details regarding objects and relationships are provided below.

The SDM includes "abstract definitions" that provide a common categorization of system parts, provide tool support for a wide range of systems and provide the basis for definition checking at design time. A set of abstract definitions provide a comprehensive basis for service design. "Concrete definitions" represent parts of an actual system or data center design. A concrete definition is generated by selecting an abstract definition and providing an implementation that defines the concrete definition's members and setting values for its properties. Applications are generated using collections of these concrete definitions.

The SDM also includes "constraints" that model restrictions based on the allowed set of relationships in which an instance of a relationship can participate. Constraints are useful in describing requirements that depend on the configuration of objects involved in a relationship. For example, a constraint may be used to determine whether participants on each end of a communication protocol are using compatible security settings.

The LIM file 206 and SDM file 204 are input to interface and processing layer 210 of validation component 208. Interface and processing layer 210 controls validation of SDM file 204. Validation component 208 may also be referred to as a compiler.

Interface and processing layer 210 includes a loader 212, a verifier 214, and a simulator 218. Loader 212 parses SDM file 204 and loads any referenced files or types in an in-memory type space. SDM file 204 defines SDM classes (e.g., in XML), which loader 212 translates into SDM classes in the in-memory type space. Verifier 214 checks whether there are any errors in SDM file 204, verifying that SDM file 204 is written appropriately in order for loader 212 to load SDM file 204. If verifier 214 or loader 212 encounters an error, an error is returned to development component 202, optionally including an indication of the problem that caused the error.

Verifier 214 also "walks" the type space, checking setting values, types, and SDM file references. Typically, if an error is encountered by verifier 214 or loader 212, the design time validation is terminated.

Simulator 218 then simulates the environment defined by LIM document 206, invoking expansion engine 220, flow engine 222, and constraint engine 224 as discussed below. Any errors encountered by simulator 218 are returned to component 202 (e.g., as results 226), optionally including an indication of the problem that caused the error. Typically, if an error is encountered by simulator 218, an indication of the error is returned to development component 202, but the design time validation continues.

Interface and processing layer 210 invokes expansion engine 220, flow engine 222, and constraint engine 224 to perform the validation of SDM file 204. Generally, expansion engine 220 expands the set of actions to create an instance space based on SDM file 204 to add all additional instances and actions required including by-value children and relationships, or remove appropriate instances and relationships. Flow engine 222 "walks" over the instance "graph" and finds the flows defined on the instances, and sets the values in the flows to the appropriate values. Constraint engine 224 "walks" over the instance space and finds and evaluates each constraint member.

In certain embodiments, if all of the constraints are evaluated to true (that is, all of the constraints are satisfied), and validation component 208 encounters no errors when processing SDM document 204, then validation component 208 digitally signs SDM document 204. This digital signature indicates that SDM document 204 has been successfully compiled. SDM document 204 can be digitally signed in any of a variety of different manners, typically involving generating a digital signature based on the SDM document 204 and a public/private key pair associated with validation component 208. So, digitally signed SDM documents can be subsequently treated (e.g., when they are deployed) as already having been validated. The digitally signed SDM document is also referred to as a compiled SDM document.

In addition to evaluating the various constraints, validation component 208 may also update references to other SDM documents with the full name (and optionally version) of those referenced documents. So, the compiled SDM document would include the these full names. For example, an SDM document may import another SDM document and reference that other SDM document by name but not version, and when validation component 208 imports that referenced document, the version of the imported document is identified and added to the compiled SDM document.

The discussions herein make reference to various members or definitions that may be included in SDM document 204. A definition defines how particular instances are to be created in the instance space. In other words, a definition defines what is possible. A member describes a particular use or scenario based on a definition. For example, a definition describes what is possible for a particular instance, and a member describes which of those possibilities is included in a particular instance. The following table illustrates examples of members or definitions, as well as a summary description of each member or definition.

| Member/Definition | Description |
| --- | --- |
| abstract | A type that is used to define the settings required to act on a modeled system object. |
| communication | Describes a communication relationship between endpoint members. Used to describe interaction between independently deployed software elements. |
| constraint | Describes a restriction. Can be used to identify restrictions on setting values of members of a definition or on the participants in a relationship. |
| containment | The containment relationship definition declares that one type can contain another type. The containment relationship member declares that one object member contains another object member. |
| delegation | Describes a delegation relationship between endpoint members. Used to allow one system to forward behavior to another system. |
| endpoint | Describes a communication endpoint. |
| flow | Describes a particular transform to apply to a set of setting values. |
| hosting | Describes a hosting relationship between object members. Used to indicate that a guest requires a host in order to be constructed (e.g., a web service object definition may require an IIS object host). |
| manager | Describes a mechanism by which types and relationships can insert custom behavior. Can be used to provide the implementation for complex constraints and flows. |
| object | Describes an entity that exists in the system being modeled (even if a simulated environment), such as system definitions used to describe independently deployable parts of an application, or communication endpoints that a system may expose. |
| reference | Sets up a reference relationship between object members. Used to capture dependencies between object members. |
| relationship | Describes the relationship between object members when they are created. |
| resource | Describes specific elements that can be identified as part of a system definition. |
| subsystem | Describes a collection of data, software, and/or hardware elements that can be treated as complete systems but are typically part of a larger system. |
| system | Describes a collection of data, software, and/or hardware elements. |

The engines discussed herein make reference to a by value member, a by reference member, expansion, a listener, and a top-level definition. A by value member refers to a member for which an instance is created automatically during expansion. In certain implementations, a by value member cannot be abstract. A by reference member is a member for which an instance cannot be created automatically by the expansion engine during expansion. Rather, an external source listening for an event in the expansion engine creates the instance (e.g., interface and processing layer 210 may create the instance during simulation, or may query (e.g., through a user interface) the designer or developer to create the instance during simulation or deployment).

Expansion refers to the process where, given a root instance, the instance space is populated with respect to the root instance. All of the members of the root instance are created recursively. By reference members are not created by the expansion engine, but are created by an external source.

The listener (e.g., simulator 218) is notified when an event is triggered. An example of such an event is the need for a by reference member to be created. A top-level definition refers to a definition that is defined at the root level in the SDM document. An SDM document typically has only one top-level definition, although in alternate embodiments an SDM document may have two or more top-level definitions.

Figure 4:
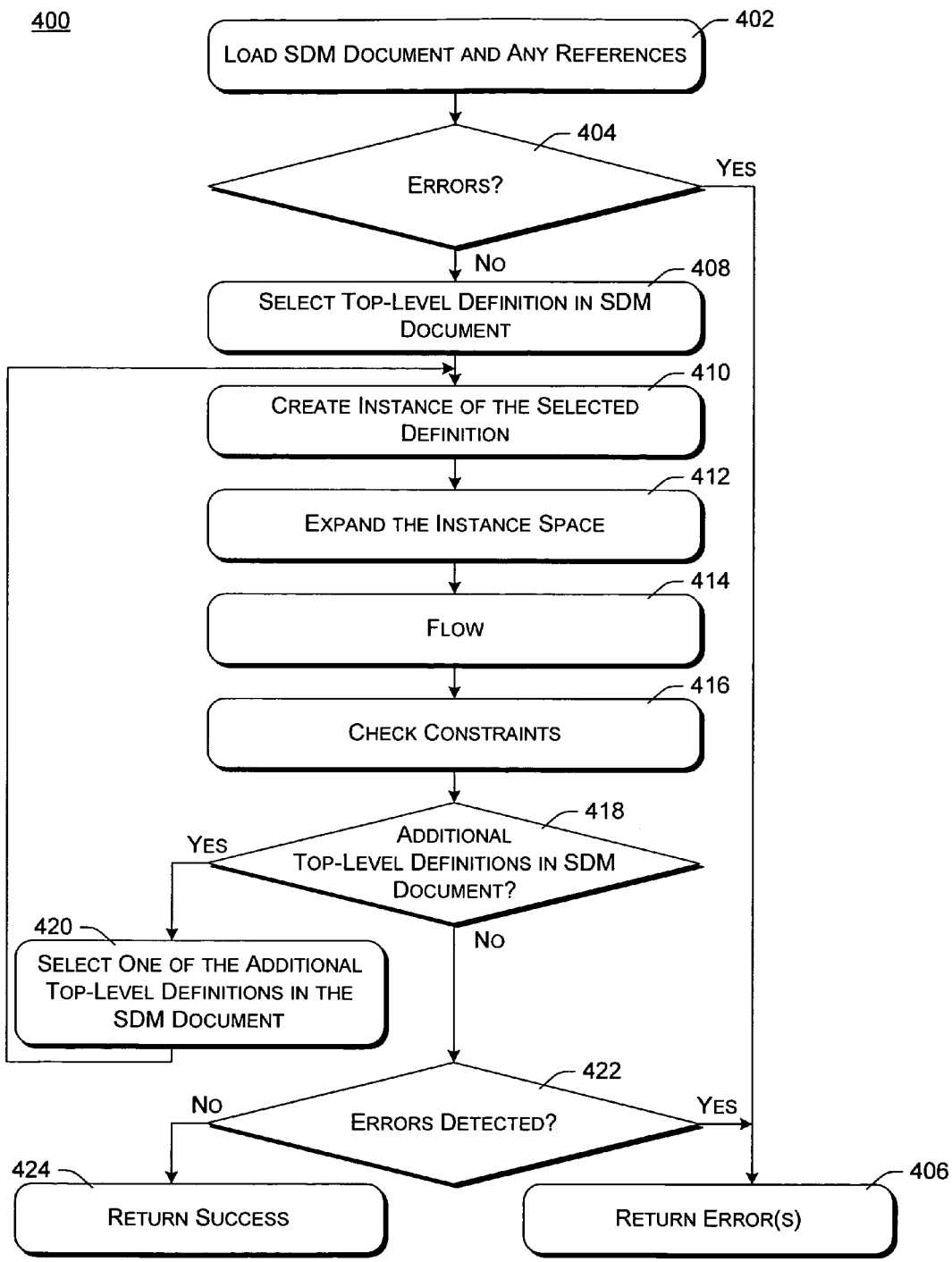
FIG. 4 is a flowchart illustrating an example process for design time validation.

FIG. 4 is a flowchart illustrating an example process 400 for design time validation. Process 400 is implemented by validation component 208 of FIG. 2, and may be performed in software, firmware, hardware, or combinations thereof.

In response to a request to create, delete, or modify a system, the SDM document and any references associated with the SDM document are loaded (act 402), optionally verifying that the SDM document can be loaded. In certain embodiments, the LIM document(s) will have already been loaded and the instance space(s) described by the LIM document(s) already created. However, if this has not yet occurred, then the LIM document(s) is loaded and the instance space(s) described by the LIM document(s) is created in act 402. In certain embodiments, the instance space(s) described by the LIM document(s) is created by using the expansion, flow, and constraint engines as described herein prior to loading the SDM document in act 402.

A check is then made as to whether there are any errors in the SDM document (act 404) or the type space created when the SDM document is loaded. The check in act 404 refers to the structure or format of the SDM document itself, not the system being designed. For example, in act 404 a check may be made to verify that the format of the SDM document is proper (e.g., that the document is in proper XML format), or that there are no unknown elements or types in the SDM document, or that type references in the SDM document are valid, and so forth. If there are any errors, then an indication of those errors is returned (act 406) and process 400 ends. These errors can be returned to development component 202 of FIG. 2 as, for example, results 226.

However, if there are no errors, then a top-level definition in the SDM document loaded in act 402 is selected (act 408). In certain embodiments, there is only one top-level definition in the SDM document. An instance for the selected definition is then created (act 410), and the instance space is expanded (act 412). The top-level definition is used as the starting point for expansion, which is performed by expansion engine 410 of FIG. 4. The instance space is expanded by analyzing the top-level definition and creating an instance of each member of the root instance, then analyzing each of those created instances and creating instance(s) for each of their members, and so on. This process is discussed in more detail below under the heading "Expansion Engine".

When the expansion based on the top-level definition is completed, the flows defined on the instances in the expanded instance space are identified, and the values in the flow are set to the appropriate values (act 414). This process is discussed in more detail below under the heading "Flow Engine".

After the values from evaluating the flows are set, constraints are checked (act 416). Each constraint member in the instance space is evaluated as part of the constraint checking, as discussed in more detail below under the heading "Constraint Engine". These constraints are typically checked against settings in the simulated environment that the system is being verified against (e.g., as described in LIM 206).

After the constraint checking is completed, a check is made as to whether there are any additional top-level definitions in the SDM document that have not yet been selected (act 418). If there are one or more additional top-level definitions in the SDM document, then one of those additional top-level definitions is selected (act 420) and processing returns to act 410 where an instance of the selected top-level definition is created.

However, if there are no top-level definitions that have not yet been selected, then a check is made as to whether any errors are detected (act 422). These errors in act 422 refer to errors and/or warnings generated during the expansion of act 412, the flow of act 414, and the constraint checking of act 416. If there are any errors or warnings, then an indication of those errors or warnings is returned (act 406) and process 400 ends. These errors can be returned to development component 202 of FIG. 2 as, for example, results 226.

However, if there are no errors, then the design time validation process of FIG. 4 was successful and an indication of success is returned (act 424). The indication of success can be returned to development component 202 of FIG. 2 as, for example, results 226.

By returning errors and/or warnings to development component 202 in act 406, or an indication of success in act 424, the result of the design time validation of the system described in SDM document 204 is returned to development component 202. These errors and/or warnings, or indication of success, can also be presented to the designer using development component 202, allowing the designer to be informed of whether the system being designed (and described in SDM document 204) has been validated, or whether there are potentially problems. By returning an indication of the specific errors and/or warnings to the designer, the designer can be better informed as to what the potential problems are and how to resolve them (or whether they even need to be resolved). This feedback can be given to the designer during the design process, not requiring the designer to attempt to deploy the system at a data center before finding out that there are problems with the designed system.

Simulation

As discussed above, interface and processing layer 210 of FIG. 2 simulates an environment as defined in LIM document 206. This allows the system described by SDM document 204 to be validated against an expected environment during design of the system, allowing errors to be identified prior to deployment of the system to the environment.

Many instances within the instance space can be created by the expansion engine, as discussed in more detail below. However, some of the instances are created by simulator 218 rather than the expansion engine. In certain embodiments, the instances created by simulator 218 are top-level definitions and by reference members. In certain implementations, each top-level definition is simulated in its own instance space.

Simulator 218 simulates two categories of definitions that are found at the root of the document being compiled (these are referred to as top-level definitions): (1) system definitions, and (2) hosting definitions in which the host and guest are system definitions. These two categories of definitions are largely stand-alone definitions for which instances can be created by simulator 218. Other definitions are generally only used in the context of other definitions and therefore are created by expansion engine 220. In certain embodiments, simulator 218 does not simulate abstract definitions, as such would typically result in little, if any, meaningful validation.

System definitions are simulated by creating an instance for the definition and adding the instance as the root instance of an instance space. The members and nested members of the instance are then instantiated by invoking expansion engine 220.

Simulation of a hosting definition provides validation between a host and guest. In certain embodiments, an instance of a hosting relationship is not used as a root instance, so a special root instance is created before the expansion engine is invoked. This special root instance is a system definition having three members: (1) a system definition for a host of the hosting relationship; (2) a system definition for a guest of the hosting relationship; and (3) a hosting definition associated with the instances of the host and guest system definitions of the first two members. Expansion engine 222 is then invoked to instantiate the members and nested members of the special root instance.

Expansion engine 220 does not create instances of by reference members because the number of instances to create is unknown and is determined by the deployment environment. Additionally, the by reference member can be abstract, so that the concrete definition used to instantiate the member is not known. Human intervention (e.g., by a system administrator) is usually employed to answer these questions during deployment. Such intervention could optionally be employed during design time validation as well. However, more typically, interface and processing layer 210 (e.g., simulator 218) simulates what the human operator might choose as follows, thereby alleviating any need for human operator intervention during the simulation. Simulator 218 creates a number of instances of the member equal to the greater of one or a minimum number of occurrences (e.g., as specified in a parameter MinOccurs for the by reference member). If the by reference member is abstract then simulator 218 will not create an instance of the member, but will return an informational warning to the user (e.g., indicating that an abstract by reference member could not be simulated).

Expansion Engine

Expansion engine 220 allows broad commands to be input to validation component 208 and expands those commands out to identify the appropriate objects and relationships affected by those commands. Typically, these broad commands are commands to create or delete particular objects or relationships (e.g., a command to create a web application, or a command to delete a web application). Expansion engine 220 expands the set of actions to create an instance space based on SDM file 204 to add all additional instances and actions required including by-value children and relationships, or remove appropriate instances and relationships.

Initially, after an instance of a top-level definition (also referred to as a top-level instance) is created during simulation, expansion engine 220 is invoked to populate the instance space. A root instance is passed to expansion engine 220 as the starting location of the expansion. The instances created by the expansion will be relative to the root instance. The first time that expansion engine 220 is invoked for a particular instance space, the root instance passed to expansion engine 220 is a top-level instance (an instance of a top-level definition). However, expansion engine 220 can be, and typically is, called recursively so that members and nested members of the top-level instance will be the root instance for such recursive calls.

Expansion engine 220 begins by creating instance(s) of each member of the root instance. As each member is instantiated, it is examined for nested members. Any members that are defined within another member are referred to as being nested within that other member. Nesting of members can occur through multiple levels (e.g., a member may have nested members defined within it, and each of those members may have nested members defined within them, which in turn may each have nested members defined within them, and so forth). The expansion process is performed recursively on each of the members and nested members until the instance space is completely created with respect to the root instance.

In certain embodiments, only a subset of the various types of members is instantiated during expansion. This subset of instances created during expansion include the following object members: Subsystem, Resource, and Endpoint. This subset of instances created during expansion also includes the following relationship members: Containment, Communication, Hosting, Delegation, and Reference. Other members that are not included in this subset are not instantiated by expansion, but rather when one of the above instances is created by expansion, the creation process examines the member or definition and automatically creates instances of child members for these other members. Examples of these other members include flow members and constraint members.

In certain embodiments, when instances of a member already exist when expansion engine 220 is called, the instances will not be created again. However, expansion engine 220 continues recursively on each instance to verify that the instance space is fully created (and will create any nested members from this recursive calling that have not been created yet).

Figure 5A:
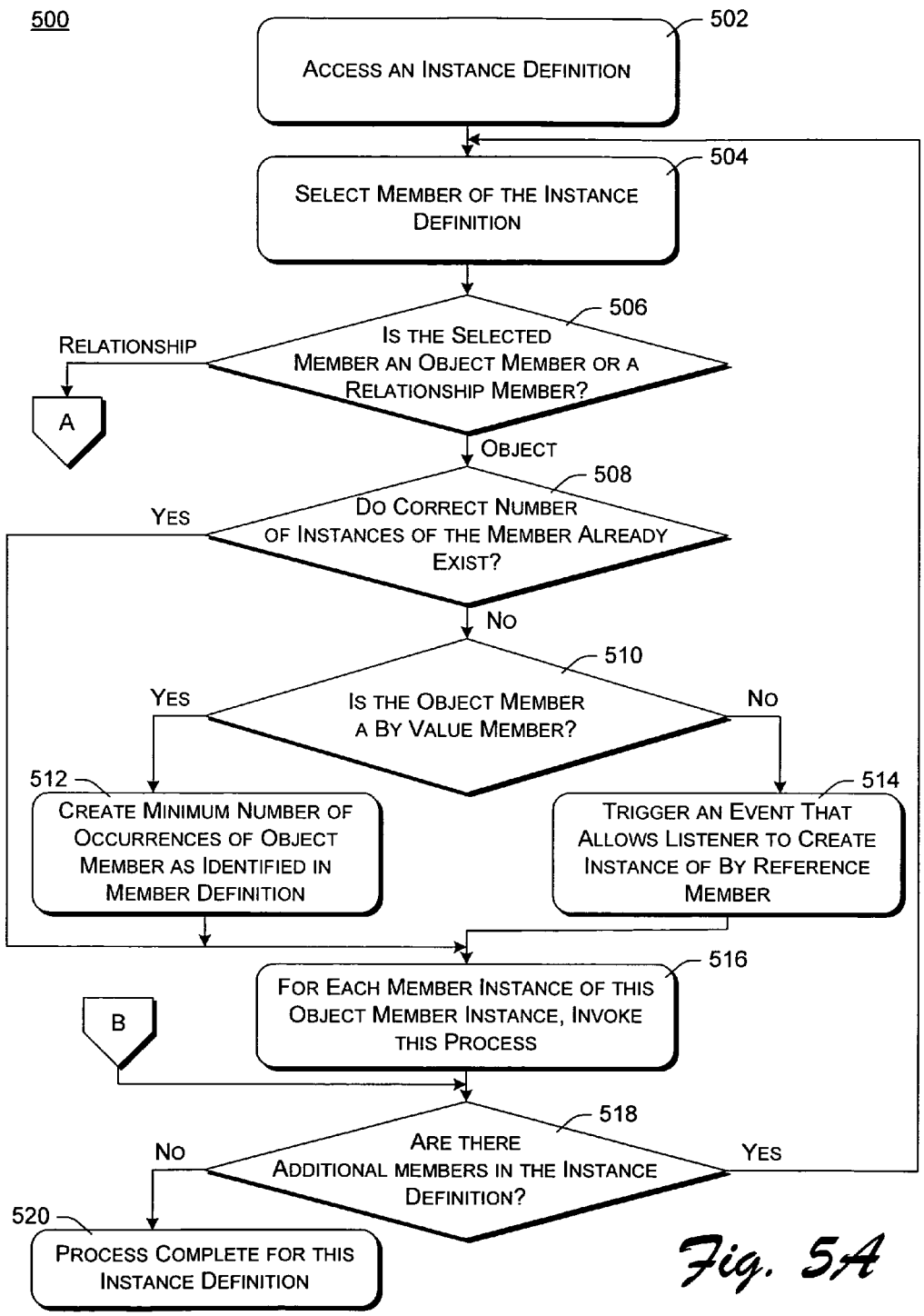
FIGS. 5A and 5B are a flowchart illustrating an example recursive expansion process that creates an instance space.
Figure 5B:
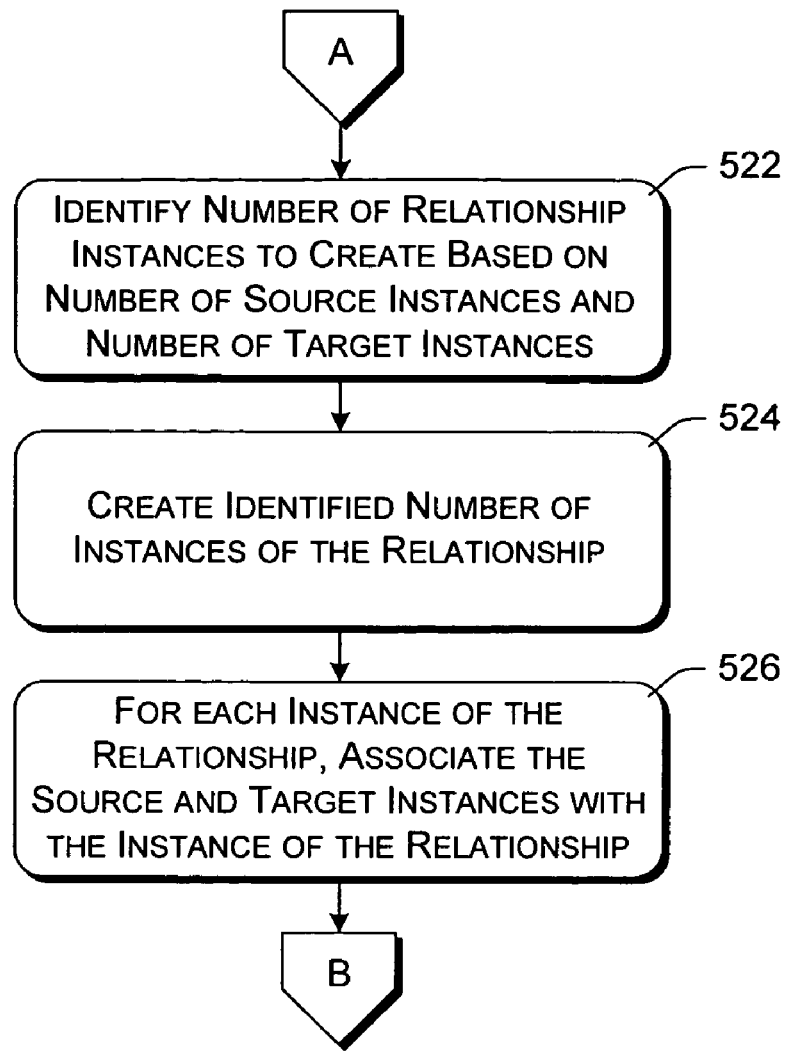

FIGS. 5A and 5B are a flowchart illustrating an example recursive expansion process 500 that creates an instance space. The instance space is defined by an SDM document, such as SDM document 204 of FIG. 2. Process 500 is implemented by expansion engine 220 of FIG. 2, and may be performed in software, firmware, hardware, or combinations thereof.

Initially, an instance definition is accessed (act 502). When invoked, expansion engine 220 is notified of an instance definition that is to be expanded (the root instance as discussed earlier in this section), and this instance definition is accessed in act 502. Expansion engine 220 may be passed the instance definition, may be passed an identifier (e.g., a pointer) of where the instance definition is located, or may otherwise be notified of where and/or how the instance definition can be accessed. Process 500 may be invoked by simulator 218 with the instance definition being a top-level definition, or alternatively may be invoked by process 500 itself recursively.

A member of the instance definition is then selected (act 504). Members can be selected from the instance definition in any order, and typically are selected in the order in which they appear in the SDM file defining the instance space. In certain embodiments, all object members are selected prior to any relationship members being selected.

A check is then made as to whether the selected member is an object member or a relationship member (act 506), and process 500 continues based on the result of this check. If the selected member is an object member, then a check is made as to whether the correct number of instances of the selected member already exist in the instance space being created (act 508). Each member includes an indication of how many instances of the member should be created. In certain embodiments, a default value of one instance is used, so that one instance of each member is created (whether explicitly specified in the member or not) unless the member specifies that more instances are to be created.

If the correct number of instances do not already exist, then a check is made as to whether the object member is a by value member (act 510). If the object member is a by value member than the minimum number of occurrences of the object, as specified in the member definition, are created (act 512). However, if the object member is not a by value member, then it is a by reference member, so an event is triggered that allows a listener (e.g., simulator 218 of FIG. 2) to create an instance of the by reference member (act 514).

After the instance(s) of the object member is created, whether in act 512 or act 514, or if it was determined that the correct number of instances of the member already exist in act 508, process 500 continues to act 516. In act 516, process 500 is invoked for each member instance of the instance(s) created in act 512 or act 514 (or the instance(s) that were determined to have already been created in act 508). When invoking process 500 recursively, each member instance for which process 500 is invoked becomes the instance definition for the invoked process 500. Thus, process 500 is called recursively on object members until all instances are created in the instance space.

Additionally, a check is made as to whether there are additional members in the instance definition that have not been selected in act 504 (act 518). If there are one or more such additional members in the instance definition, then process 500 returns to act 504 where one of those members is selected. However, if there are no such additional members in the instance definition, then process 500 is complete for this instance definition.

Returning to act 506, if the selected member is a relationship member, process 500 identifies the number of relationship instances to create based on the number of source instances and the number of target instances involved in the relationship (act 522 of FIG. 5B). The number of relationship instances to create is determined by multiplying the number of source instances by the number of target instances, with the result being the number of relationship instances that are to be created. The identified number of instances of the relationships are then created (act 524).

Alternatively, multiplying the number of source instances by the number of target instances may result in a maximum number of relationship instances, and only a subset of that maximum number may be created in act 524. For example, if multiple possible hosts exist, then only one may be selected in act 524. Analogous to by reference members discussed above, a listener (e.g., a human operator or simulator 218) may be called upon to select the subset of relationship instances. Simulator 218 may be configured or programmed, for example, with various criteria to be used or rules to follow to determine which subset of relationship instances to create.

The relationship instances are created in different manners depending on the type of the relationship member. In certain embodiments, the following types of relationship members can be used: a containment definition member, a communication definition member, a reference definition member, a hosting definition member, and a delegation definition member. A containment definition member is a one-to-many relationship, which associates the parent with each instance of the child member. A containment definition member describes that one object member can be contained in another object member. A communication definition member is a many-to-many relationship, which associates all combinations of server and client member instances. A communication definition member describes an interaction between independently deployed software elements. A reference definition member is a many-to-many relationship, which associates all combinations of dependent to source member instances. A reference definition member is used to capture dependencies between instances (in addition to the hosting definition member). These dependencies can be used, for example, to control construction order during deployment and flow parameters between systems during installation and update. A hosting definition member is a one-to-many relationship, which associates a host with each of its guest's member instances. A hosting definition member is used to identify that a guest requires a host in order to be constructed. A delegation definition member is a one-to-one relationship that associates communication endpoints of two systems. A delegation definition member is used to forward behavior from one system to another (e.g., forwarding all interaction that would have been directed to one system to the endpoint on the other system).

For each instance of the relationship, the source and target instances are associated with the instance of the relationship (act 526). Process 500 then returns to act 518 of FIG. 5A, where a check is made as to whether there are additional members in the instance definition to be selected.

Process 500 is thus invoked recursively, with the various object and relationship instances being created as the process is recursively invoked. The recursive expansion process knows when it has completed creating the instance space when all member instances have been created.

Due to the recursive nature of the expansion process, the resultant instances are linked to one another with the top-level instance being the entry point for flow engine 222 and constraint engine 224 of FIG. 2. The instance space thus created can be viewed as an instance tree, with each node of the tree representing a member instance. Additionally, each node of the tree (except for the top-level node) is linked to a parent node that represents the member instance that invoked the expansion process to create that node of the tree. Furthermore, each node of the tree is linked to zero or more children nodes that are members of the member instance of that node of the tree. The recursive expansion process knows that it has completed creating an instance graph when the leaf members do not have any nested members (e.g., all leaf members have zero children nodes). Additionally, in order to avoid situations where the expansion process may end up infinite due to a definition having a member that is of its type, in certain embodiments the expansion process will only choose to create instances if the definition is not already instantiated as an ancestor instance. For example, if there is a definition of a directory and it has a directory in it, then the expansion engine will stop expanding this once there is a single directory.

Flow Engine

After expansion engine 220 has completed the expansion process, simulator 218 calls flow engine 222 on the instance space resulting from the expansion process. Flow engine 222 "walks" over the instance graph of the instance space and finds the flow instances defined in the instance graph. Flow engine 222 then sets the values in the flows to the appropriate values.

Settings can be declared on definitions in SDM file 204, and corresponding setting values can exist on the instances created from these definitions. Setting values can be non-calculated setting values or calculated setting values.

Non-calculated setting values are setting values that are set by a default value or initial value from a definition (e.g., in SDM file 204), or that are set by the user who sets the value explicitly. Non-calculated setting values may be restricted to being set only on creation of the SDM instance they belong to or alternatively they may be altered over the life of the SDM instance. Non-calculated setting values are not the output of a flow, but they may act as an input to a flow.

Calculated setting values are setting values that are the output of a flow. As a result, the flow can set the value of a calculated setting value, but other entities typically cannot. In certain implementations, there can only be one flow supplying the value for a particular calculated setting value. In such implementations, if multiple flows output to the same setting value instance, then an error is reported and the output of the flow is set to an error state. Calculated setting values are based on one or more inputs. These inputs can be calculated setting values and/or non-calculated setting values.

In certain embodiments, calculated setting values can be separated into two categories: configuration values and non-configuration values. Configuration values are values computed by flows that result in configuration of the SDM instance they are part of. For example, the full path to a file or a database name would be configuration values.

Non-configuration values are values that are computed by flows but that do not result in configuration. Rather, they exist only as commutated values for constraints. For example, the resulting web.config setting taking into account all the inherited web.config values would be a non-configuration value. Another example of a non-configuration value would be the resulting access control list on a file taking into account the configured access control lists on the file as well as the file's containing directories and volume.

Flow engine 222 may optionally treat configuration value and non-configuration values differently. For example, configuration values may be given a higher priority, and thus flows that set configuration values may be evaluated before flows that set non-configuration values.

Generally, flow is evaluated by identifying flow instances in the instance space, and identifying the values of the inputs to the flow instances (e.g., identifying the setting values of other instances that are sources of these inputs). A module or set of instructions is referenced by the flow instance, the module or set of instructions being able to process a flow function corresponding to the flow instance. The flow function is processed, based on the values of the inputs, and a result of the flow function is obtained. The result of the flow function is set as the output of the flow instance. A flow can have zero or more input values and one or more outputs (e.g., setting values for one or more instances may be set based on the output of the flow).

Any of a wide variety of flow functions can be used. Flow functions may be defined by the developer of the system and/or by other parties. For example, the same designer as is creating SDM file 204 may define one or more flow functions. By way of another example, the manufacturer of development component 202 or some other third-party developer may define one or more flow functions. The flow functions themselves can include any of a variety of calculations and/or operations, such as: calculations employing algebra, geometry, calculus, etc.; date and/or time based calculations; random value calculations; and so forth.

In certain embodiments, flow members defined in SDM file 204 are associated with a manager definition. The manager definition, in turn, includes a pointer to a set of instructions or code that can be executed to process the flow function. Thus, to evaluate the flow for a flow instance, the associated manager definition is identified and the associated manager is instantiated (if not instantiated already). The pointer to the set of instructions or code is obtained from the manager, which allows the set of instructions or code to be obtained and executed in order to determine the flow output.

Additionally, in certain embodiments the managers may also support type conversion. In such embodiments, the manager allows a flow to be based on two or more setting values that are of different types. For example, the input value may be a different type than the output type. The manager exposes one or more methods that allow such type conversions to be made, or alternatively includes a pointer to a set of instructions or code to be obtained and executed in order to perform the conversion. Different conversions can be supported by different managers (e.g., the manager designers can design the managers to support whatever type conversions they desire).

Figure 6A:
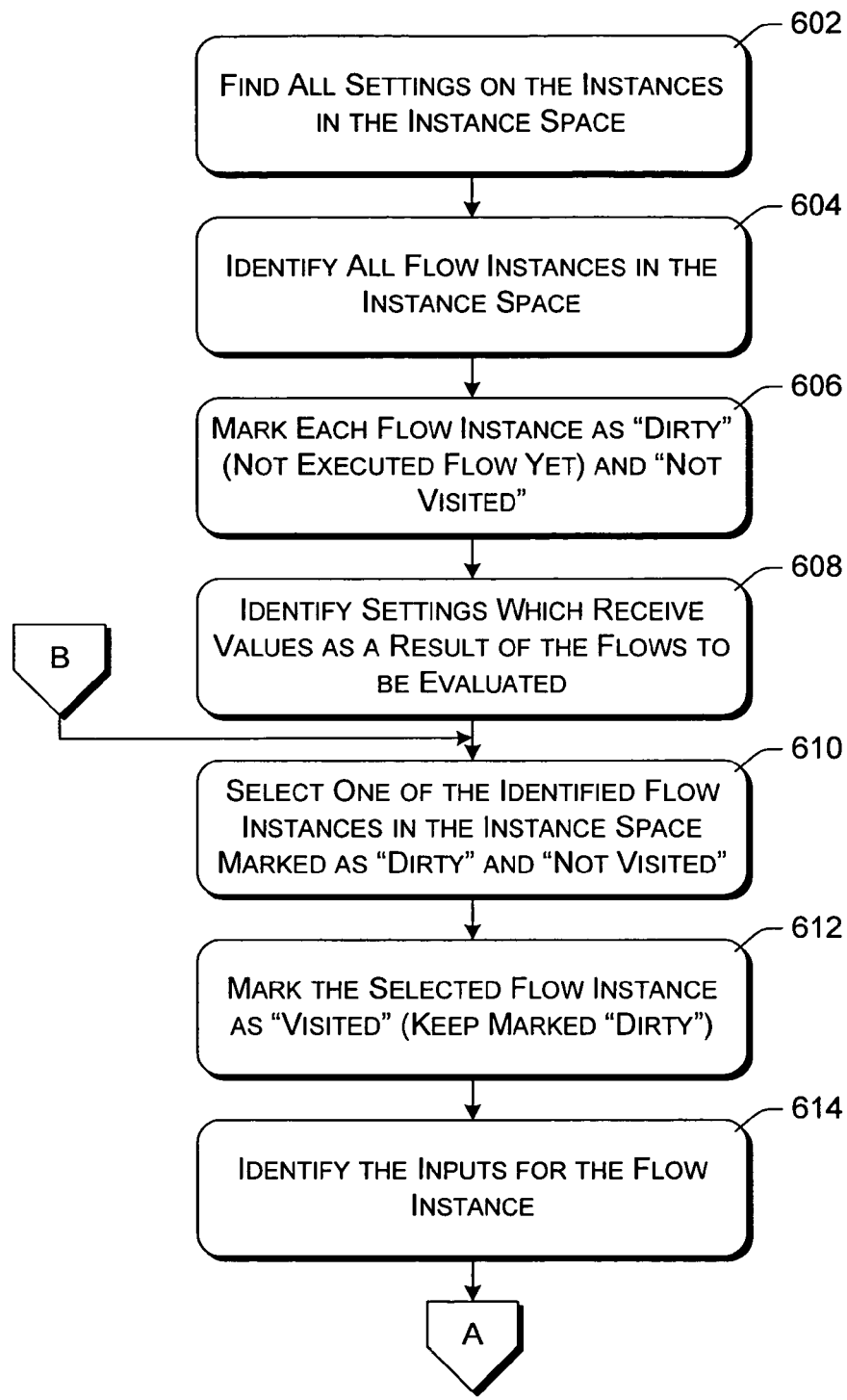
FIGS. 6A and 6B are a flowchart illustrating an example process for evaluating flows.
Figure 6B:
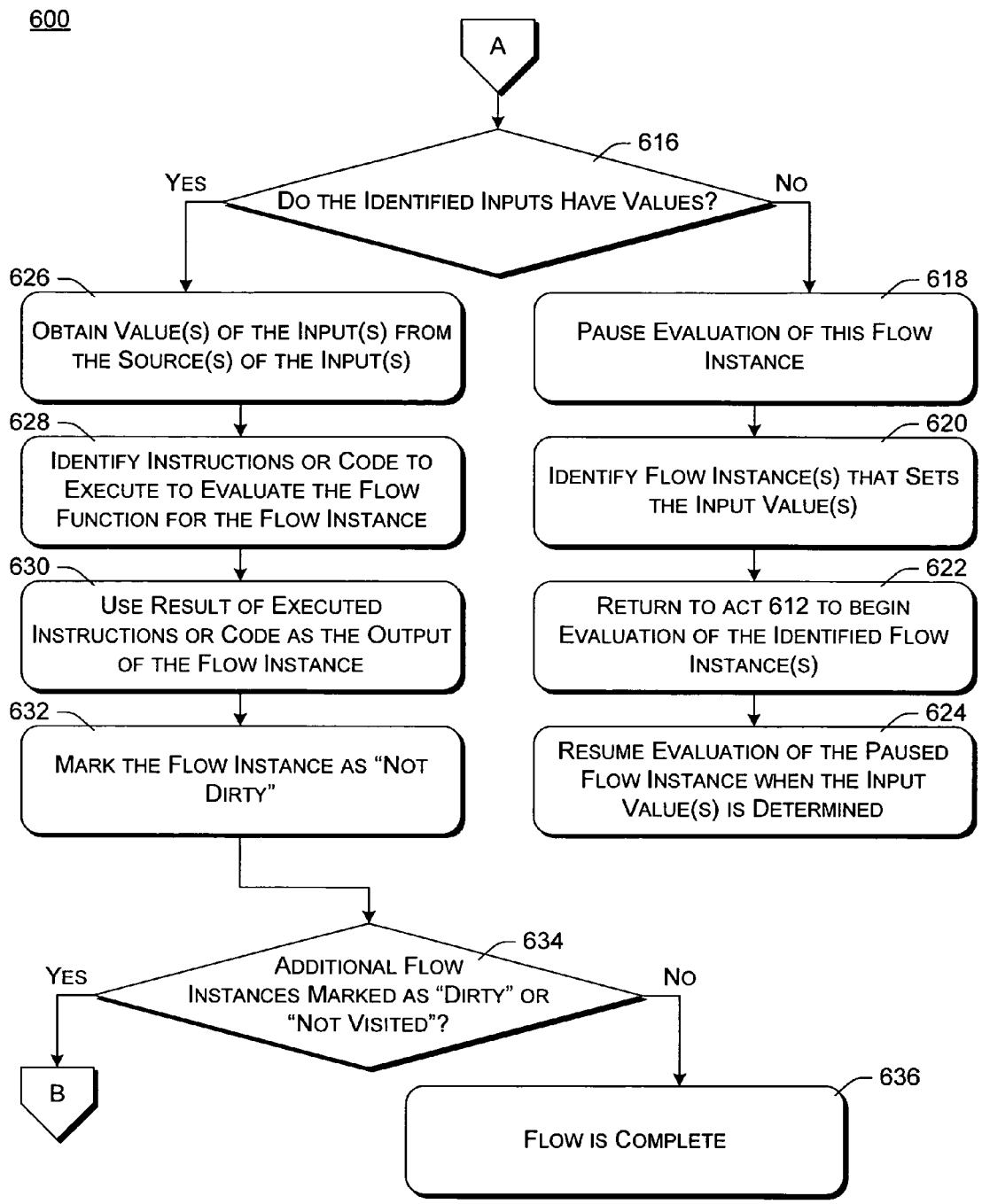

FIGS. 6A and 6B are a flowchart illustrating an example process 600 for evaluating flows. Process 600 is implemented by flow engine 222 of FIG. 2, and may be performed in software, firmware, hardware, or combinations thereof.

Initially, all settings on the instances in the instance space are found (act 602). These settings can be found in different manners, such as by checking each node in the instance graph for setting values. All flow instances in the instance space are then identified (act 604). Each flow instance in the instance space is marked as "dirty" and "not visited" (act 606). The marking of "dirty" indicates that the flow has not been executed or evaluated yet. The marking of "not visited" indicates that execution or evaluation of the flow has not yet begun. The marking of flow instance can be performed in a variety of different manners. For example, each flow instance may have a "dirty" flag that can be set to mark the flow instance as "dirty", and a "not visited" flag that can be set to mark the flow instance as "not visited". By way of another example, flow engine 222 may maintain a list, table, or other data structure(s) in which engine 222 can keep a record of flow instance and their associated markings.

The settings that receive values as a result of the flow instances are then identified (act 608). In act 608, all of the calculated setting values are identified. The settings themselves indicate whether they are calculated setting values or non-calculated setting values (e.g., they may have a flag or attribute, such as a "fixed" attribute, that can be set to indicate that they are non-calculated setting values). A dependency graph that identifies value dependencies may also optionally be generated in act 608. The dependency graph indicates, for each setting value, which other setting values it relies on (that is, the other setting values that are its inputs) and which other setting values rely on it (that is, the other setting values that use it as an input).

One of the flow instances identified in act 604 that is marked as "dirty" and "not visited" is then selected (act 610). The flow instances can be selected in any order, such as the order in which the flow instances were identified in act 604, randomly, based on number of input values, and so forth. The selected flow instance is then marked as "visited", but remains marked as "dirty" (act 612). This indicates that evaluation or execution of the flow associated with the flow instance has begun, but that the flow has not been executed or evaluated yet (e.g., the output value for the flow has not yet been determined).

The inputs for the flow instance are then identified (act 614). Each flow instance has a parameter identifying the source (e.g., a particular setting value of another instance) for each of its inputs. A check is then made as to whether the identified inputs have been assigned values yet (act 616 of FIG. 6B). Inputs that are non-calculated setting values will have been assigned values, as will inputs that are calculated setting values calculated by flow instances that have already been evaluated. However, calculated setting values calculated by flow instances that have not yet been evaluated will not have values assigned yet (e.g., they may have a null value).

If one or more of the identified inputs do not have values assigned, then evaluation of this flow instance (selected in act 610) is paused (act 618). The evaluation is paused in order to allow the input values to be calculated. For each input that does not yet have a value, the flow instance that sets the input value is identified (act 620). Process 600 then returns to act 612 of FIG. 6a to begin evaluation of that flow instance (act 622). Evaluation of the flow instance that was paused in act 618 is then resumed when all of the inputs have values (act 624). Evaluation can be resumed, for example, at act 616 or act 626 discussed below. It should be noted that evaluation of one or more of the flow instances identified in act 620 may itself be paused due to identified inputs not yet having values.

Returning to act 616, if the identified input(s) have values, then the value(s) of the input(s) is obtained from its source(s) (act 626). The value(s) can be obtained from different sources, such as from SDM file 204, from objects instantiated based on SDM file 204, from flow instances (the output of flow), and so forth. The set of instructions or code that is to execute to evaluate the flow function for the flow member is then identified (act 628). Alternatively, rather than a set of instructions or code that are executed, the flow function may be implemented in hardware. The set of instructions or code is then executed, and the result of the executed set of instructions or code is then used as the output of the flow instance (act 630), also referred to as the output of the flow.

The flow instance is then marked as "not dirty" to indicate that the flow has been executed or evaluated (act 632). The flow instance should have already been marked as "visited" in act 612, however, if the flow instance has not already been marked as "visited" then the flow instance can also be marked as "visited" in act 632.

A check is then made as to whether there are additional flow instances identified in the instance space that are marked as "dirty" or "not visited" (act 634). If there are any such additional flow instances, then process 600 returns to act 610 of FIG. 6A, where one of such additional flow instances is selected. When all flow instances have been evaluated (e.g., none of the flow instances identified in act 604 are marked as "dirty" or "not visited"), then the flow evaluation process 600 is complete (act 636). When flow is complete, simulator 218 has a complete instance space with values for settings.

Process 600 is described in FIGS. 6A and 6B as pausing evaluation of a flow instance having inputs that do not yet have values and evaluating the flow instance(s) that set those values. However, process 600 may be implemented in alternate manners. For example, rather than evaluating the flow instance(s) that set those values, process 600 could return to act 610 of FIG. 6A where one of the flow instances is selected (without regard for whether it sets an input value for the paused flow). Evaluating flow instances in this alternate manner could result in the situation where evaluation of some flow instances is complete but evaluation of all other flow instances is paused. When this situation arises, act 616 can be repeated for each paused flow instance to determine whether the identified inputs have values. The inputs for at least one of the paused flow instances should have values, and this process of repeated act 616 can continue until all flow instances have been evaluated.

Flow engine 222 also detects circular references during the flow evaluation process of FIGS. 6A and 6B. Circular references refer to situations where one or more flow instances each rely (either directly or indirectly) on the output of the other for at least one of their inputs. For example, flow instance A has an output value that is also an input value to flow instance A. By way of another example, flow instance A has an input value that is the output from flow instance B, while flow instance B has an input value that is the output from flow instance A. By way of yet another example, flow instance A has an input value that is the output from flow instance B, flow instance B has an input value that is the output from flow instance C, and flow instance C has an input value that is the output from flow instance A. Such circular references are not evaluated, but rather are detected by flow engine 222 and the setting values in the circular references are set to an error state.

Circular references can be detected using the "dirty" and "visited" markings. When evaluation of a flow is paused in act 618 discussed above, the flow is marked as "visited" but also marked as "dirty", and evaluation of another flow begins. Evaluation of this other flow can also be paused, and so on. If, during this pausing of flow evaluations, a flow is evaluated that was previously marked as "visited" but is still "dirty", a circular reference has been encountered. In other words, evaluation of one or more flows is paused, and during that pause another flow is selected for evaluation that is already marked as "visited" and "dirty", then a circular reference has been encountered because evaluation of that other flow selected for evaluation was previously paused.

Alternatively, circular references can be detected in any of a variety of other manners. For example, a dependency graph that identifies value dependencies may be created in act 608 as discussed above, and this dependency graph can be used to identify circular references.

When a circular reference is detected, all of the flows that are part of that circular reference are marked as an error (e.g., a cyclic flow error). The flow being evaluated when the circular reference is detected is part of the circular reference, as well as every other flow that receives an input from the flow being evaluated when the circular reference is detected, and every other flow that receives an input from one of those flows, and so on. Evaluation of all of the flows that are part of the circular reference then stops. These flows can optionally be marked as "visited" and "not dirty" so that evaluation of the remaining flows can continue.

It should be noted that flows can be deterministic or non-deterministic. A deterministic flow always outputs the same values any time it is called with a specific set of input values. For example, a flow may output the sum of two input values. Such a flow would be deterministic because the flow will always output the same value given a specific set of input values. A nondeterministic flow, however, may output a different value each time it is called with a specific set of input values. For example, a flow may generate a random number based on an input value. Such a flow would be nondeterministic because it could generate a different random number each time it is called with the same input value. Flow that do not have input values can be deterministic (always outputting the same value) or nondeterministic (outputting different values each time they are called).

In certain embodiments, setting values can have an error state. When in an error state, a setting value may hold error information (e.g., an error code or description of the error). If the setting value does not hold the error information, then the error information can be reported in some other manner (e.g., by the event that placed the setting into the error state). A setting value can be set to an error state in various ways. For example, flow engine 222 will set an output value of a flow to an error state when an error occurs executing the flow (e.g., because the flow returned errors; because the flow engine was unable to execute a flow, such as when the flow engine detects a circular reference or when a flow could not be run due to problems with the inputs; and so forth).

The error state will be propagated through flows such that any flow that has an input value in error state will cause the flow engine to propagate that error state to its output. Such error states can eventually be returned by flow engine 222 to development component 202 (e.g., as results 226 of FIG. 2). Alternatively, the event that causes the original error may be returned by flow engine 222 to development component 202 (e.g., as results 226 of FIG. 2), rather than returning the propagation of error states through the flow.

Additionally, in certain embodiments a flow input and/or output can refer to an instance that does not currently exist (e.g., an input or output can refer to a member that has not been created). When a flow input refers to an instance that does not currently exist, then the input is considered unset and reverts to a default, if a default is defined on the flow (e.g., it reverts to an assigned value). If there are no such assignments on the flow then it will revert to a default value for the data type for the member.

When a flow output refers to an instance that does not currently exist, then the output value is not used. If none of the outputs of the flow exist then the flow does not have to be executed as it will not set any values. However, even if all inputs do not currently exist, if at least one output exists the flow will be executed.

It may also be desirable for the design time validation to allow for inherited settings patterns. Inherited settings refer to situations where the instance space has a hierarchy of objects, and where a setting value can be applied to an object that will result in that value for the setting on all objects below it in the hierarchy. Effectively, this creates a default value for those objects below the object, unless those objects below the object have their own explicitly applied value to override the default value. These can be referred to as applied settings (the settings applied to a particular object) on an object and resulting settings. (the result of the applied settings combined with settings inherited from the parent object) on the object.

Such inherited settings can be accommodated in different manners. In certain embodiments, such inherited settings can be accommodated during the creation of SDM file 204. The designer of SDM file 204 is aware of the situations where such inherited settings exist, and accounts for them in the design of SDM file 204. For example, the designer of SDM file 204 may declare both the applied settings and the resulting settings, but constrain against just the resulting settings.

In alternate embodiments, each setting has both an applied setting value and a result setting value. Thus, each setting in an instance will in effect have two values rather than just one. The applied setting value is the value set by initialization or explicitly setting of the value. The result setting value is set by flows. By default, references to the setting will get the result setting value, unless no flow has set it, in which case they will get the applied setting value. References to a flow output, on the other hand, will refer to the result value by default. Additionally, all references can optionally add a value type qualifier to explicitly refer to one of the two setting values.

Typically, the output of a flow is replaced each time the flow is evaluated. That is, the execution of a flow results in overwriting any previous output of the flow. However, in embodiments where each setting has both an applied setting value and a result setting value, a flow can be written to take, as one of its inputs the applied settings value. Given a properly constructed flow function, this can cause the output of the flow to be the applied settings appended to the other input(s) of the flow. Thus, in these embodiments, it is possible to effectively have new inputs appended to a flow output.

Constraint Engine

Simulator 218 calls constraint engine 224 to evaluate constraints for the system defined by SDM document 204. The evaluation performed by constraint engine 224 evaluates the constraints defined in SDM document 204 against the environment (to validate that the environment satisfies the constraints set forth by SDM document 204), and/or evaluates the constraints defined by the environment (e.g., in LIM document 206) against the system defined in SDM document 204 (to validate that the system defined in SDM document 204 satisfies the constraints set forth by the environment).

Constraint engine 224 "walks" over the instance space and finds and evaluates each constraint member. Constraint engine 224 can evaluate constraint members defined by SDM document 204 as well as constraint members defined by LIM document 206). Typically, simulator 218 calls constraint engine 224 after flow engine 222 has finished evaluating the flows, so the constraint checking is performed based on the instance space resulting from the expansion and flow evaluation processes. However, in alternate embodiments constraint engine 224 may be called prior to flow engine 222 finishing evaluating the flows.

Constraints can take different forms, and in certain embodiments constraints include setting constraints, relationship constraints, and object constraints. Setting constraints constrain the settings on an object and are backed by a manager or code to perform the evaluation. Relationship constraints constrain the relationship(s) an object can participate in. Object constraints constrain the object(s) in a relationship.

A constraint definition typically identifies a target definition to which the constraint applies, and further defines what the constraint is. In the case of a setting constraint, a set of instructions or code (or alternatively a hardware module) is associated with the constraint (e.g., identified by the constraint definition) that can be executed to evaluate whether the target satisfies the constraint. In certain embodiments, the constraint definition is associated with a manager definition which points to the set of instructions or code, analogous to the manager definition discussed above with respect to evaluating flows.

FIGS. 7A-7E are a flowchart illustrating an example process 700 for evaluating constraints. Process 700 is implemented by constraint engine 224 of FIG. 2, and may be performed in software, firmware, hardware, or combinations thereof.

Initially, all constraints in the instance space are identified (act 702). This identification in act 702 includes identifying setting constraints, relationship constraints, and object constraints. The identification in act 702 can include identifying constraints defined by the system (e.g., in SDM document 204) as well as constraints defined by the environment (e.g., in LIM document 206).

One of the identified constraints is then selected (act 704). The constraints can be selected in any of a variety of different manners. For example, constraints may be selected in the order they are identified in act 702, different types of constraints may be selected before other types (e.g., setting constraints may be selected before relationship constraints), constraints may be selected randomly, and so forth. The selected constraint is then evaluated based on whether the constraint is a relationship constraint, a setting constraint, or an object constraint.

If the constraint is a setting constraint, then the appropriate value(s) from the target instance of the constraint are obtained (act 706). The constraint identifies the target instance to be evaluated (e.g., identifies, by name, an object that is the target of the constraint). The constraint also identifies which setting value(s) of the target instance are to be evaluated, and those identified setting value(s) are obtained from the target instance. The set of instructions or code that is to execute to evaluate the constraint function for the constraint is then identified (act 708). Alternatively, rather than a set of instructions or code that are executed, the constraint function may be implemented in hardware. The set of instructions or code are then executed to determine (or the hardware determines) whether the value(s) obtained in act 706 satisfy the constraint (act 710). For example, the set of instructions may compare the obtained value(s) to values in the constraint and determine that the constraint is satisfied if one or more of the obtained value(s) is the same as (matches) one or more setting values of the constraint.

The result of the constraint function is then returned (act 712). The result can be returned to development component 202 of FIG. 2 as part of results 226. The constraint can optionally include a name or other information describing the constraint that can be returned as part of the results in act 712, allowing additional information describing any errors to be presented to the designer at development component 202.

A check is then made as to whether there are any additional constraints in the instance space that have not been selected yet (act 714). If all of the constraints have been selected and evaluated, then the constraint checking process is complete (act 716). However, if one or more constraints have not been selected, then process 700 returns to act 704 to select another one of the identified constraints.

Figure 7A:
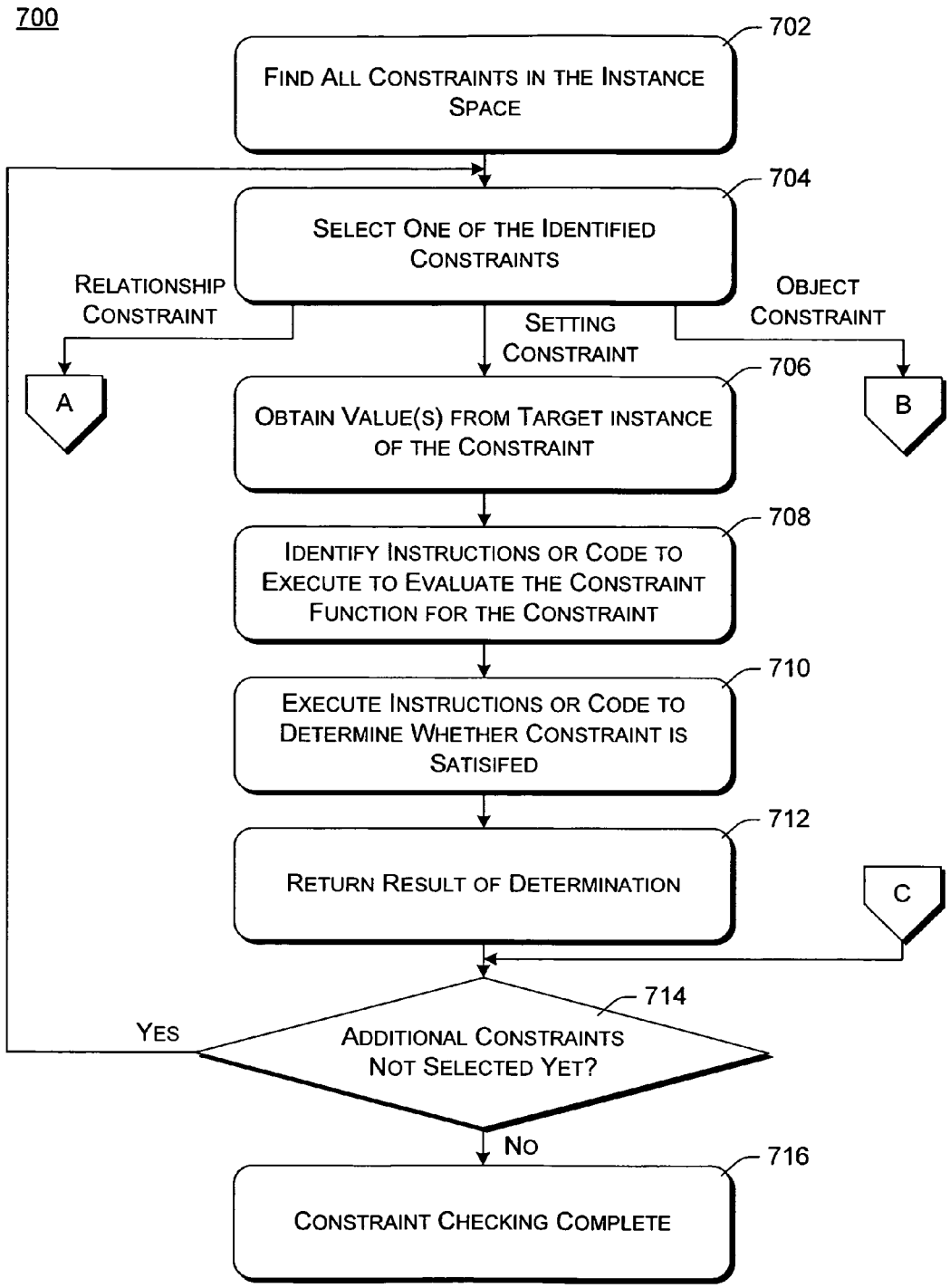
FIGS. 7A, 7B, 7C, 7D, and 7E are a flowchart illustrating an example process for evaluating constraints.
Figure 7B:
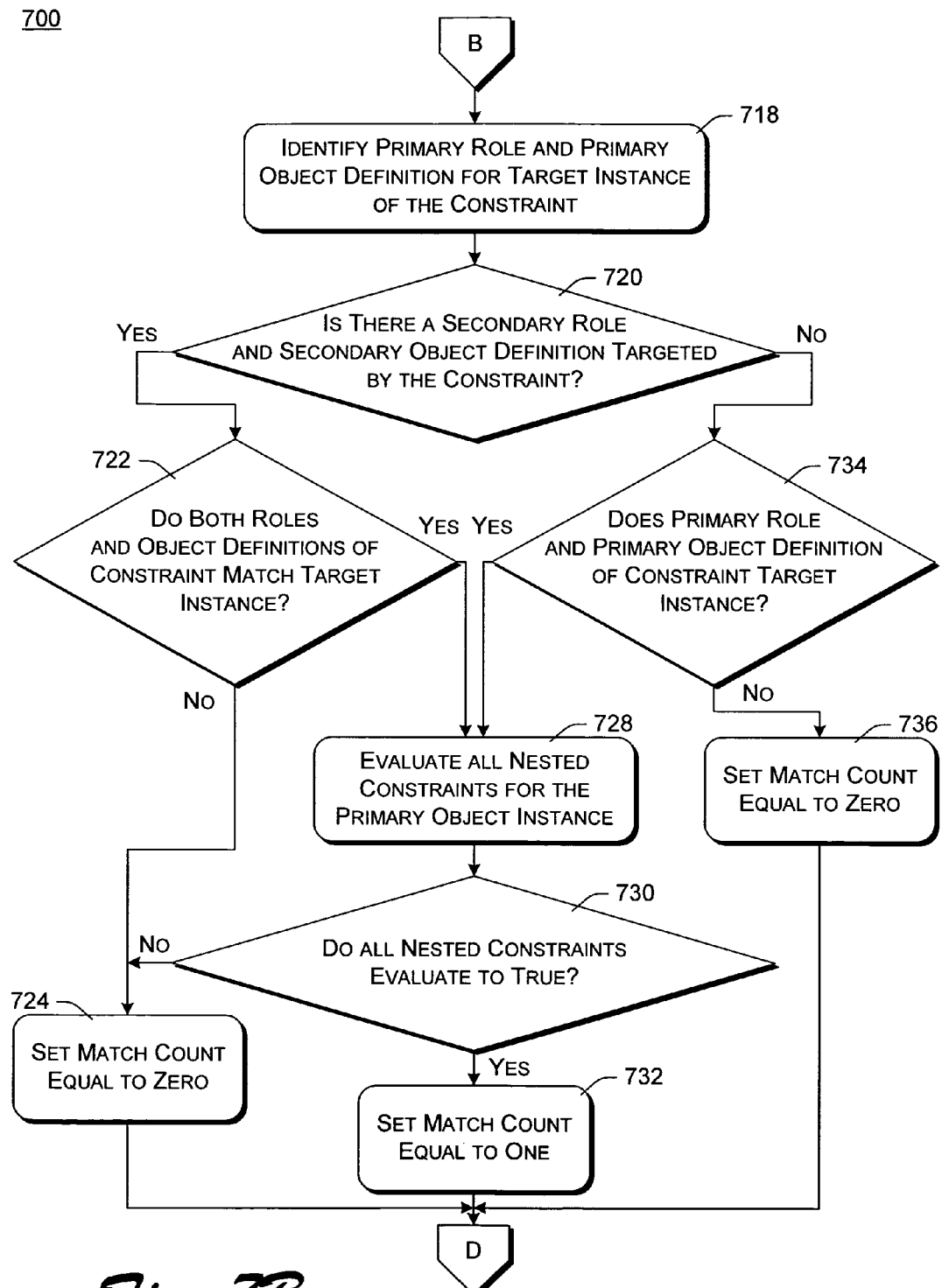

Returning to act 704, if the selected constraint is an object constraint, then a primary role and primary object definition for the target instance of the constraint are identified (act 718 of FIG. 7B). For an object constraint, the target instance of the constraint is a relationship instance. The primary object definition of the target instance refers to the name of an object(s) that the selected constraint targets. The primary role of the target instance identifies the relationship role that must match the definition identified by the primary object definition. A check is then made as to whether there is a secondary role and secondary object definition targeted by the constraint (act 720). In certain embodiments, a constraint may target multiple object(s) and/or role(s), and the secondary role and secondary object definition can be used to identify a second role and/or object definition targeted by the constraint.

If there is a secondary role and secondary object definition targeted by the constraint, then a check is made as to whether both primary and secondary roles and both primary and secondary object definitions of the constraint match the target instance (act 722). If one or more of the roles or one or more of the object definitions does not match the target instance, then a match count variable is set to zero (act 724), and process 700 continues to act 726 of FIG. 7C, discussed in more detail below.

However, if both primary and secondary roles and both primary and secondary object definitions of the constraint match the target instance, then all nested constraints for the primary object instance are evaluated (act 728). The nested constraints refer to any children instances of the constraint definition, as well as any of their children, and so forth. The nested constraints may be object constraints, relationship constraints, and/or setting constraints. If any of the nested constraints have been previously evaluated, and their results were recorded, then those results can be used in act 728. However, for any of the nested constraints that have not yet been evaluated, the constraints are evaluated by invoking process 700 and using each of the nested constraints as the selected constraint in act 704 of FIG. 7A.

Once all nested constraints are evaluated, a check is made as to whether all of the nested constraints evaluate to true (act 730). If one or more of the nested constraints does not evaluate to true, then the match count variable is set to zero (act 724). However, if all of the nested constraints evaluate to true, then the match count variable is set to one (act 732), and process 700 continues to act 726 of FIG. 7C, discussed in more detail below.

Alternatively, since act 730 is a test for whether all of the nested constraints evaluate to true, under certain circumstances not all of the nested constraints need to be evaluated. As soon as a nested constraint is evaluated to not true, then the evaluation of nested constraints can cease and process 700 can continue with act 730. For example, if there are three nested constraints and the second nested constraint that is evaluated evaluates to false or not true, then the result at act 730 will be the same (proceeding to act 724) regardless of whether the third nested constraint evaluates to true.

Returning to act 720, if there is not a secondary role and secondary object definition targeted by the constraint, then a check is made as to whether the primary role and the primary object definition of the constraint match the target instance (act 734). Act 734 is analogous to act 722, however it is performed only based on the primary role and primary object definition; there is no secondary role and secondary object definition in act 734 so only the primary role and primary object definition are considered.

If the primary role or the primary object definition does not match the target instance, then a match count variable is set to zero (act 736), and process 700 continues to act 726 of FIG. 7C, discussed in more detail below. However, if the primary role and the primary object definition of the constraint match an object instance, then process 700 continues to act 728, where all nested constraints for the primary object instance are evaluated.

Figure 7C:
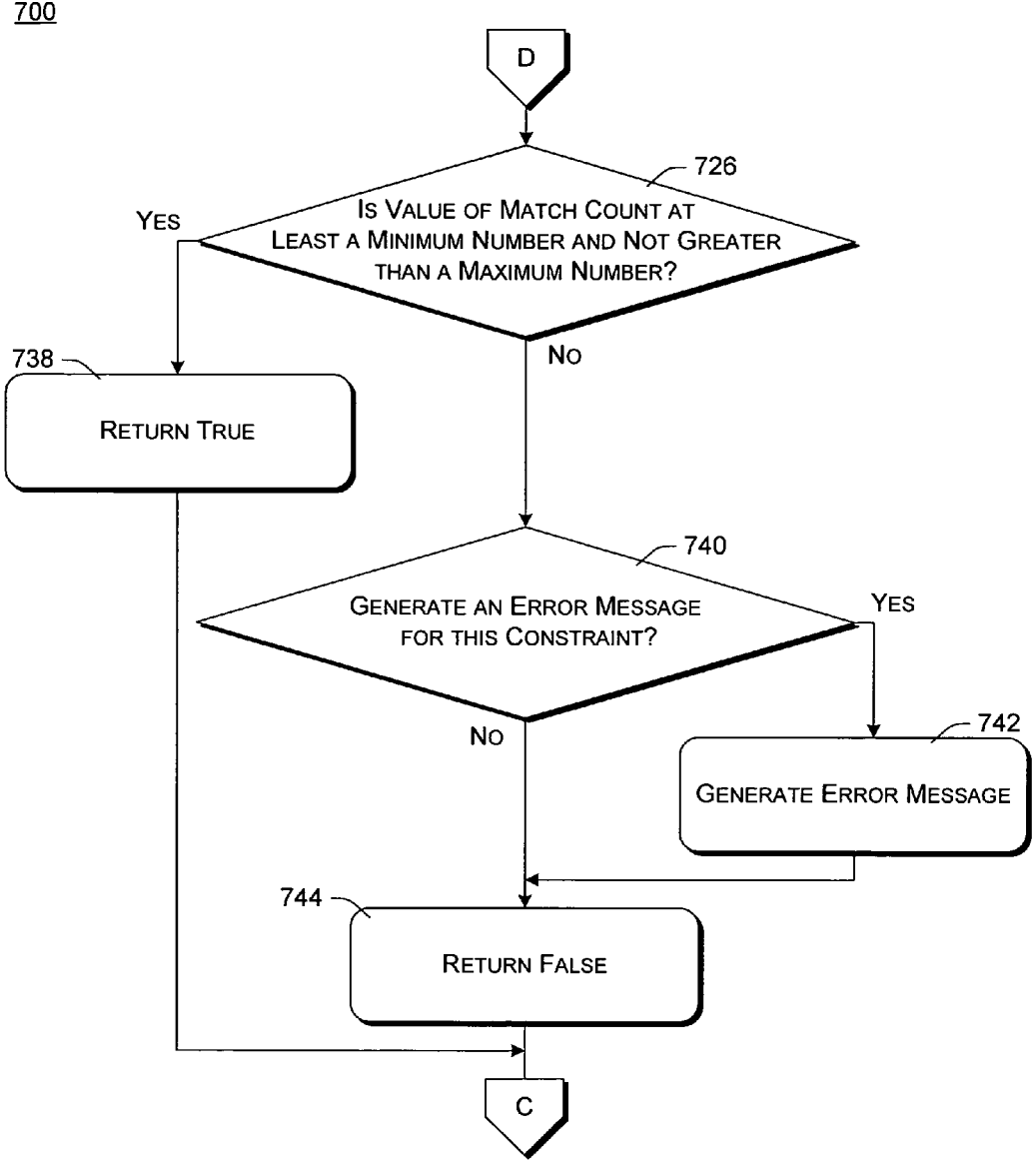

Turning now to act 726 of FIG. 7C, a check is made as to whether the value of the match count is at least a minimum number and not greater than a maximum number (act 726). These minimum and maximum numbers are identified by the constraint, and can be any values. If the match count is at least the minimum number but not greater than the maximum number, then a value of true is returned for this constraint (act 738). The return value of true may also be returned to processes evaluating other instances. For example, when a nested constraint is being evaluated in act 728 of FIG. 7B, if act 738 determines that that nested constraint evaluates to true, then the true value can be returned to the process evaluating the parent node to make the determination in act 730.

The return value of true can also optionally be returned to development component 202 of FIG. 2 as part of results 226. Additionally, a name or other identifying information of the constraint that was satisfied (evaluated to true) may optionally be returned to development component 202.

However, if the match count is not at least the minimum number or is greater than the maximum number, then a check is made as to whether an error message should be generated for this constraint (act 740). The constraint has a parameter or setting that indicates whether an error message for the constraint should be returned. This parameter or setting can be set, for example, by the designer or developer of the constraint. The check of act 740 can be carried out by checking whether this parameter or setting for the constraint indicates that an error message should be generated.

If an error message is to be generated for the constraint, then an error message is generated (act 742). The error message can optionally include a name or other identifying information that would help a user (e.g., a designer or developer) identify the nature of the constraint that caused the error. A value of false is then returned (act 744) for this constraint. The value of false and/or the error message generated in act 742 can be returned to development component 202 of FIG. 2 as part of results 226. Analogous to the return value of true in act 738, the return value of false and/or the error message can also be returned to processes evaluating other instances.

After the value of true is returned in act 738, or the value of false is returned in act 744, process 700 returns to act 714 of FIG. 7A to check whether there are any additional constraints that have not yet been selected.

Figure 7D:
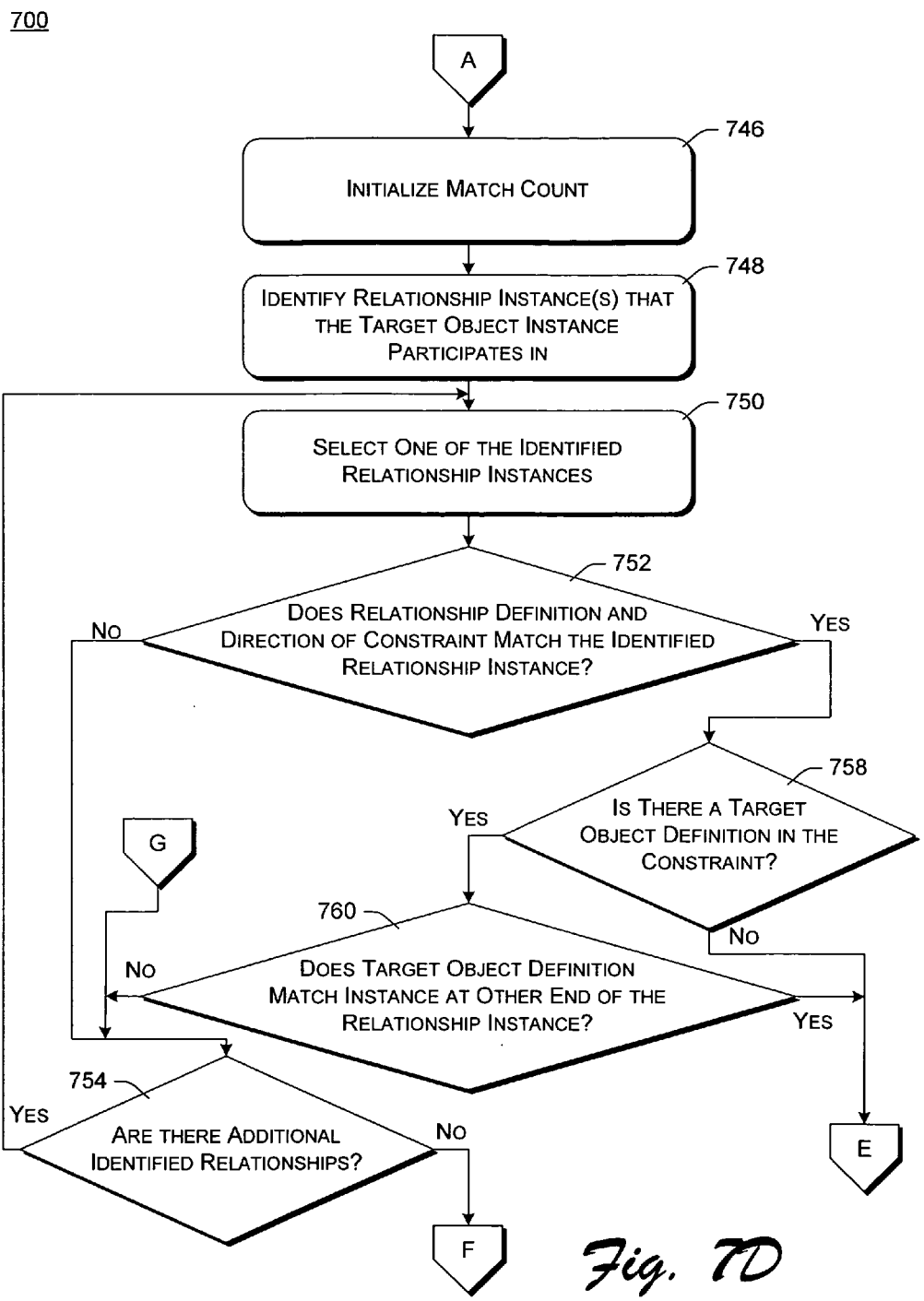

Returning to act 704 of FIG. 7A, if the selected constraint is a relationship constraint, then a match count variable is initialized (act 746 of FIG. 7D). The match count variable can be initialized, for example, by setting the value of the match count variable to zero. The relationship instance(s) that the target object instance of the constraint participates in is then identified (act 748), and one of the identified relationship instances is identified (act 750).

A check is then made as to whether the relationship definition and direction of the constraint match the selected relationship instance (act 752). The relationship definition refers to the type of the relationship (e.g., hosting, delegation, communication, etc.), and the direction refers to the role or direction of the relationship (e.g., whether the constraint targets a host or a guest in a hosting relationship). The relationship definition and direction of the constraint match the identified relationship instance if the relationship definition and direction of the constraint are the same as the relationship definition and direction of the selected relationship instance.

If the relationship definition and direction of the constraint do not match the selected relationship instance, then a check is made as to whether there are any additional relationships identified in act 748 that have not yet been selected (act 754). If there are one or more such additional relationships, then process 700 returns to act 750 where one of the additional relationships that has not yet been selected is selected. However, if there are no such additional identified relationships, then process 700 proceeds to act 756 of FIG. 7E, discussed in more detail below.

Returning to act 752, if the relationship definition and direction of the constraint do match the selected relationship instance, then a check is made as to whether there is a target object definition in the constraint (act 758). A target object definition is optional in the constraint, and refers to the object instance that is on the other side of the relationship instance being evaluated. For example, if the relationship instance is a hosting relationship and the target object instance is the host, then the object instance on the other side of the hosting relationship would be the guest instance. If there is a target object definition in the constraint, then a check is made as to whether the target object definition in the constraint matches the instance at the other end of the relationship instance (act 760). The target object definition in the constraint matches the instance at the other end of the relationship instance if the target object definition in the constraint and the instance at the other end of the relationship instance are the same.

If the target object definition in the constraint does not match the instance at the other end of the relationship instance, then process 700 proceeds to act 754 to check whether there are any additional identified relationships that have not been selected yet.

Figure 7E:
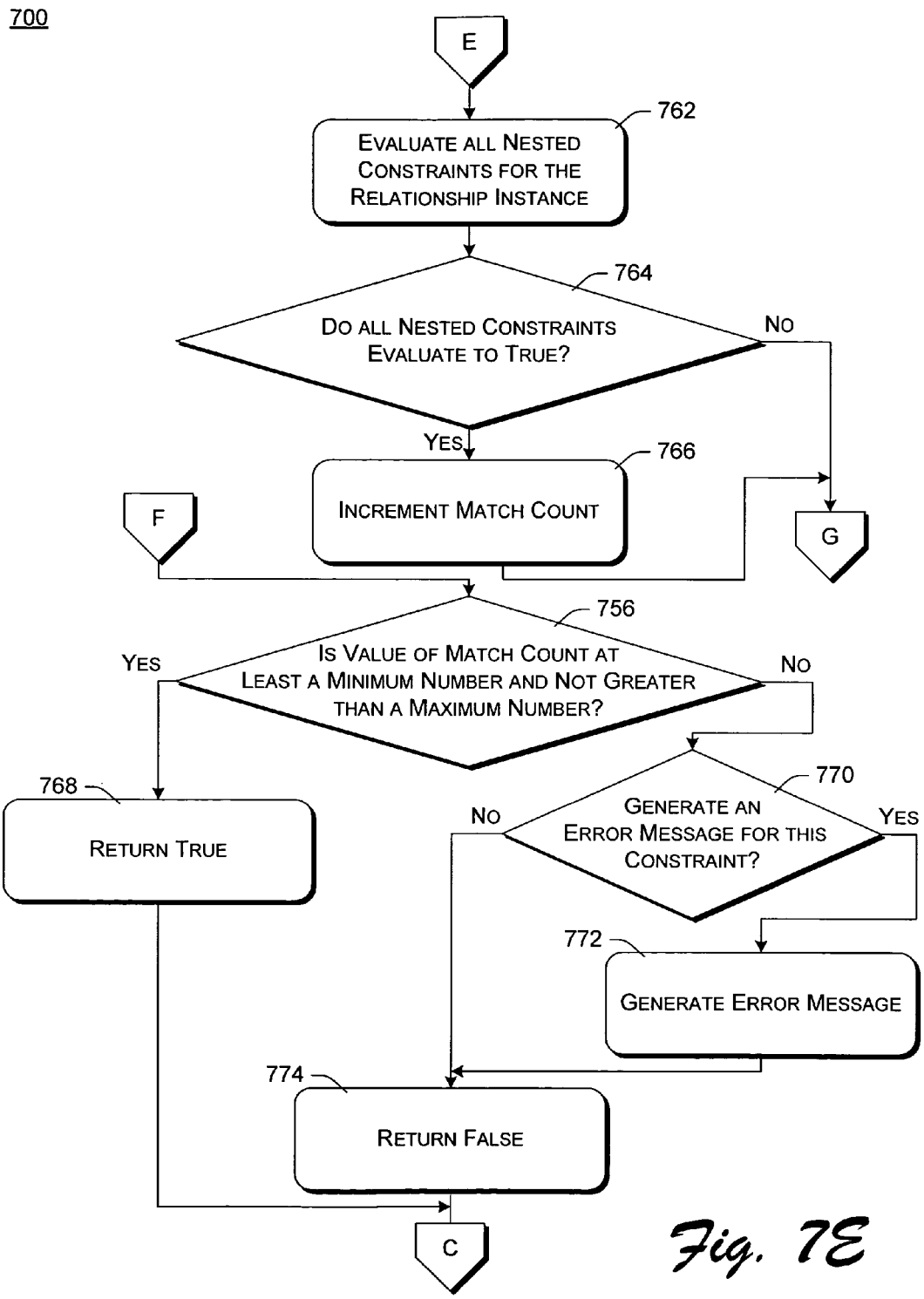

However, if the target object definition in the constraint does match the instance at the other end of the relationship instance, or if there is not target object definition in the constraint, then process 700 proceeds to evaluate all nested constraints for the relationship instance (act 762 of FIG. 7E). Process 700 then proceeds based on whether all of the nested constraints evaluate to true (act 764). The evaluation and checking of acts 762 and 764 are analogous to the evaluation and checking of acts 728 and 730 of FIG. 7B.

If all of the nested constraints do not evaluate to true, then process 700 returns to act 754 of FIG. 7D to check whether there are any additional identified relationships that have not been selected yet. However, if all of the nested constraints evaluate to true, then the match count variable is incremented (act 766). The match count variable can be incremented by different amounts, such as by a value of one. Process 700 then returns to act 754 of FIG. 7D to check whether there are any additional identified relationships that have not been selected yet.

A check is then made as to whether the value of the match count is at least a minimum number and not greater than a maximum number (act 756), analogous to act 726 of FIG. 7C. If the value of the match count is at least a minimum number and not greater than a maximum number, then a value of true is returned (act 768), analogous to act 738 of FIG. 7C. However, if the value of the match count not is at least a minimum number and not greater than a maximum number, then a check is made as to whether to generated an error for the constraint (act 770), analogous to act 740 of FIG. 7C. If an error is to be generated, then an error message is generated (act 772), analogous to act 742 of FIG. 7C. When the error message is generated, or if no error message is to be generated, then a value of false is returned (act 774), analogous to act 744 of FIG. 7C.

Additionally, it should be noted that the constraint check process can be carried out on groups of constraints as well. In order to evaluate a group of constraints, each constraint is individually evaluated using process 700, and the result of the group is dependent on the results of the individual constraint evaluations. In certain embodiments, if at least one constraint in the group evaluates to true, then the group evaluates to true.

By returning values indicating successful constraint validation (e.g., a value of true) or unsuccessful constraint validation (e.g., a value of false), as well as error messages, to development component 202 in process 700, the result of the design time validation of the system described in SDM document 204 is returned to development component 202. These indications and/or error messages can also be presented to the designer using development component 202, allowing the designer to be informed of whether the system being designed (and described in SDM document 204) has been validated, or whether there are potentially problems. By returning error messages, the designer can be better informed as to what the potential problems are and how to resolve them. This feedback can be given to the designer during the design process, not requiring the designer to attempt to deploy the system at a data center before finding out that there are problems with the designed system.

Example Error Implementation

This section illustrates an example implementation of how errors and warnings can be reported by validation component 208 of FIG. 2. Errors and warnings can be in any of a variety of formats, such as the example XML format discussed in this section. If the validation component 208 is used through the CLR (Common Language Runtime), then classes with equivalent information to the XML formats discussed in this section may be returned.

This section identifies values that will be common to a class of errors. It does not preclude additional values.

Errors that occur during the validation of the type space (parse and resolution errors) will block the compiled SDM document from being written out. However, errors that occur during instance space validation (flow and constraint errors) will not block the compiled SDM document from being written out.

Base Error Format

The base error contains the error information common to all errors. An example XML format for the base error format is:

```
<xs:complexType name="DocumentError">
    <xs:attribute name="category" type="Severity" use="required"/>
    <xs:attribute name="code" type="xs:string" use="required"/>
    <xs:attribute name="description" type="xs:string" use="required"/>
    <xs:attribute name="sdmFile" type="xs:string" use="required" />
</xs:complexType>
```

The attributes or elements of the base error format are described in the following table.

| Attribute/element | Description |
| --- | --- |
| category | Error or warning (not localized) |
| code | The error code (not localized) |
| description | A description of the error (localized) |
| sdmFile | The name of the sdm file in which the error occurred. (file name not namespace name) |

Parse Error

A parse error will result from a failure when trying to load the SDM document. This error will include a line and column number. An example XML format for the parse error format is:

```
<xs:complexType name="DocumentParseError">
    <xs:complexContent>
        <xs:extension base="DocumentError">
            <xs:attribute name="lineNumber" type="xs:int"/>
            <xs:attribute name="columnNumber" type="xs:int"/>
        </xs:extension>
    </xs:complexContent>
</xs:complexType>
```

The attributes or elements of the parse error format are described in the following table.

| Attribute/element | Description |
| --- | --- |
| lineNumber | The line number in the file identified by the sdmFile attribute. |
| columnNumber | The column number that identifies the start of the error. |

Resolution Error

A resolution error will result from a failure while loading and resolving types in a file. This class of errors covers failures to resolve imports, failures to resolve types, members and paths. At this stage there is a fully parsed object model, so reference can be made to the parts that raise an error in terms of the object model rather than the line and column numbers from the file. An example XML format for the resolution error format is:

```
<xs:complexType name="DocumentResolutionError">
    <xs:complexContent>
        <xs:extension base="DocumentError">
            <xs:attribute name="statement" type="documentPath"/>
        </xs:extension>
    </xs:complexContent>
</xs:complexType>
```

The attributes or elements of the resolution error format are described in the following table.

| Attribute/element | Description |
| --- | --- |
| statement | An path to the statement that caused the error |

Flow Error

A flow error occurs when the flow executes and returns errors for one or more of its inputs or outputs. The flow member is identified, as is its type and the context in which the failure occurred including the current set of input and output values along with the destination setting members. An example XML format for the flow error format is:

```
<xs:complexType name="DocumentFlowError">
    <xs:complexContent>
        <xs:extension base="DocumentError">
            <xs:sequence>
                <xs:element name="inputValue" type="flowInput"
                    minOccurs="0" maxOccurs="unbounded"/>
                <xs:element name="outputValue" type="flowOutput"
                    minOccurs="0" maxOccurs="unbounded"/>
            </xs:sequence>
            <xs:attribute name="flowType" type="documentPath"/>
            <xs:attribute name="flowMember" type="documentPath"/>
            <xs:attribute name="memberContext"
                type="containmentPath"/>
            <xs:attribute name="flowErrorID" type="xs:int"/>
        </xs:extension>
    </xs:complexContent>
</xs:complexType>
```

The attributes or elements of the flow error format are described in the following table.

| Attribute/element | Description |
| --- | --- |
| InputValue | A description of the source setting, flow setting and value for the flow |
| OuputValue | A description of the destination setting, flow setting and value for the flow |
| flowType | The type that the flow member resolved to |
| flowMember | The declaration of the flow member |
| memberContext | The containment hierarchy in which this flow was evaluated. The root of this hierarchy will be the target type that we are simulating, the intermediate nodes will be the members between the root and the flow member. |
| flowErrorID | A custom error id returned from a flow that is used to look up an error description from the design data section. |

An example XML format for a description of a flow input format is:

```
<xs:complexType name="flowInput">
    <xs:sequence>
        <xs:element name="value" type="xs:anyType"
            minOccurs="0"/>
    </xs:sequence>
    <xs:attribute name="setting" type="sdm:simpleName"/>
    <xs:attribute name="source" type="documentPath"/>
</xs:complexType>
```

The attributes or elements of the description of a flow input format are described in the following table.

| Attribute/element | Description |
| --- | --- |
| Value | The value of the input |
| Setting | The flow setting on the flow type that this is an input for |
| Source | The setting member that we are sourcing the value from |

An example XML format for a description of a flow output format is:

```
<xs:complexType name="flowOutput">
    <xs:sequence>
        <xs:element name="value" type="xs:anyType"
            minOccurs="0"/>
    </xs:sequence>
    <xs:attribute name="setting" type="sdm:simpleName"/>
    <xs:attribute name="destination" type="documentPath"/>
</xs:complexType>
```

The attributes or elements of the description of a flow output format are described in the following table.

| Attribute/element | Description |
| --- | --- |
| Value | The value of the output |
| Setting | The flow setting that provides the output value |
| Destination | The setting member that we are flowing the value to. |

Constraint Error

A constraint error occurs when a setting constraint is evaluated and returns an error, when a guard fails its cardinality constraint or when at least one member of a constraint group fails to evaluate to true.

When a setting constraint fails the constraint member declaration is returned, along with the constraint type, the context in which the constraint executed and the set of input values for the constraint. The constraint can also return a custom error id, which can be then be used to look up additional error information. An example XML format for the such a constraint error format is:

```
<xs:complexType name="DocumentConstraintError">
    <xs:complexContent>
        <xs:extension base="DocumentError">
            <xs:sequence>
                <xs:element name="inputValue"
                    type="constraintInput"/>
            </xs:sequence>
            <xs:attribute name="constraintMember"
                type=" documentPath"/>
            <xs:attribute name="constraintType"
                type=" documentPath"/>
            <xs:attribute name="memberContext"
                type="containmentPath"/>
            <xs:attribute name="constraintErrorID" type="xs:int"/>
        </xs:extension>
    </xs:complexContent>
</xs:complexType>
```

The attributes or elements of such a constraint error format are described in the following table.

| Attribute/element | Description |
| --- | --- |
| inputValue | A list of input values for the constraint |
| constraintMember | A path to the declaration of the constraint member |
| constraintType | The constraint type that the constraint member resolved to |

-continued

| Attribute/element | Description |
|---|---|
| Member context | The containment hierarchy in which this constraint was evaluated. The root of this hierarchy will be the target type that we are simulating, the intermediate nodes will be the members between the root and the constraint member. |

An example XML format for a description of a constraint input format is:

```
<xs:complexType name="constraintInput">
    <xs:sequence>
        <xs:element name="value" type="xs:anyType"/>
    </xs:sequence>
    <xs:attribute name="setting" type="sdm:simpleName"/>
    <xs:attribute name="source" type=" documentPath"/>
</xs:complexType>
```

The attributes or elements of the description of a flow input format are described in the following table.

| Attribute/element | Description |
|---|---|
| Value | The value of the input |
| Setting | The constraint setting that the value is for |
| Source | The source member for the input value. |

When a guard or group fails, the constraint member is identified along with the member context and the evaluation context. The evaluation context differs from the member context for nested constraints when the evaluation context identifies the type or relationship that the nested constraint was evaluated against. An example XML format for the such a constraint error format is:

```
<xs:complexType name="constraintGuardOrGroupError">
    <xs:attribute name="constraintMember" type=" documentPath"/>
    <xs:attribute name="evaluationContext" type="containmentPath"/>
    <xs:attribute name="memberContext" type="containmentPath"/>
</xs:complexType>
```

The attributes or elements of such a constraint error format are described in the following table.

| Attribute/element | Description |
|---|---|
| ConstraintMember | The declaration of the guard (type constraint or relationship constraint) or group (type constraint group or relationship constraint group). |
| EvaluationContext | The member path from the root to the member that the constraint was evaluated against |
| memberContext | The member path from the root to the member that the constraint is declared on. |

Document Path

This is a path to a particular SDM element within an SDM document. An example XML format for the a document path format is:

```
<xs:simpleType name="documentPath">
    <xs:restriction base="xs:string">
    </xs:restriction>
</xs:simpleType>
```

The path will generally have the form:
namespace/root_type (/nested_type)*/member (/nested_member)*

Well known settings for relationships and constraints are treated as nested members.

Containment Path

A containment path identifies a sequence of members from the root to a particular member. The path navigates the members from the root simulation component through their members and so on until the member that raised the error is reached. An example XML format for the a document path format is:

```
<xs:simpleType name="containmentPath">
    <xs:restriction base="xs:string">
    </xs:restriction>
</xs:simpleType>
```

The path will generally have the form:
Namespace/rootType (/nested_type) * member (/nested_member)*

Examples of Errors

The compiler will return errors and warnings from the compilation that will be displayed to the user. Errors caught during compilation of an SDM document may have different levels of severity. Most errors are fatal, but there are some that are likely to cause other errors or are safe to ignore. Example details on the severity for each of the levels is as follows.

Error: Errors in this category are fatal and have the following implications:

An output sdm file (.sdmDocument) cannot be created from the compilation

Errors will cause the compiler to complete the current stage of compilation and then terminate. For example, if an XML parse error occurs the document will not be loaded. If a load error occurs, more load errors may be found, but will not continue with flow and constraint checking.

Warning 1 (W1): Warnings do not prevent the SDM document from being compiled. Guidelines for warning 1 include:

Likely to cause an error in future stages of the compilation. For example, if a reference file is not found, errors will occur during load of the target SDM file if any types are used from that reference.

Errors during instance space simulation.

Warning 2 (W2): Warning 2 is the lowest severity error. For example, an extra attribute is found in the XML file. Guidelines for Warning 2 are:

Warning 2 is safe to ignore

Recommended to fix in order to clean up the SDM.

Warning 3 (W3): Warning 3 is an informational message.

Warning 3 is informational.

By default, these warnings are not reported.

The following table lists examples of errors that may be reported by validation component 208 of FIG. 2. Separate tables are used to show examples of general compiler errors, document load errors, definition space verification errors, flow errors, and constraint errors. A description of the errors and their level are included in the following tables. A format for each of the errors is also identified (e.g., the error (base error) format, the parse format, the resolution format, the flow format, and the constraint format).

| | | General Compiler Errors | |
|---|---|---|---|
| Format | Level | Description | Rule |
| Error | Error | Unexpected Exception | An exception was thrown during compilation |
| Error | Error | SDM file not found | |
| Error | W1 | Reference file not found | When the references are loaded before compiling the target file, the reference is not found. |
| Error | Error | Failed to load the SDM file | A parse error occurred during the load that caused this document to fail to load. |
| Error | Error | Compilation aborted. Too many errors detected | More than 100 errors were detected during compilation |
| Error | W1 | Invalid reference file | The reference file is not a compiled sdm document. |
| Error | Error | The source file was loaded as a reference | The source file cannot be the same as a reference file. |
| Error | Error | Failed to take the hash of a file | The file listed in the Sdm must exist and needs to have read access for taking its hash. |
| Error | W3 | The sdm file is delay signed | Sdm files should be fully signed, not just delay-signed. |
| Resolution | Error | The Source setting value is missing from the file resource. | A resource member of type System.OperatingSystem.FileSystem:File must contain a setting value "Source" so the file can be located during the build. |
| Resolution | Error | The file in a resource was not found. | The file could not be found in the path specified by the "Soruce" setting value for a resource member of type System.OperatingSystem.FileSystem:File |
| Error | Error | The key file does not exist, is corrupted, or the private key is not found and the target is being fully signed | The keyFile variable is invalid. Either the file does not exist, the key file is corrupt, or the private key is not found and delaySign = false. |
| Error | Error | The key container does not exist | The keyContainer variable is invalid |
| Error | Error | The key file could not be accessed to extract the public and/or private key | If keyFile is a file (not a container), it must be accessible |

| | | Document Load Errors | |
|---|---|---|---|
| Format | Level | Description | Rule |
| Parse | Error | Invalid XML document | The xml document was not a valid xml document or did not conform to the xsd schema. For example: Missing attribute/element Unknown attribute/element Invalid value for attribute/element |
| Parse | Error | Invalid Setting Values schema | Validation on the setting value failed. |
| Resolution | Error | Unknown object found | Unknown object found when parsing the types |
| Resolution | Error | Unknown member | Unknown member found when parsing members |
| Resolution | Error | Unknown roles list value | Unknown roles list value found |

-continued

Document Load Errors

| Format | Level | Description | Rule |
| --- | --- | --- | --- |
| Resolution | Error | Type name already defined | There is a single namespace for setting, component, port and resource types, relationships, constraint and flow types, and managers within a single sdm document |
| Resolution | Error | Member name already defined within the current type. | Type, relationship, constraint, flow members and setting declarations are all part of a single namespace within a type. |
| Resolution | Error | Constraint already exists | Only one constraint for a given name can exist |
| Resolution | Error | Setting value already exists | Only one setting value in a type or member for a given name can exist |

Definition Space Verification Errors

| Format | Level | Description | Rule |
| --- | --- | --- | --- |
| Resolution | Error | Failed to resolve the type of this object | Members and types must refer to valid types |
| Resolution | Error | Failed to resolve the host of the hosting relationship | Members must refer to valid types. This includes setting declarations, type, relationship, flow and constraint members. |
| Resolution | Error | Failed to resolve the guest of the hosting relationship | |
| Resolution | Error | Failed to resolve the dependent member of the reference relationship | |
| Resolution | Error | Failed to resolve the source member of the reference relationship | |
| Resolution | Error | Failed to resolve the child member of the containment relationship | |
| Resolution | Error | Failed to resolve the parent member of the containment relationship | |
| Resolution | Error | Failed to resolve the server member of the communication relationship | |
| Resolution | Error | Failed to resolve the client member of the communication relationship | |
| Resolution | Error | Failed to resolve the proxy member of the delegation relationship | |
| Resolution | Error | Failed to resolve the delegate member of the delegation relationship | |
| Resolution | Error | Failed to resolve the child type of the containment relationship | Relationship types must refer to valid types. |
| Resolution | Error | Failed to resolve the parent type of the containment relationship | |
| Resolution | Error | Failed to resolve the host type of the hosting relationship | |
| Resolution | Error | Failed to resolve the guest type of the hosting relationship | |
| Resolution | Error | Failed to resolve the dependent type of the reference relationship | |
| Resolution | Error | Failed to resolve the source type of the reference relationship | |
| Resolution | Error | Failed to resolve the server type of the communication relationship | |

-continued

Definition Space Verification Errors

| Format | Level | Description | Rule |
|---|---|---|---|
| Resolution | Error | Failed to resolve the client type of the communication relationship | |
| Resolution | Error | Failed to resolve the proxy type of the delegation relationship | |
| Resolution | Error | Failed to resolve the delegate type of the delegation relationship | |
| Resolution | Error | Failed to resolve the base of the relationship | The relationship must have a valid implemented or extended type |
| Resolution | Error | Setting declaration type not found for this setting value. | The type of the setting declaration is invalid |
| Resolution | Error | Invalid setting declaration type | The type of the setting declaration is invalid. |
| Resolution | Error | Failed to resolve the manager | If an object has a manager it must resolve. |
| Resolution | Error | Member declaration referenced type that does not match member declaration type. | Members must refer to valid types. This includes setting declarations, type, relationship, flow and constraint members. |
| Resolution | Error | Member name already defined in base type | A base type's members cannot be overridden by a derived type |
| Resolution | Error | Failed to resolve import statement | All import statements must resolve to an sdm document |
| Resolution | Error | Failed to resolve base type | The base type for a component must be resolvable and must be of the same type as the component |
| Resolution | Error | Invalid base type | |
| Resolution | Error | Setting type declaration used unsupported base type | Setting types must be derived from a limited set of xsd types defined in the SDM schema |
| Resolution | Error | Setting namespace includes do not match sdm includes | The namespaces included in the setting schema must match the sdm namespaces imported into the sdm document that includes the settings schema |
| Resolution | W2 | Complex setting type too complex for UI to display | The display can only support complex types that have no attributes and only contain a sequence of singleton elements derived from simple types. |
| Resolution | Error | Failed to resolve path | All elements on the path must resolve to a member of the type associated with the previous element on the path or the root context of the path. The type associated with the final element must be compatible with the destination of the path. |
| Resolution | Error | Path type mismatch | |
| Resolution | Error | Input path targets write-only setting | |
| Resolution | Error | Output path targets fixed setting | |
| Resolution | Error | No conversion available between flow input type and source setting type | We only support a small number of lossless conversions between base data types. |
| Resolution | Error | No conversion available between flow output type and destination setting type | |
| Resolution | Error | No conversion available between constraint input type and source setting type | |
| Resolution | Error | The setting value can only be specified during deployment time. | This setting value is marked for deployment time. |
| Resolution | Error | Setting value did not conform to setting type | All setting values must conform to the setting type |
| Resolution | Error | Setting value is not nillable | Setting value is blank and is not the target of a flow value |
| Resolution | Error | Failed to resolve manager | The manager identified by a |

Definition Space Verification Errors (continued)

| Format | Level | Description | Rule |
|---|---|---|---|
| Resolution | Error | Failed to load manager | type must resolvable and loadable by the compiler and runtime. |
| Resolution | Error | More than one input declaration provided for a single flow input | Only one input path is allowed for flow or constraint inputs |
| Resolution | Error | More than one input declaration provided for a single constraint input. | |

Flow Errors

| Format | Level | Description | Rule |
|---|---|---|---|
| Flow | Error | Required input not defined | All required inputs for a flow must be defined before the flow can be evaluated. |
| Flow | Error | Flow output did not conform to target setting type | The value generated by the flow did not conform to the output type declared by the flow. |
| Flow | Error | Flow failed - see flow type for detail | When executed, the flow returned an error. |

Constraint Errors

| Format | Level | Description | Rule |
|---|---|---|---|
| Constraint | Error | Required constraint did not evaluate true | A constraint declaration did not meet its minimum cardinality. |
| Constraint | Error | Bounded constraint exceeded upper bound | A constraint exceeded its maximum cardinality. |
| Constraint | Error | Illegal constraint evaluated true | A constraint with a maximum cardinality of zero evaluated to true. |
| Constraint | Error | No constraint in constraint group evaluated true | At least one constraint in a constraint group must evaluate to true. |
| SettingConstraint | Error | Required input not defined | All required inputs to a constraint must be provided before the constraint can be evaluated. |
| SettingConstraint | Error | Constraint Failed - see constraint for details | A constrain was evaluated and returned an error (should we differentiate a failure during execution from a false return?) |
| Constraint | W3 | Could not check the constraint | Not enough information is available to check the constraint. |

Example SDM Implementation

The following is an example implementation of the SDM. This example SDM implementation includes a Definitions section (section 1), an Architectural Overview section (section 2), and an Implementation Details section (section 3). It is to be appreciated that various specific values and requirements are described in this example implementation, and that not all implementations are limited to these specific values and requirements.

1 Definitions

| Term | Definition |
|---|---|
| Change Request | A declarative document that describes a set of changes to a modeled system |
| Object definition | An object definition captures the configuration of an element of the modeled system. |

-continued

| Term | Definition |
|---|---|
| Relationship definition | A definition that is used to describe the interaction between modeled system elements |
| System Definition Model (SDM) Document | An xml document that contains definitions for objects, relationships, settings, flow and constraints. |
| Software Distribution Unit (SDU) | The combination of a set of SDM documents and the associated binary information (files) required to deploy those types to an SDM managed system |
| SDM Instance space | A set of concrete type and relationship instances that represent the modeled system |

2 Architectural Overview

The System Definition Model (SDM) supports description of the configuration of and interaction between the elements of a connected system that we will refer to as the modeled system.

SDM is based on an object-relational model. We use objects to describe elements that exist in the modeled system and relationships to identify the links between them. The SDM further refines objects and relationships to capture semantics that are important to the SDM. In particular, we divide objects into systems, endpoints and resources and we divide relationships into communication, containment, hosting, delegation, and reference.

We use abstract object definitions to provide a common categorization of system parts allowing tool support for a wide range of applications and providing the basis for type checking at design time. We expect the set of abstract definitions to provide a comprehensive basis for system design and we expect that they will change slowly over time.

We then use the abstract definitions as a basis for defining concrete definitions that represent parts of an actual application or datacenter design. We take an abstract definition and provide an implementation that defines the concrete type's members and setting values for its properties. We then build systems from collections of these definitions.

Constraints are used to model restrictions over the allowed set of relationships in which an instance can participate. We use constraints to capture fine grained requirements that depend on the configuration of objects involved in a relationship. For example, a constraint may be used to validate that participants on each end of a communication protocol are using compatible security settings.

In order to effect change on the target system, a declarative description of the required changes called a change request can be used. SDM defines the process that is used to expand, validate and execute a change request as part of the SDM execution model.

The instance space captures both the desired and current state of the managed application. We can track changes in the instance space and associate them with the change request that initiated the change.

Managers are used to both provide customized behavior to the runtime and to support interaction between the runtime and the modeled system.

2.1 Objects

Objects are used to represent both logical and physical aspects of the modeled system. For example, they can be used to represent files, directories and the configuration within IIS. They can also be used to represent an application or distributed system boundary.

We separate objects into three categories. Each represents aspects of the modeled system that we believe should be exposed and understood as part of the SDM model itself rather than through attribution or an imposed inheritance structure over particular models instances.

2.1.1 Resources

Resources represent the fundamental units of behavior that can be combined to create a system model. Resources may be used to group other resources together to add structure to a system model. Each resource may express dependencies on other resources that it may require in order to perform its modeled behavior. In order to create an instance of a resource a host environment must be identified for the resource.

Examples of resources include files, directories and registry keys and values as part of operating system, web directories and web files as part of IIS and tables, rows and stored procedures as part of a database.

2.1.2 Systems

Systems are used either to represent a collection of resources that perform a well defined task or to represent a collection of systems that interact to perform a well defined task. Resources within a system boundary cannot express dependencies on resources outside that boundary. At the same time, we do not require resources to document the mechanisms that they use to communicate with other resources within the same system boundary.

This means that interaction between systems must be explicitly modeled using communication relationships. It also means that in general a system is the smallest unit of deployment. Since resources may have undocumented interactions with other resources, we cannot guarantee that they will work if they are deployed independently.

Examples of systems include the operating system, web applications hosted in IIS and databases hosted by SQL.

2.13 Endpoints

Endpoints are used to define the interfaces that a system exposes to support communication with other systems. Since we do not allow resources to have dependencies that cross system boundaries, endpoints must be used to model the interaction that is required in order to allow a system to operate correctly.

Examples of endpoints include Http, Tcpip and Soap endpoints.

2.2 Relationships

We use relationship to capture aspects of the interactions that occur between objects. All relationships are binary and directed. As well as capturing the interaction between objects, relationship can place constraints on the objects that participate in the relationship and can flow configuration information between the participants.

Once again, we identify a set of relationships that are understood by the SDM model in order to attach particular semantics to those relationships. This allows us to reason about the runtime behavior of the model system.

In particular the aspects that we need to describe about a particular object instance are:

a) its lifetime
b) who can interact with it
c) where it appears in the structure of a system
d) who it communicates with
e) who it depends on to do its work
f) what environment it should execute in
g) whether it is operating correctly and is available We also use relationships to define the allowable structure of an application. These aspects include:

a) What objects another object can contain
b) Which endpoints can be connected together
c) What environments can host a particular object Each of the following relationships captures part of one or more of the above aspects.

2.2.1 Containment

Containment relationships are used to define the containment structure of an SDM model. The existence of a containment relationship is used to indicate that one object can contain another object. This information is used at design time to guide the design environment when it exposes options to the developer or architect about how they can associate systems, resources and endpoints.

Containment relationships are defined in order to limit the structure of an SDM model. For example, an architect may design a web application model that can contain web directories, file system directories and files. Another architect may extend the model to allow it to contain web sites. By understanding the underlying structure of these models, operators and tool builders can reason about what environment instances of the model may require and what effect a particular model may have on the system that it is deployed into. For example, in the first model defined above, the operator supplies a web site to enable the application to be deployed.

Containment relationships define the lifetime of an object, the owner of an object and where an object appears in the structure of a modeled system. If there is a single parent container for an object then the lifetime of the parent bounds the lifetime of the contained object. A parent is also said to own the contained object. This means that the parent has control over the visibility of the object and can determine whether to expose the object or parts of the object to its parents. Finally, a parent provides contextual information for the object. This contextual information can be used to help a developer communicate the structure of their application to other developers or to users of the application. For example, when localizing errors in a running application, the containment chain can provide rich contextual information, indicating in detail which part of an application failed.

Uses of containment relationships include representing the structure of the virtual directories of a web application and the structure of files and directories deployed by the web application. Containment would also be used to describe the relationship between the web application and the connected system model of which it is a part.

2.2.2 Hosting

Hosting relationships are used to model the containment structure of the environment that is being modeled. These relationships capture the functional restrictions on the environment. For example, the restriction that files must be contained in a directory or that web directories must be contained in a website.

A hosting relationship defines both an object's lifetime and the environment in which it executes. In order to exist, an object should have at least one host. This means that the lifetime of its host bounds the lifetime of the object and if its host is marked as offline, then it should also be marked as offline.

The hosting relationship is responsible for creating and maintaining an instance of an object within the environment defined by its host. This factoring places the responsibility of creating an instance of a guest on a host with the relationship rather than with either the guest or the host. By providing a range of hosting relationships, a guest can be supported by multiple host environments.

The existence of a hosting relationship indicates that it is possible to place a guest object on a host object. For a system that contains many resources to be hosted on another system, all the resources in the guest system should have hosting relationships to at least one resource in the host system.

2.2.3 Communication

Communication relationships are used to model the communication that occurs between subsystems of a connected system. Since they are expressed between endpoint objects, they can only be established between systems that expose endpoints. If a system contains nested systems that also expose endpoints, these endpoints are exposed through proxy endpoints on the outer system that are in turn delegated to the endpoints of the inner system.

If a communication relationship does not exist between a set of endpoints then a connection cannot be established between those endpoints.

If a system is marked as offline, then all the clients of that system are updated to reflect the fact that the system is unavailable. This is done by propagating the change through the communication relationships that reference the system.

2.2.4 Reference

Reference relationships are used to capture dependencies between resources or systems that are required in order to achieve correct operation but are not considered part of the execution environment of the dependent object.

For example, a web directory needs a reference to either a local directory or a remote share in order to expose web content to consumers of the web service. This would be expressed as a dependency relationship between the web directory and either the local directory or the remote share.

2.2.5 Delegation

A delegation relationship is used to forward interaction with a proxy to an object instance that implements the behavior exposed by the proxy. A commonly used example of delegation is forwarding a communication relationship from an endpoint on a parent system to an endpoint on a contained system.

2.3 Definitions

Object and relationship definitions are used to create reusable configurations that can be instantiated to create instances of that configuration. These instances then share the common characteristics identified by the definition.

An abstract definition cannot be instantiated directly as it is incomplete. To complete it, another definition extends it to add the missing elements.

We use abstract definitions to create building blocks that we can use when building a model of a real system. The relationships between abstract definitions define the allowable structure of the definitions that extend the abstract definition. This allows a design surface to use an abstract definition to define the actions that a user of the surface may perform. For example, the containment relationships in which an abstract web application participates guide the structure of web applications that extend the abstract definition.

In essence, the combination of abstract object definitions and relationship definitions defines a schema for modeling the target system. The role of a concrete object definition is to use a subset of the abstract definition space to create a reusable configuration based on one or more abstract definitions. As a simple analogy, the abstract definition space can be compared to the schema for database; the concrete object definition would then represent a reusable template for a set of rows in the database. The rows are only created in the database when an instance of the concrete object is created. To perform design time validation we can validate a concrete object definition against the abstract definition space in the same way that we would validate the rows in the database against the constraints of the schema (for example foreign keys, etc).

Setting definitions are used to create simple value elements. These values elements can then be used to store configuration information.

2.4 Members

A definition can contain members that reference other definitions. Members allow one definition to reuse another definition in a way that is customized to its particular application.

Setting members are used to identify configuration information that is associated with the definition. Setting members are based on setting definitions Object members are used to create instances of a particular object definition. Settings flow can be used to provide values for the object. When declaring an object member, the user can decide whether the object member is created at the same time the outer system is created (value semantics) or is created by an explicit new operation that occurs at some later time (reference semantics).

Relationship members define the relationships that object members will participate in when they are created. If an object member is contained by its parent, then a containment relationship member will be declared between the member and the containing definition. If the object member is delegated, then a delegation relationship member would be defined between the object member and a source object member. Communication relationship members can be declared between endpoints that communicate. Dependency relationship members (reference and hosting) can be declared the dependent and source object members.

Constraint members are used to narrow the set of relationships that a particular object is willing to participate or the set of objects that can participate in a particular relationship. They identify constraints on an object or relationship that may target the settings of that object or relationship or may constraint the interactions associated with that object or relationship.

Flow members are used to define the flow of configuration between members. They collect input values from settings on members, perform some processing on that information and then distribute the results to settings on members.

2.5 Instances

The instance space reflects the current state of the modeled system. A complete record of the instances that have been created and the relationships between these instances may also be maintained. Each instance has an associated version history where each version is linked to a change request.

The process of creating new instances is initiated by a change request. The change request defines a set of create, update and delete requests for types and relationships associated with specific members of an existing instance; the root is a special case.

The change request is expanded by the runtime, verified against all constraints, and then constructed. The expansion process identifies object and relationship instances that are constructed implicitly as part of the construction request of the containing object and then settings flow is then evaluated across all relationships. The verification step checks that all required relationships exist and that the relationships fulfill all constraints. Finally, the construction process determines an appropriate ordering over the deployment, update or removal of each instance and then in the correct sequence passes each instance to an instance manager to perform the appropriate action.

2.6 The Object Model

The following uml diagrams capture the broad interactions between the objects in the SDM model. For simplicity, some of these interactions have been defined between base types where the actual interactions exist between derived types and as a result are more specialized.

An SDM document contains information that describes the document, managers for the definitions in the document, import statements that reference other documents and a set of definitions for the objects and relationships described by the document. Many SDM elements can also contain design data, which allows the design surface to attribute the SDM elements with information that is specific to the display and manipulation of that element within the design surface.

Figure 8:
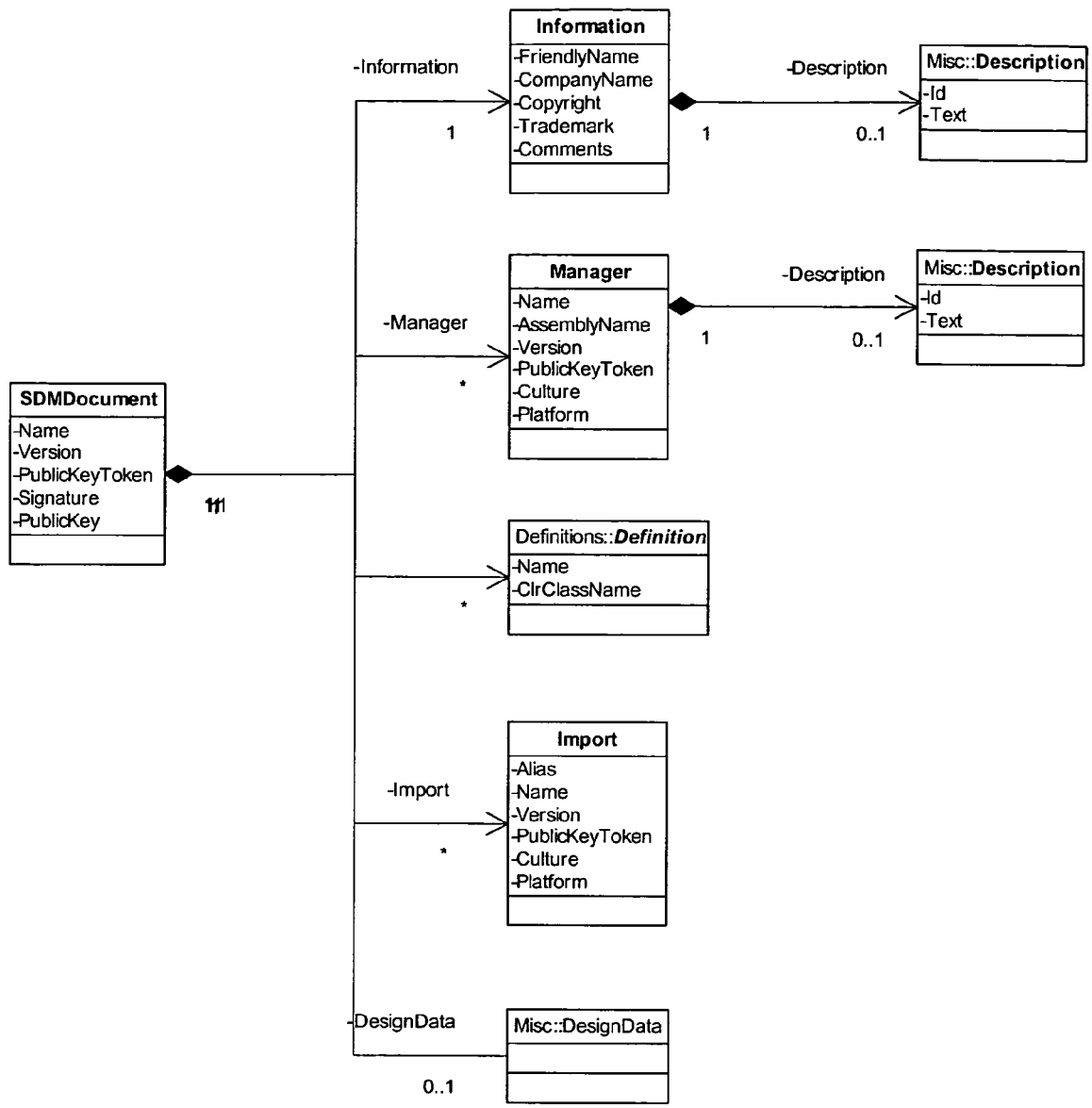
FIG. 8 illustrates an example SDM document.

FIG. 8 illustrates an example SDM document.

Figure 9:
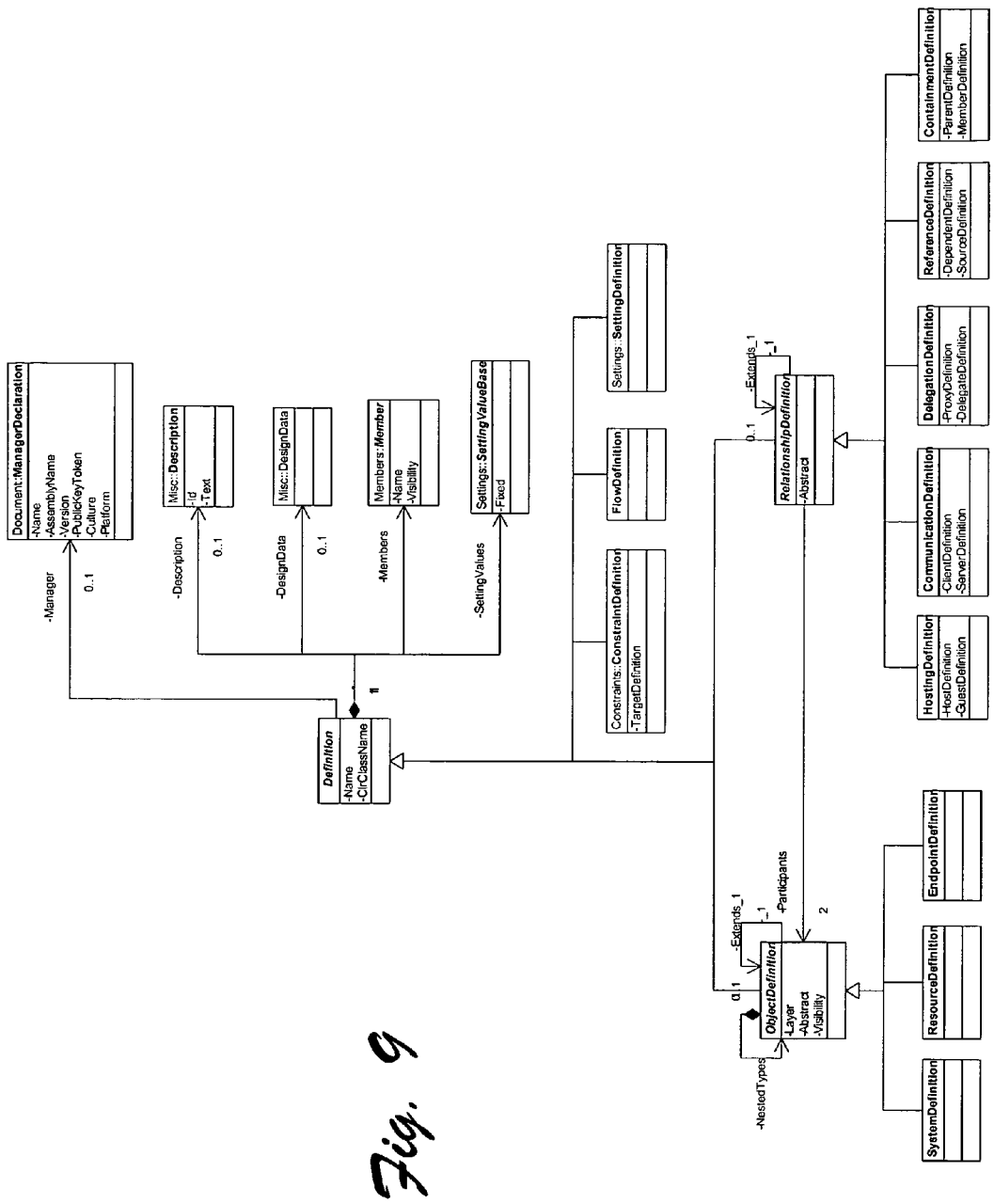
FIG. 9 illustrates an example SDM definition.

All SDM definitions derive from a common base definition as shown in FIG. 9. Definitions may contain a description, a set of members, a set of setting values and design data. We specialize definitions into object, relationship, constraint, flow and setting definitions. Object definitions are then further specialized into System, Resource and Endpoint definitions. Relationship definitions are further specialized into Hosting, Communication, Delegation, Reference and Containment definitions.

Figure 10:
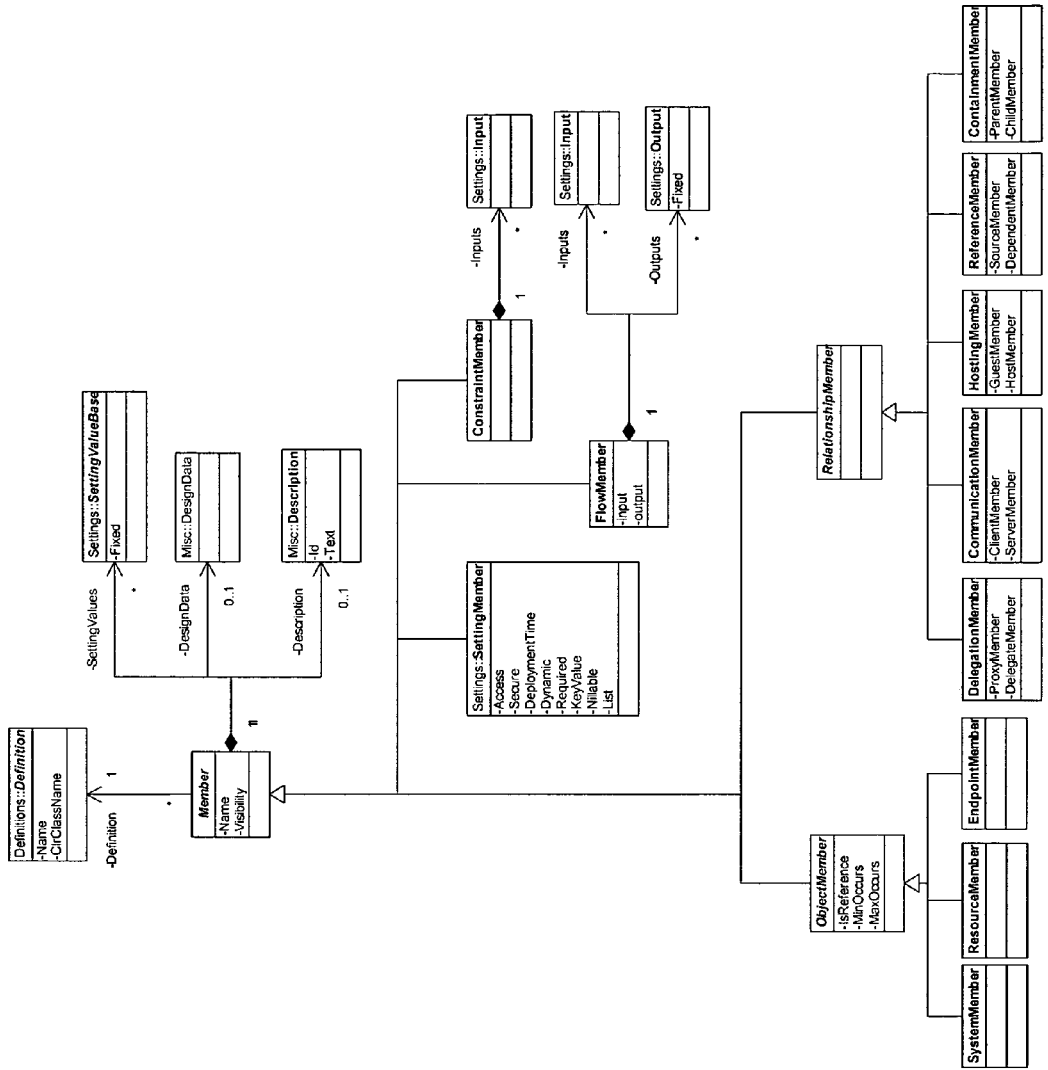
FIG. 10 illustrates an example SDM member.

Members are used to associate a name with a particular instance or array of instances as shown in FIG. 10. All members refer to a definition. Each member may contain a set of setting values, a description and design data. Members are then specialized based on the kind of definition that they reference. Flow and constraint members add the ability to define inputs that source setting values from setting members within the containing definition. Flow members also add outputs that allow the processed flow values to be forwarded to setting members within the containing definition.

Figure 11:
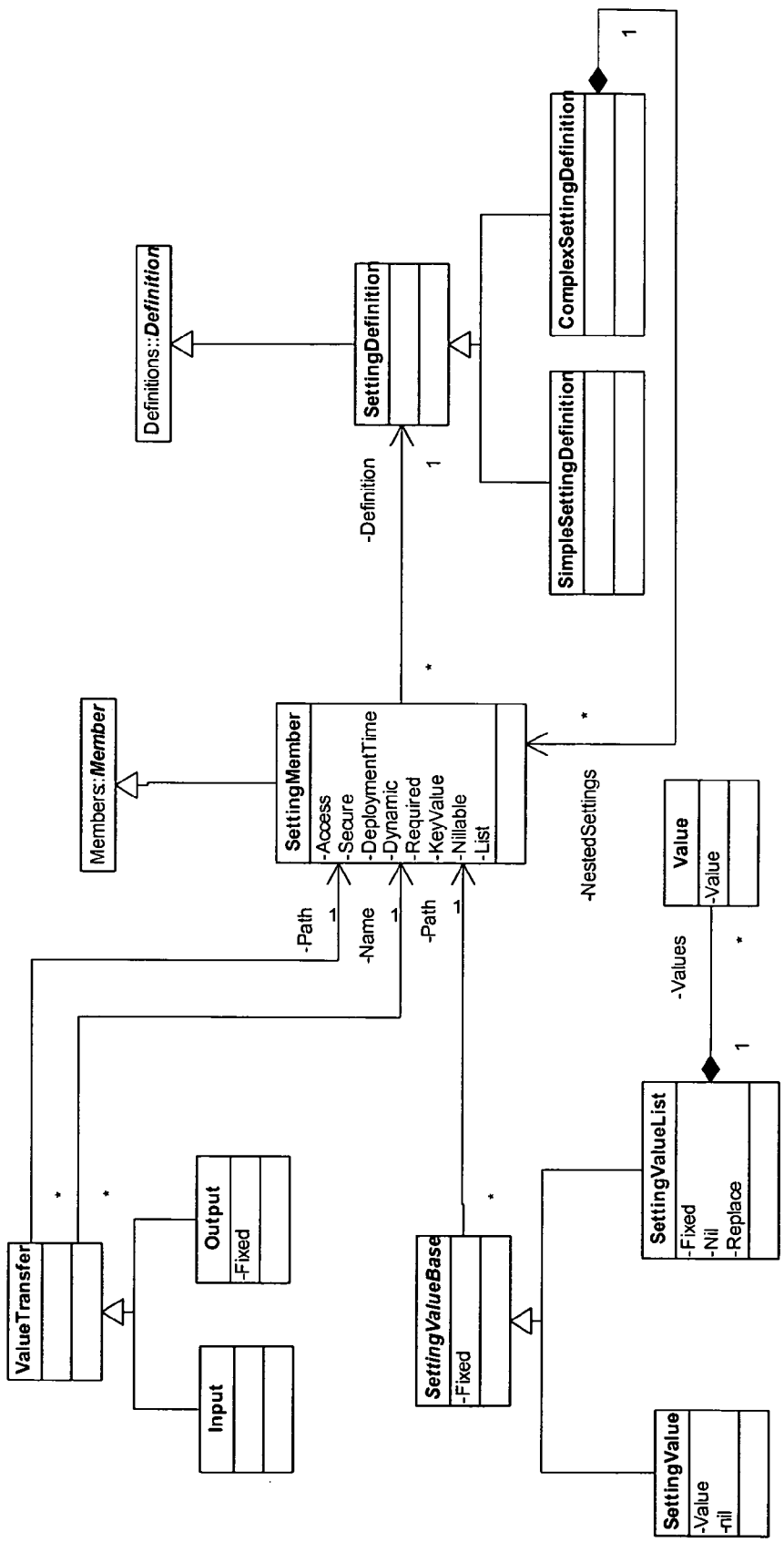
FIG. 11 illustrates an example setting member.

An example setting member is shown in FIG. 11. Setting members reference a setting definition that can either represent a complex or a simple setting definition. A complex setting definition can contain nested setting members. A simple definition defines a single value field. Input and output objects are used to define a transfer of a setting value between setting members.

Figure 12:
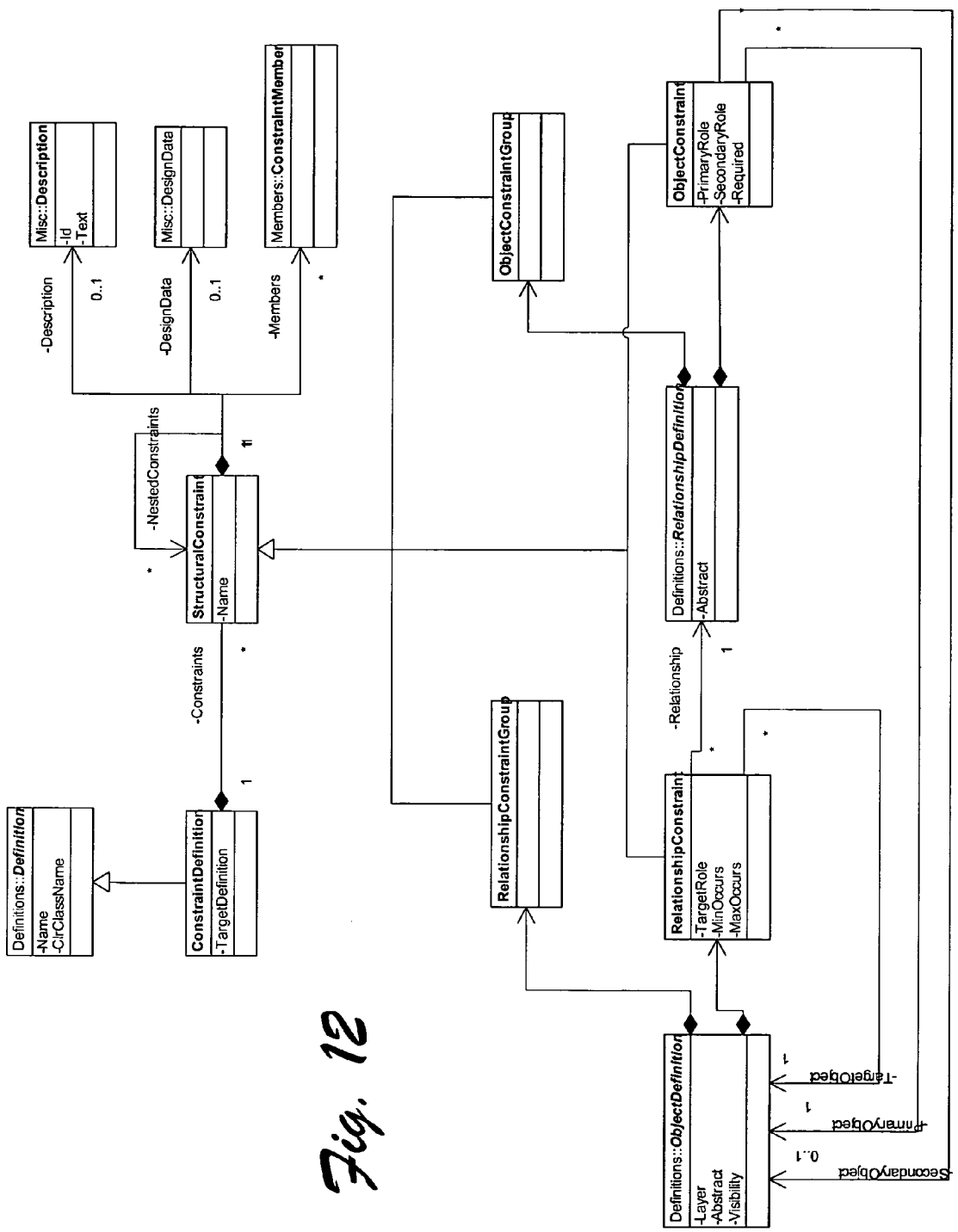
FIG. 12 illustrates an example constraint definition.

An example constraint definition is shown in FIG. 12. Constraints are used place restrictions on setting values and on the structure of an SDM model. A constrain definition targets a particular object or relationship definition. The constraint definition may place structural constraints on the relationships that the object participates in or the objects that participate in a relationship. These structural definitions may also be added directly to the object or relationship definition.

Figure 13:
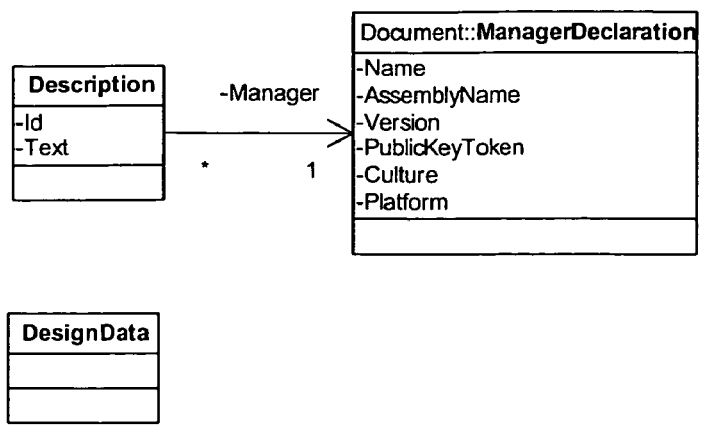
FIG. 13 illustrates an example description object.

Description objects are used to provide human readable descriptions of SDM elements, as shown in FIG. 13. These elements should be localizable which is the responsibility of a manager. Design data elements contain structured data that is defined by the design surface that edits the SDM document.

2.7 Layering

A goal of the SDM model is to allow a separation of concerns between the developers of applications, the designers of the software infrastructure and the architects of the datacenter. Each of these groups focuses on particular services and has a differing set of dependencies.

For example, developers mainly care about the configuration and connectivity between the hosts that they depend on such as SQL, IIS and the CLR. Designers of the host configuration care about the network topology and the OS configuration, while the architects developing the network topology, OS configuration and storage mapping need to know about the hardware that exists in the datacenter.

To support this separation of concerns, SDM exposes a concept of layering. Layering is enabled by the use of hosting relationships. By defining hosting relationships between the operating system, a host such as sql and the services that slq provides eg databases, we allow an application developer to define an application that contains a database while an architect defines a system that contain the sql host. We layer combine these separate systems by connecting the hosting relationships between the guest system and the host system, A layer boundary can occur wherever a hosting relationship exists. In order to simplify the choice of where to place layer boundaries we define four basic layers as part of the SDM model. We then associate systems with one of these layers. The four layers are:

The application layer.

The application layer supports the construction of applications in a constrained context. The context is defined by the configuration of the hosts identified in the host layer Examples of system definitions in the application layer include web services, databases and biztalk schedules.

The host layer

Build datacenters out of software components. Configure the connections between components. Some of these components act as hosts for the application layer.

Examples of system definitions in this layer—IIS, SQL, AD, EXCHANGE, DNS and Biztalk.

The Network/OS/Storage layer

Build data center networks and platforms. Configure the network security model and the operating system platform configuration. Add storage to operating system configurations.

Examples of system definitions in this layer—VLAN, Windows, Filter, Storage.

The Hardware layer

The hardware layer identifies the types of machines that exist in the datacenter and the physical connections that exist between these machines.

Figure 14:
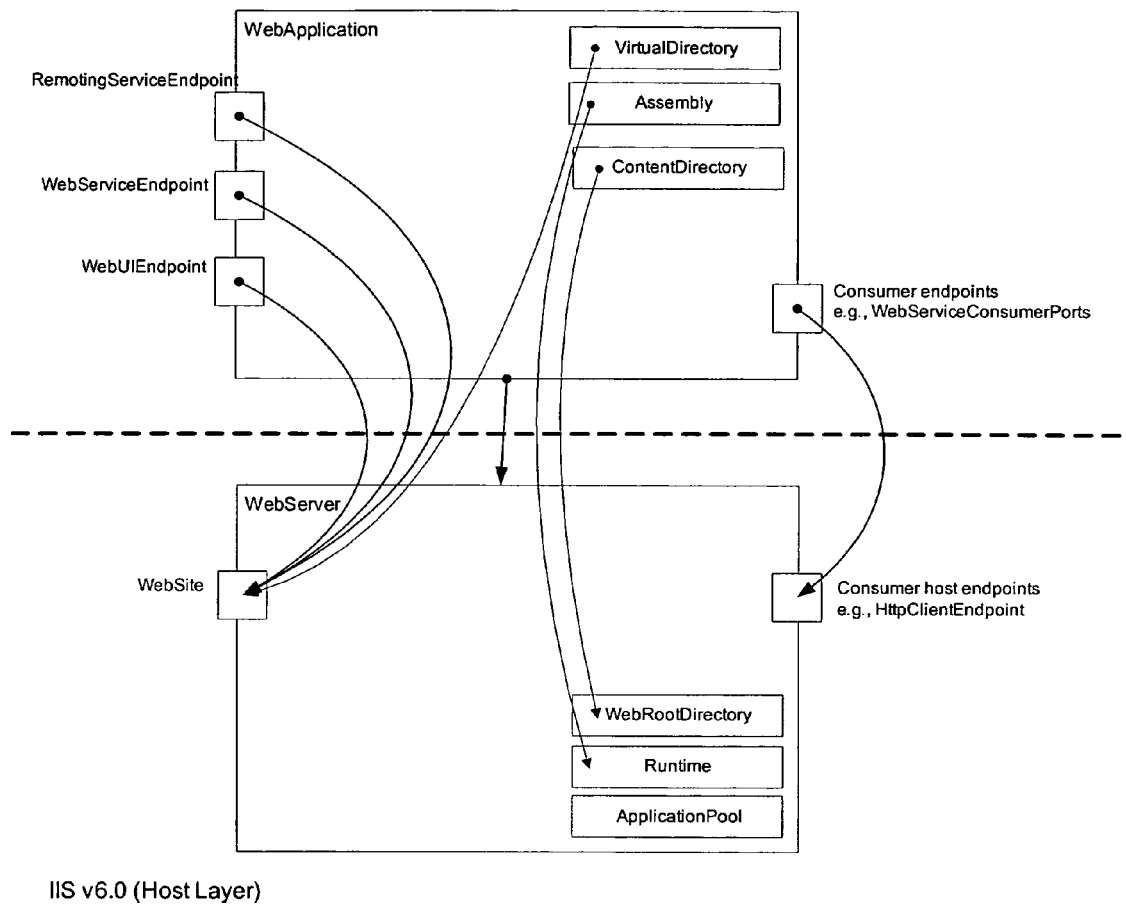
FIG. 14 illustrates an example mapping of a web application in one layer to a web server host in another layer.

FIG. 14 shows an example mapping of a layer 4 web application to a layer 3 web server host. The outer box at each layer represents a system, the boxes on the boundary represent endpoints and the boxes on the inside represent resources. We map each of these elements via a hosting relationship to a host at the layer below.

3 Implementation Details

3.1 Naming

There are a number of places in the SDM where we need a strong naming system for identifying objects. The following naming system allows the creator of an SDM document to sign the document in such a way that users of the definitions in the document can be sure that they are the same as the ones that developer originally published.

The following header is an example of an identifier for an SDM document:

```
<SystemDefinitionModel Name="System.OperatingSystem.FileSystem"
    Version="0.1.0.0"
    DocumentLanguage="en"
    xmlns=
    "http://schemas.microsoft.com/SystemDefinitionModel/2003/10"
        Version="0.1.0.0"
        PublicKeyToken="AAAABBBBCCCCDDDD"
        Culture="neutral"
        Platform="neutral"
    >
</ SystemDefinitionModel >
```

To reference a type in another namespace you import the namespace:

<Import Alias="FileSystem" Name="System.OperatingSystem.FileSystem" Version="0.1.0.0"/>

Then you can use the alias to refer to definitions within the namespace:

FileSystem:File

3.1.1 Identity

SDM names are scoped by the namespace in which they are defined. A namespace is identified by a name, version, language and a public key token and is contained within a single file.

The base form of identity includes name, version, culture, platform and a public key token.

```
<xs:attributeGroup name="Identity">
    <xs:attribute name="Name" type="Path" use="required"/>
    <xs:attribute name="Version" type="FourPartVersionType" use=
    "required"/>
    <xs:attribute name="PublicKeyToken" type="PublicKeyTokenType"
    use="optional"/>
    <xs:attribute name="Culture" type="CultureNeutral" use=
    "optional"/>
    <xs:attribute name="Platform" type="xs:string" use="optional"/>
</xs:attributeGroup>
```

| Attribute/element | Description | Default |
|---|---|---|
| Name | The name of the SDM file is a friendly name that a developer can use to reference the contents of the file. The name in combination with the public key token provides a strong name for the file. | NA |
| Version | Version is used to identify the version of the contents of the file. All elements of the file adopt the same version number | NA |
| PublicKeyToken | Public key token is a short name for the public key associated with the file. | Nil |

-continued

| Attribute/element | Description | Default |
|---|---|---|
| Culture | The culture of the binaries. | neutral |
| Platform | The supported platform for the binaries. | x86 |

The base identity can be used in conjunction with a signature and a public key, to create a new strong identity called a Namespace Identity. This identity is used to identify an SDM document. To create the identity the document will be signed using the private key, allowing the user of the document to verify its contents using the public key.

A public key token is a 16 character hex string that identifies the public part of a public/private key pair. This is not the public key; it is simply a 64 bit hash of the public key.

```
<xs:simpleType name="PublicKeyTokenType">
    <xs:restriction base="xs:string">
        <xs:pattern value="([0-9]|[a-f]|[A-F]){16}"/>
    </xs:restriction>
</xs:simpleType>
```

The document language is specified using a culture identifier that consists of two lower case letters defining the language and then two or three uppercase letters defining the country or region.

```
<xs:simpleType name="Culture">
    <xs:restriction base="xs:string">
        <xs:pattern value="[a-z]{2}((-[A-Z]{2})?|(-[A-Z]{3})?)"/>
    </xs:restriction>
</xs:simpleType>
<xs:simpleType name="CultureNeutral">
    <xs:union memberTypes="Culture">
        <xs:simpleType>
            <xs:restriction base="xs:string">
                <xs:enumeration value="neutral"/>
            </xs:restriction>
        </xs:simpleType>
    </xs:union>
</xs:simpleType>
```

3.1.2 Version

A file version is defined by a four part number of the form N.N.N.N where 0<=N<65535. By convention, the numbers refer to Major.Minor.Build.Revision. The version number identifies the version of all the definitions contained within the document. This means that a document becomes the unit of versioning as all definitions within the document are upgraded together.

```
<xs:simpleType name="FourPartVersionType">
    <xs:restriction base="xs:string">
        <xs:pattern value="([0-9]{1,4}|[0-5][0-9]{4}|64[0-9]{3}|655[0-2][0-9]|6553[0-5])(\.([0-9]{1,4}|[0-5][0-9]{4}|64[0-9]{3}|655[0-2][0-9]|6553[0-5])){3}"/>
    </xs:restriction>
</xs:simpleType>
```

3.1.3 Simple Names

Simple names are made up of alpha-numeric characters and limited punctuation. The name starts with a non-numeric character.

```
<xs:simpleType name="SimpleName">
    <xs:restriction base="xs:string">
        <xs:pattern value="[a-z,A-Z,_]{1}([0-9,a-z,A-Z,_])*"/>
    </xs:restriction>
</xs:simpleType>
```

We plan to conform to the C# definition for identifiers; the appropriate section has been inserted below in the following table. Note we will not support "@" prefixed names in the SDM model.

The rules for identifiers given in this section correspond exactly to those recommended by the Unicode Standard Annex 15, except that underscore is allowed as an initial character (as is traditional in the C programming language), Unicode escape sequences are permitted in identifiers, and the "@" character is allowed as a prefix to enable keywords to be used as identifiers.
identifier:
    available-identifier
    @   identifier-or-keyword
available-identifier:
    An identifier-or-keyword that is not a keyword
identifier-or-keyword:
    identifier-start-character   identifier-part-characters$_{opt}$
identifier-start-character:
    letter-character
    _(the underscore character U+005F)
identifier-part-characters:
    identifier-part-character
    identifier-part-characters identifier-part-character
identifier-part-character:
    letter-character
    decimal-digit-character
    connecting-character
    combining-character
    formatting-character
letter-character:
    A Unicode character of classes Lu, Ll, Lt, Lm, Lo, or Nl
    A unicode-escape-sequence representing a character of classes Lu, Ll, Lt, Lm, Lo, or Nl
combining-character:
    A Unicode character of classes Mn or Mc
    A unicode-escape-sequence representing a character of classes Mn or Mc
decimal-digit-character:
    A Unicode character of the class Nd
    A unicode-escape-sequence representing a character of the class Nd
connecting-character:
    A Unicode character of the class Pc
    A unicode-escape-sequence representing a character of the class Pc
formatting-character:
    A Unicode character of the class Cf
    A unicode-escape-sequence representing a character of the class Cf
For information on the Unicode character classes mentioned above, see The Unicode Standard, Version 3.0, section 4.5.
Examples of valid identifiers include "identifier1", "_identifier2", and "@if". An identifier in a conforming program should be in the canonical format defined by Unicode Normalization Form C, as defined by Unicode Standard Annex 15. The behavior when encountering an identifier not in Normalization Form C is implementation-defined; however, a diagnostic is not required.
The prefix "@" enables the use of keywords as identifiers, which is useful when interfacing with other programming languages. The character @ is not actually part of the identifier, so the identifier might be seen in other languages as a normal identifier, without the prefix. An identifier with an @ prefix is called a verbatim identifier. Use of the @ prefix for identifiers that are not keywords is permitted, but strongly discouraged as a matter of style.

-continued

The example:
```
class @class
{
    public static void @static(bool @bool) {
        if (@bool)
            System.Console.WriteLine("true");
        else
            System.Console.WriteLine("false");
    }
}
class Class1
{
    static void M( ) {
        cl\u0061ss.st\u0061tic(true);
    }
}
```
defines a class named "class" with a static method named "static" that takes a parameter named "bool". Note that since Unicode escapes are not permitted in keywords, the token "cl\u0061ss" is an identifier, and is the same identifier as "@class".

Two identifiers are considered the same if they are identical after the following transformations are applied, in order:
- The prefix "@", if used, is removed.
- Each unicode-escape-sequence is transformed into its corresponding Unicode character.
- Any formatting-characters are removed.

Identifiers containing two consecutive underscore characters (U+005F) are reserved for use by the implementation. For example, an implementation might provide extended keywords that begin with two underscores.

3.1.4 Reserved Names

The following is a list of reserved names that we will prevent users from using when creating names for members in an SDM definition. Within certain contexts, certain names will be reserved. The compiler will detect uses of these names and return an error to the user.

| Context | Name |
|---|---|
| All definitions | this |
| Hosting Relationship definitions | Guest, Host |
| Containment relationship definitions | Parent, Member |
| Communication relationship definitions | Client, Server |
| Reference relationship definitions | Source, Dependent |
| Delegation relationships definitions | Proxy, Delegate |

3.1.5 References to Other Namespaces

We allow namespaces to reference other namespaces by importing them into the current namespace and then associating an alias with the namespace. The imported namespace is referenced by name, version and public key token.

```
<xs:complexType name="Import">
    <xs:attribute name="Alias" type="SimpleName" use="required"/>
    <xs:attributeGroup ref="Identity"/>
</xs:complexType>
```

| Attribute/element | Description |
|---|---|
| Alias | The alias used to reference the external SDM file within the scope of the current SDM file. |
| Identity | The group of attributes defined in section 3.1.1 |

3.1.6 Qualified Names

Qualified names are names that refer to definitions or managers defined in the current namespace or in an aliased namespace. If the name does not include an alias or a "dot separator" then it is unqualified and should be resolved based on the scoping rules. Unqualified paths may resolve to different definitions based on the context in which they are evaluated. This is because nested definitions may hide definitions in a wider scope. See section 3.1.7.

Any path that includes a "dot separator" should be fully qualified and will be resolved from the document root. This means a user cannot create a partially qualified name that contains a more than one type name but can only be resolved from the declaration context.

[<alias>:]<simpleName>(.<simpleName>)*

The alias is defined in an import statement.

```
<xs:simpleType name="QualifiedName">
    <xs:restriction base="xs:string">
        <xs:pattern value="[a-z,A-Z,_]{1}([0-9,a-z,A-Z,_])*
        (:[a-z,A-Z,_]{1}([0-9,a-z,A-Z,_])*)?(\.[a-z,A-Z,_]{1}([0-9,a-z,A-Z,_])*)*"/>
    </xs:restriction>
</xs:simpleType>
```

3.1.7 Name Scoping

Names of definitions are scoped by the context in which they are defined. The broadest scope is the document. If a definition is nested, then its name is scoped by that definition. This means that it may hide names in a parent scope. It also means that a reference to a definition from outside the scope in which it is defined should be qualified by the name of its parent scope. A fully qualified name includes all the names from the document root to the nested definition.

3.1.8 Member Paths

A member path is a sequence of names that correspond to members of the definitions that are crossed. A path should begin with a member name that is defined in the context in which the path is declared.

Some member names are added automatically to a definition. We call these well-known names. Examples of well-known names include "this" in a definition or reference declaration, "Host" and "Guest" in a hosting relationships declaration, or a "Target" defined within a constraint declaration. The setting target also identifies the setting on the associated flow definition that will be used as either the source value or destination setting of setting identified by the path.

Member names are dot separated.

```
<simpleName>(.<simpleName>)*
<xs:simpleType name="Path">
    <xs:restriction base="xs:string">
        <xs:pattern value="[a-z,A-Z]{1}([0-9,a-z,A-Z,_])*
        (\.[a-z,A-Z]{1}([0-9,a-z,A-Z,_])*)*"/>
    </xs:restriction>
</xs:simpleType>
```

3.1.9 Instance Paths

Paths in the instance space are based on xpaths where the element names in the xpath correspond to member names and attributes in the xpath correspond to settings.

3.1.10 Signature

A compiled SDM document is signed using a key in order to provide a mechanism to validate the document's contents and to associate a strong name with the document. The signature mechanism uses the DSIG standard (http://www.w3.org/2000/09/xmldsig#) to sign the document.

A signature node similar to the following is embedded in a signed document.

```
<Signature xmlns="http://www.w3.org/2000/09/xmldsig#">
    <SignedInfo>
        <CanonicalizationMethod Algorithm="http://www.w3.org/TR/2001/REC-xml-c14n-20010315"/>
        <SignatureMethod Algorithm="http://www.w3.org/2000/09/xmldsig#rsa-sha1"/>
        <Reference URI="">
            <Transforms>
                <Transform Algorithm="http://www.w3.org/TR/2001/REC-xml-c14n-20010315"/>
                <Transform Algorithm="http://www.w3.org/2000/09/xmldsig#enveloped-signature"/>
            </Transforms>
            <DigestMethod Algorithm="http://www.w3.org/2000/09/xmldsig#sha1"/>
            <DigestValue>Dn9BN6rKnnzzgGxaWl3j0aW8/1g=</DigestValue>
        </Reference>
    </SignedInfo>
    <SignatureValue>JaNLAktv2+n4Xz3p0jM8zqwmUc8T91AOtwasKOVBwHgvYAGijRFl0U1kcVfHbDJoi8ln33prn
S5lTNj46rGYRn/UK11vjvpprfgz2a+Ql7G4o7hBwO0SZzLLPO7/y7+GKw0Cr6zaoDmOFSdP8lAATuVJC40pZhbDm
cmHJduaXm0=</SignatureValue>
        <KeyInfo>
            <KeyValue xmlns="http://www.w3.org/2000/09/xmldsig#">
                <RSAKeyValue>
    <Modulus>wxxlClOui6J77CZcnzLOcBBxl/3uuFrUBEyFivVklRtTTzQpgirdaNouQ9ziCAK6aipeM6RjgYAoDPs/i
WFnrHmtDoxgP2H4/W9lttXO5EjQDb76XAZRPSvthJYtreKEGE0d6L6iTRdg25hYGFkyY/yS0s0ONh3+5VO0Wxq+
Fx0=</Modulus>
                    <Exponent>AQAB</Exponent>
                </RSAKeyValue>
            </KeyValue>
        </KeyInfo>
</Signature>
```

The node is a root node in the document that should occur before any other contents in the document. We declare this element using the 'any' tag but we will only recognize and process a "Signature" node at this location.

<xs:any namespace="http://www.w3.org/2000/09/xmldsig#" processContents="skip" minOccurs="0"/>

3.1.11 Defining, Referencing and Resolving Namespace Names

In this section, we describe the process that we use to match a namespace reference to a particular namespace. As defined in section 3.1.1, a namespace identity consists of five attributes:

Simple name
Public key token
Version
Language
Platform

These attributes are used by the consumer of a namespace to identify a required namespace (a namespace reference) and the developer of a namespace to provide a well known identity for a namespace (a namespace definition). The interpretation of each of these attributes may be different depending on whether they are part of a namespace reference or a namespace definition.

3.1.11.1 Namespace Definition

When a developer wishes to create and publish a new namespace the developer:

provides a simple name for the namespace
provides a version for the namespace
The developer can optionally:
sign the namespace with a cryptographic key
identify a specific culture for the namespace (defaults to culture neutral)
Identify a specific platform for the namespace (defaults to platform neutral)

If the namespace is not signed, then there will be no public key token and the namespace will have a weak name. A namespace can be delay signed which allows the developer to separate the signing process from the compilation process. A delay signed namespace that has been compiled but not yet signed can be referenced during compilation but can not be used at runtime.

3.1.11.2 Namespace Reference

When a consumer references (imports) a namespace in an SDM file, they:

provide the name of the referenced namespace
They can optionally provide additional information including:
the public key token of the referenced namespace
the minimum version of the referenced namespace
the culture of the referenced namespace or a wildcard (*)
the platform of the referenced namespace or a wildcard (*)
All the attributes that are not provided default to a wildcard that will match any value for the attribute.

3.1.11.3 Matching a Reference to a Definition

The following algorithm is used to match a namespace reference to namespace definition. This algorithm is used both when compiling a namespace and when resolving references between compiled namespaces.

There is one slight difference between the compilation and post compilation scenarios: at compile time the version field of the namespace reference is ignored, but a runtime it must be present. The compilation process will update a namespace reference to add additional information from the namespace that a reference was resolved to during compilation. It will always add the version from the namespace. If the public key token was not provided and it exists on the resolved namespace, it will be added to the namespace reference.

Logically, the resolution algorithm works as follows:
1. Find all namespaces with names that matches the name in the reference.
2. If the reference provides a public key token then select only the namespaces that also match the provided public key token.

3. If a specific language has been provided by the reference, then remove all namespaces that don't match the language. If the language attribute was set to wildcard not provided, then keep all namespaces
4. If a specific platform has been provided then remove all namespaces that don't match the platform. If platform attribute was set to wildcard or not provided, then keep all namespaces
5. Then use versioning policy to select a particular namespace from the set of possible namespaces.

The following sections define these steps in more detail.

3.1.11.3.1 Matching Namespace Name

The name match is an exact string match. The name is case sensitive.

3.1.11.3.2 Matching Public Key Token

The token is an exact match.

3.1.11.3.3 Matching Language

There are three scenarios for language matching:
1. Reference=*, Definition=specific language.
2. Reference=specific language, Definition=*.
3. Reference=specific language, Definition=specific language.

For the first and second cases, the definition is a match for the reference. In the third case, the definition is only a match for the reference if the language is an exact match.

3.1.11.3.4 Matching Platform

There are three scenarios for platform matching.
1. Reference=*, Definition=specific platform.
2. Reference=specific platform, Definition=*.
3. Reference=specific platform, Definition=specific platform.

For the first and second cases, the definition is a match for the reference. In the third case, the definition is only a match for the reference if the platform is an exact match.

3.1.11.3.5 Matching Version

The version match is dependent on the versioning policy that is being used by the compiler or runtime.

3.2 Settings

All definitions can expose settings members, called setting declarations within the XML schema. These members are used to describe the configuration values that are associated with the definition. Values are provided using SettingValue statements. These can be used by:
  a) The definition that declares the setting member to define the default values for the setting.
  b) By a definition that extends another definition to provide default or fixed values for the base definition.
  c) By members that reference a definition and through member paths that terminate in the member that references the definition.
  d) Through flow along relationships.

To define a setting you first need to define the definition of the setting using xsd.

```
<SettingDefinitions>
    <xs:schema targetNamespace="System.OperatingSystem.Registry"
            xmlns="System.OperatingSystem.Registry"
            xmlns:xs="http://www.w3.org/2001/XMLSchema">
        <xs:simpleType name="PathType">
            <xs:restriction base="xs:string"/>
        </xs:simpleType>
        <xs:simpleType name="RegistryValueType">
            <xs:restriction base="xs:NMTOKEN">
```

-continued

```
                <xs:enumeration value="binary"/>
                <xs:enumeration value="integer"/>
                <xs:enumeration value="long"/>
                <xs:enumeration value="expandString"/>
                <xs:enumeration value="multiString"/>
                <xs:enumeration value="string"/>
            </xs:restriction>
        </xs:simpleType>
    </xs:schema>
</SettingDefinitions>
```

You can then declare a setting that uses the definition and includes a set of attributes to define the behavior of the setting.
<SettingDeclaration Name="Definition" Definition="RegistryValueType" Access="Readwrite"Required="true"/>

Once you have a setting declaration you can provide a value for the setting.
<SettingValue Name="Definition" Fixed="true">long</SettingValue>

3.2.1 Setting Definitions

We use XSD schemas to define the setting definitions used by setting members. We only support the use of simple and complex types from a schema though other schema elements may exist to support the definition of those types.

The settings definition section should contain a complete xml schema including namespace declaration and namespace imports. We will check that the imports in the xsd schema match the imports in the SDM file with the exception of the xsd schema namespace. This means that all referenced types should be defined in another SDM file; the schema cannot reference types that are defined in arbitrary xsd files.

The target namespace of the schema has to match the name of the SDM document. We will add the public key for the document to the namespace name when we sign the document in order to guarantee that the namespace name is unique. So the compiler will change targetNamespace="System" to targetNamespace="System/AAAABBBBCCCCDDDD".

When a setting definition schema references the namespace from another document they will use the full namespace name: xmlns:system="System/AAAABBBBCCCCDDDD".

```
<xs:complexType name="SettingDefinitions">
    <xs:sequence>
        <xs:any namespace="http://www.w3.org/2001/XMLSchema"/>
    </xs:sequence>
    <xs:attribute name="Manager" type="QualifiedName"
        use="optional"/>
    <xs:attribute name="ClrNamespace" type="xs:string"
        use="optional"/>
</xs:complexType>
```

| Attribute/element | Description |
|---|---|
| xs:any | A schema in the http://www,w3,org/2001/XMLSchma namespace. |
| Manager | The clr assembly that contains helper classes for this schema |
| ClrNamespace | The clr namespace in which these classes are defined. All setting type will resolve to a clr based on their mapping through CLR serialization. |

Settings are resolvable from three separate namespaces:
a) The SDM namespace—when we refer to setting types within system, resource, endpoint, relationship, constraint or flow types.
b) The clr namespace—when we refer to settings using strongly typed classes within the clr and when setting types are built on other setting types.
c) The XSD namespace—when setting types are built using other setting types.

For this to work, we place a number of restrictions on the way we declare settings:
a) All settings must be in the same groupings within each of the clr, SDM and xsd namespaces. That is, if two settings are together in one namespace, they must be together in all three namespaces.
b) Imported namespaces within an xsd schema definition must match the imported namespaces in an SDM file and the imported namespaces in the associated helper assembly.
c) With the exception of the xsd namespace, all imported namespaces in an xsd schema must be defined within an SDM file.

XSD types from imported SDM documents are accessible using QNames:

<alias>:<type-name>

The following example uses the type defined in the registry example above. The document imports the registry document that includes the setting definition.

```
<Import Alias="Registry" Name="System.OperatingSystem.Registry" Version="0.1.0.0"
PublicKeyToken="AAAABBBBCCCCDDDD"/>
```

The setting definitions schema can then also reference the System.Operatingsystem.Registry namespace.

```
<SettingDefinitions>
    <xs:schema targetNamespace=" http://DocumentExamples"
        xmlns="http://DocumentExamples"
        xmlns:reg="System.OperatingSystem.Registry/
        AAAABBBBCCCCDDDD"
        xmlns:xs="http://www.w3.org/2001/XMLSchema">
        <xs:simpleType name="UsesReg">
            <xs:restriction base="reg:RegistryValueType">
                <xs:enumeration value="guid"/>
            </xs:restriction>
        </xs:simpleType>
    </xs:schema>
</SettingDefinitions>
```

3.2.2 Built in Simple Data Types

The SDM supports a limited set of built in data types that are an intersection of the XSD and C# namespaces. These types are supported natively by the SDM runtime and are defined in the following table. In addition to these types, users are free to construct and use their own mapping between xsd and cls types.

| Type | Description | XSD Type | C# Type |
| --- | --- | --- | --- |
| String | A string is a sequence of Unicode characters | string | String |
| Int | 32-bit signed integral type | int | System.Int32 |
| UnsignedInt | 32-bit unsigned integer | unsignedInt | System.UInt32 |
| Long | 64-bit signed integral type | long | System.Int64 |
| UnsignedLong | 64-bit unsigned integer | unsignedLong | System.UInt64 |
| Float | Single-precision floating point type | float | float |
| Double | Double-precision floating point type | double | double |

-continued

| Type | Description | XSD Type | C# Type |
|---|---|---|---|
| Boolean | a boolean value is either true or false (accepted values are "true", "false", 0 and 1) | boolean | bool |
| Any | The base type of all other types | anyType | object |
| DateTime | A simple date | date | dateTime |
| Guid | A globally unique identifier | String (with pattern) | System.Guid |
| Duration | A time interval | Duration | System.Timespan |
| Version | A version number | String pattern:= "([0-9]{1,4}\|[0-5][0-9]{4}\|64[0-9]{3}\|655[0-2][0-9]\|6553[0-5])(\.([0-9]{1,4}\|[0-5][0-9]{4}\|64[0-9]{3}\|655[0-2][0-9]\|6553[0-5])){3}"/> | System.Version |
| Culture | A culture identifier | String pattern:= | System.CultureInfo |

These types can be flowed to compatible derivations of these types in the c# and xsd type spaces. For example a value for string can be flowed to an xsd type that defined a restriction on string and any value can be flowed to a setting that accepts type="any".

3.2.2.1 XSD Built in Types

Figure 15:
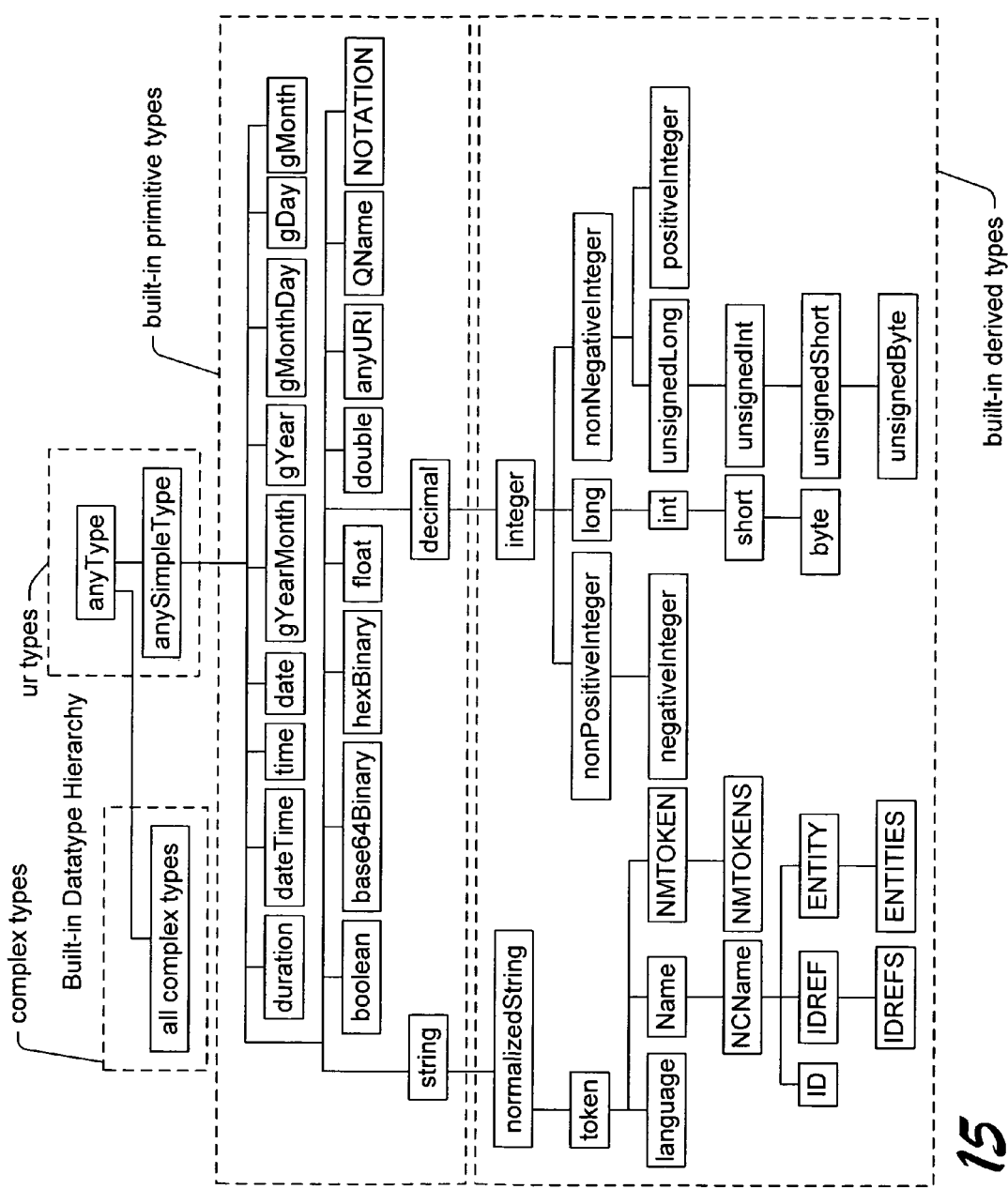
FIG. 15 illustrates an example built-in datatype hierarchy.

FIG. 15 illustrates an example built-in datatype hierarchy. In FIG. 15, the all complex types are derived by extension or restriction. The NMTOKENS, IDREFS, and ENTITIES types are derived by list. All other types shown in FIG. 15 are derived by restriction.

3.2.2.2 C# Data Types

| Type | Description | Example |
|---|---|---|
| object | The ultimate base type of all other types | object o = null; |
| string | String type; a string is a sequence of Unicode characters | string s = "hello"; |
| sbyte | 8-bit signed integral type | sbyte val = 12; |
| short | 16-bit signed integral type | short val = 12; |
| int | 32-bit signed integral type | int val = 12; |
| long | 64-bit signed integral type | long val1 = 12; long val2 = 34L; |
| byte | 8-bit unsigned integral type | byte val1 = 12; |
| ushort | 16-bit unsigned integral type | ushort val1 = 12; |
| uint | 32-bit unsigned integral type | uint val1 = 12; uint val2 = 34U; |
| ulong | 64-bit unsigned integral type | ulong val1 = 12; ulong val2 = 34U; ulong val3 = 56L; ulong val4 = 78UL; |
| float | Single-precision floating point type | float val = 1.23F; |
| double | Double-precision floating point type | double val1 = 1.23; double val2 = 4.56D; |
| bool | Boolean type; a bool value is either true or false | bool val1 = true; bool val2 = false; |
| char | Character type; a char value is a Unicode character | char val = 'h'; |
| decimal | Precise decimal type with 28 significant digits | decimal val = 1.23M; |

3.2.2.3 Supported Conversions

These are the conversions that exist between xsd types and cls types.

| XML Schema (XSD) type | .NET Framework type |
|---|---|
| anyURI | System.Uri |
| base64Binary | System.Byte[ ] |
| Boolean | System.Boolean |
| Byte | System.SByte |
| Date | System.DateTime |
| dateTime | System.DateTime |
| decimal | System.Decimal |
| Double | System.Double |
| duration | System.TimeSpan |
| ENTITIES | System.String[ ] |
| ENTITY | System.String |
| Float | System.Single |
| gDay | System.DateTime |
| gMonthDay | System.DateTime |
| gYear | System.DateTime |
| gYearMonth | System.DateTime |
| hexBinary | System.Byte[ ] |
| ID | System.String |
| IDREF | System.String |
| IDREFS | System.String[ ] |
| int | System.Int32 |
| integer | System.Decimal |
| language | System.String |
| long | System.Int64 |
| month | System.DateTime |
| Name | System.String |
| NCName | System.String |
| negativeInteger | System.Decimal |
| NMTOKEN | System.String |
| NMTOKENS | System.String[ ] |
| nonNegativeInteger | System.Decimal |
| nonPositiveInteger | System.Decimal |
| normalizedString | System.String |
| NOTATION | System.String |
| positiveInteger | System.Decimal |
| QName | System.Xml.XmlQualifiedName |
| short | System.Int16 |
| string | System.String |
| time | System.DateTime |
| timePeriod | System.DateTime |
| token | System.String |
| unsignedByte | System.Byte |

| XML Schema (XSD) type | .NET Framework type |
|---|---|
| unsignedInt | System.UInt32 |
| unsignedLong | System.UInt64 |
| unsignedShort | System.UInt16 |

3.23 Setting Members

The settings declaration section uses the setting definitions from the previous section to create named settings. The setting definition within the xsd schema is referenced using a qualified name that includes the alias for the document that contains the setting (not required if the setting definition is in the current document) and then the name of the setting. We do not use the xsd namespace when referring to a setting definition.

Attributes are used to provide further information about each setting member.

```
<xs:complexType name="SettingMember">
    <xs:complexContent>
        <xs:extension base="Member">
            <xs:attribute name="List" type="xs:boolean"/>
            <xs:attributeGroup ref="SettingsAttributes"/>
        </xs:extension>
    </xs:complexContent>
</xs:complexType>
```

| Attribute/element | Description |
|---|---|
| SettingsAttributes | The set of attributes that can be applied to an individual setting declaration See section 3.2.5 |
| List | This attribute is used to indicate that this setting is a list of values rather than a single value. |

3.2.4 List Support

In order to support manipulation of multi-valued settings, we support simple lists of setting values. A list is a sequence of values of the same definition as the setting declaration. Lists can be flowed to other lists that that they can either replace or append to. We do not support duplicate detection when appending values to a list as this can be done more flexibly using settings flow and we do not guarantee any form of ordering.

A list declaration includes an attribute list set to true:
    `<SettingDeclaration Name="roles" Definition="String" List="true"/>`

Values are then provided using a settingValueList. When providing the list, the user can specify whether to replace or append to the previous values.

```
<SettingValueList Path="roles" Fixed="true" Replace="true">
    <Value>staticContent</Value>
    <Value>aspPages</Value>
</SettingValueList>
```

The SDM supports simple manipulation of lists of values. When a path from a flow member targets a setting declaration, then the resulting behavior is dependent of the definitions at either end of the path.

| Source | Destination | Result |
|---|---|---|
| Element | List | replace = false - element is added to the list |
| | | replace = true - list with single element |
| List | List | replace = false - source and destination lists are merged |
| | | replace = true - source list |
| List | Element | The SDM cannot resolve which element to select from the list so this combination is not supported. Use flow to make this work. |

3.2.5 Setting Attributes

Setting attributes are used by the runtime to describe the behavior of a particular setting.

```
<xs:attributeGroup name="SettingsAttributes">
    <xs:attribute name="Access">
        <xs:simpleType>
            <xs:restriction base="xs:string">
                <xs:enumeration value="Readwrite"/>
                <xs:enumeration value="Readonly"/>
                <xs:enumeration value="Writeonly"/>
            </xs: restriction>
        </xs:simpleType>
    </xs:attribute>
    <xs:attribute name="Secure" type="xs:boolean"/>
    <xs:attribute name="DeploymentTime" type="xs:boolean"/>
    <xs:attribute name="Dynamic" type="xs:boolean"/>
    <xs:attribute name="Required" type="xs:boolean"/>
    <xs:attribute name="KeyValue" type="xs:boolean"/>
    <xs:attribute name="Nillable" type="xs:boolean"/>
</xs:attributeGroup>
```

| Attribute Name | Description | | | Default |
|---|---|---|---|---|
| Access | The access attribute of a setting specifies whether reading and writing the setting's value is permitted; providing SDM runtime access control and display/editing rules to designers. | | | readWrite |
| | Attribute Value | Meaning in SDM Runtime | Display/Editing Rules | |
| | readwrite | Indicates that a setting value can be read and written. | Value is displayed and can be edited. | |

-continued

| Attribute Name | | Description | Default |
|---|---|---|---|
| | readonly | Indicates that a setting value can be read, but not written. This value cannot be a target for flow. In general a readonly setting will be one that is calculated or provided by the real world instance. Example: A value that represents the number of connections on a server | Value is displayed, but cannot be edited. |
| | writeonly | Indicates that a setting value can be written, but not read. This value cannot be a source for flow. Example: a password for a service account | Value is masked, but can be edited. |
| DeploymentTime | | A value that can only be provided as part of the deployment process for an instance. Design time constraints cannot be evaluated against this value. A definition or member cannot supply a fixed value for this setting. | False |
| Required | | If required is true, a value must be provided for this setting before an instance is deployed. This setting cannot be readonly. | False |
| Dynamic | | If dynamic is true, the instance manager supports changes to this value after an instance has been deployed. | True |
| KeyValue | | Keyvalue is used to Indicate that a setting is unique within its hosting scope. The instance manager will use this setting in paths to identity object instances and to detect collisions with existing instances. | False |
| Secure | | The secure attribute of a setting specifies whether the value of a setting should be encrypted (true or false) when stored to an SDM document. Also indicates whether tools should log this value during manipulations such as installs. | False |
| Nillable | | The Nillable attribute of a setting indicates whether a setting value is valid if does not contain any value. | false |

3.2.6 Setting Values

Depending on whether the setting has been declared as a single value or a list, the value for the setting can be provided using either a setting value element or a setting value list element.

3.2.6.1 Setting Value

A setting value statement is used to provide a value for a particular setting declaration. The value must match the definition associated with the declaration of must be able to be cast or converted to the definition associated with the setting declaration. If the value is declared fixed, then the provided value will be used in all derived definitions or referencing members depending on the point at which the value is fixed. Once a value is fixed, it cannot be overridden.

```
<xs:complexType name="SettingValue" mixed="true">
    <xs:sequence>
        <xs:any processContents="skip" minOccurs="0"
            maxOccurs="unbounded"/>
    </xs:sequence>
    <xs:attribute name="Path" type="Path" use="required"/>
    <xs:attribute name="Fixed" type="xs:boolean" use="optional"/>
```

-continued

```
    <xs:attribute name="Nil" type="xs:boolean"/>
    <xs:attribute name="Definition" type="QualifiedName"
        use="optional"/>
</xs:complexType>
```

| Attribute/ element | Description |
|---|---|
| Path | The path to the setting declaration that this value will apply to. |
| Fixed | The fixed attribute controls whether the value provided can subsequently be overridden by new values A fixed value of true indicates that the value provided for a setting cannot be overridden If the value of fixed is true on a concrete definition member's setting value, it is fixed in all deployments of that member. Otherwise, if the value of fixed is false it is override-able in each deployment of that member. If the value of fixed is true on a concrete definition's setting value, it is fixed for all members (i.e., uses) of that concrete definition. |

| Attribute/element | Description |
|---|---|
| | Otherwise, if the value of fixed is false, it may vary with each member (i.e., use) of that concrete definition.<br>If the value of fixed is true on an abstract definition's setting value, it is fixed for concrete definitions that implement or abstract objects that extend that abstract definition. Otherwise, if the value of fixed is false, it may be overridden by a concrete definition, in a derived abstract definition or in a member declaration. |
| Nil | Finally, a setting value is considered valid without content if it has the attribute Nill with the value true. An element so labeled must be empty, but can carry attributes if permitted by the setting definition. |
| Definition | The definition attribute can contain a reference to a setting definition. If it is provided then the setting value is typed with this definition. If it is not provided then the setting definition of the setting declaration at the end of the path is used to type the setting value. |

3.2.6.2 Setting Value List

A setting value list is used to provide one or more values for a setting declared as a list. When declaring the values the user can decide to merge with previous values or to overwrite all previous values.

```
<xs:complexType name="SettingValueList">
    <xs:sequence>
        <xs:element name="Value" minOccurs="0"
        maxOccurs="unbounded">
            <xs:complexType mixed="true">
                <xs:sequence>
                    <xs:any processContents="skip"
                    minOccurs="0" maxOccurs="unbounded"/>
                </xs:sequence>
            </xs:complexType>
        </xs:element>
    </xs:sequence>
    <xs:attribute name="Path" type="SimpleName" use="required"/>
    <xs:attribute name="Fixed" type="xs:boolean" use="optional"/>
    <xs:attribute name="Replace" type="xs:boolean" use="optional"/>
    <xs:attribute name="Definition" type="QualifiedName"
    use="optional"/>
</xs:complexType>
```

| Attribute/element | Description |
|---|---|
| Path | The name of the setting declaration that this value will apply to. |
| Fixed | The fixed attribute controls whether the value provided can subsequently be overridden by new values A fixed value of true indicates that the value provided for a setting cannot be overridden<br>If the value of fixed is true on a concrete definition member's setting value, it is fixed in all deployments of that member. Otherwise, if the value of fixed is false it is override-able in each deployment of that member.<br>If the value of fixed is true on a concrete definition's setting value, it is fixed for all members (i.e., uses) of that concrete definition. Otherwise, if the value of fixed is false, it may vary with each member (i.e., use) of that concrete definition. |

| Attribute/element | Description |
|---|---|
| | If the value of fixed is true on an abstract definition's setting value, it is fixed for concrete definitions that implement or abstract objects that extend that abstract definition. Otherwise, if the value of fixed is false, it may be overridden by a concrete definition, in a derived abstract definition or in a member declaration. |
| Replace | The replace attribute is used to indicate whether the new value for a setting should replace or merge with any previous non-fixed values for a setting.<br>If replace is true then all previous values will be ignored. If replace is false, then the new and the previous values will be combined into a single list. Duplicates will NOT be detected during the merge process. |
| Definition | The definition attribute can contain a reference to a setting definition. If it is provided then each of the setting values are typed with this definition. If it is not provided then the setting definition of the setting declaration at the end of the path is used as the type for each setting value. |

3.2.7 Settings Inheritance

Settings inheritance means that a derived definition implicitly contains all the settings declarations from the base definition. Some important aspects of settings inheritance are:

Settings inheritance is transitive. If C is derived from B, and B is derived from A, then C inherits the settings declared in B as well as the settings declared in A.

A derived definition can add new settings declarations to those it inherits from the base definition it extends, but it cannot remove or change the definition of an inherited setting.

3.2.8 Setting Instances

The setting instance in the instance space holds the actual value for a setting member. The value for a setting instance is initially assigned through setting value statements in the definition space. Then setting flow is evaluated, updating the values for setting instances that are the targets of flow.

In some scenarios, we need to differentiate between the setting value derived from setting value statements and any values later provided through flow. We call the former the "assigned" value and the latter the "resultant" value.

3.2.9 Value Transfer

In order to pass setting values into or out of a flow or constraint we use value transfers. An Input transfer is evaluated before the definition associated with the member is evaluated, and an Output transfer is evaluated after the definition associated with the member is evaluated.

Each value transfer identifies through the Name attribute the setting on the definition that will be used as either the destination for an Input or the source for an Output. The path attribute identifies a setting declaration that is the source for an Input or the destination for an Output.

```
<xs:complexType name="ValueTransfer">
    <xs:attribute name="Name" type="SimpleName"/>
    <xs:attribute name="Path" type="Path"/>
</xs:complexType>
```

| Attribute/<br>element | Description |
|---|---|
| Name | The name of the setting on the flow or constraint definition that is the source or destination of the setting identified by the path. |
| Path | Path to the source or destination setting relative to the context in which the member is defined. The path identifies a single setting - this implies that the maximum cardinality of all the members on the path should be one or zero. |

3.2.9.1 Input

An input statement identifies an input value that will be transferred before the flow or constraint is executed. The input can use the ValueSource element to select whether the "assigned" or the "resultant" setting value is used as the input (see section XX for definition of assigned/resultant).

```
<xs:complexType name="Input">
    <xs:complexContent>
        <xs:extension base="ValueTransfer">
        </xs:extension>
    </xs:complexContent>
</xs:complexType>
```

3.2.9.2 Output

Output is a variation on the value transfer that supports the semantics for fixing and replacing the target values.

```
<xs:complexType name="Output">
    <xs:complexContent>
        <xs:extension base="ValueTransfer">
            <xs:attribute name="Fix" type="xs:boolean"
                use="optional"/>
            <xs:attribute name="Replace" type="xs:boolean"
                use="optional"/>
        </xs:extension>
    </xs:complexContent>
</xs:complexType>
```

| Attribute/<br>element | Description |
|---|---|
| Fix | This will declare the target value to be fixed. This means that any attempts to subsequently modify the value will result in an error. |
| Replace | When a list is the target of the path, we can choose to either merge or replace the current contents of the list. The default behavior is to merge with the current contents. |

3.2.10 Casting

We support casting up and down the setting definition inheritance tree. When a source definition is derived from the destination definition, the cast from the source to the destination definition is called an upcast. When the destination definition is derived from the source definition, the cast from the source to the destination is called a downcast. Since the root of the tree is always the Any definition, all definitions can be upcast to Any.

Figure 16:
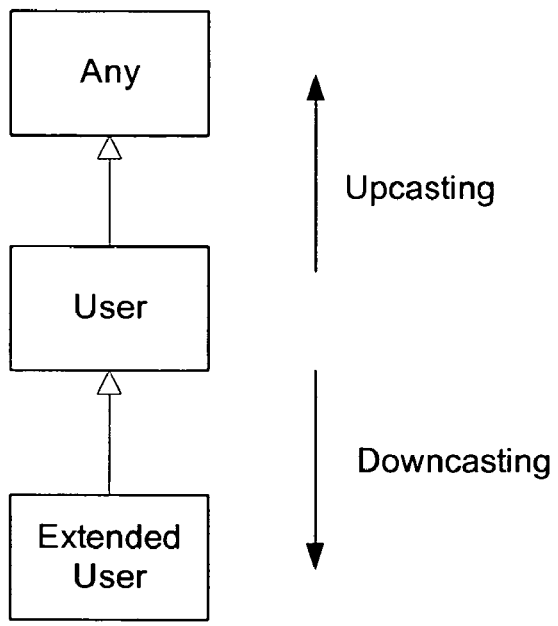
FIG. 16 illustrates an example of upcasting and downcasting.

FIG. 16 illustrates an example of upcasting and downcasting. In FIG. 16, the User definition extends the base definition Any. The ExtendedUser definition in turn extends the base definition User. By constructing this definition hierarchy we are indicating that an ExtendedUser definition can be provided anywhere a User definition is required and that a both an ExtendedUser and a User definition can be provided anywhere an Any definition is required.

The following setting declaration statements use the definitions from FIG. 16, and will be used in the examples in the following sections.

```
<SettingDeclaration Name="First" Definition="ExtendedUser"/>
<SettingDeclaration Name="Second" Definition="Any"/>
<SettingDeclaration Name="Third" Definition="User"/>
```

3.2.10.1 Upcasts

In FIG. 16, an upcast would occur when an instance of the ExtendedUser definition is assigned to a setting declaration that requires a definition of either User or Any. An example of an upcast would be a transfer of a value from the setting declaration First to the setting declaration Second. This might occur as part of a flow input declaration.

Upcasts are supported automatically. Any value can be cast to one of its base definitions without the need for any special interaction on the part of the developer. When a setting instance is upcast, the actual definition of the instance is kept with the setting value.

3.2.10.2 Downcasts

In FIG. 16, a downcast would occur when a user transfers a setting value from a setting declaration marked as Any to a setting declaration marked as User. In this case, the assignment can only occur if the definition associated with the instance is User or ExtendedUser. This implies that setting instance may have definitions that are different from the setting declaration that they are currently associated with. We track this in the instance space by passing a reference to the actual definition of the instance around with the instance itself.

An example of a downcast might occur when we pass a setting instance from Second to Third assuming that the instance initially came from First. In this case, the setting instance is an instance of the ExtendedUser definition. This example may occur when a setting instance is transferred out of a flow definition.

Downcasts are explicitly requested by the developer and will fail if the runtime definition of the instance is not equal to or derived from the target definition. To request a downcast the developer sets the Cast attribute on the associated transfer operation (input or output) to true. If a cast is requested then the user will receive a compile time error if the destination definition is not a derivation of the source definition, and will receive a runtime error if the definition of the setting instance is not the same as or derived from the destination definition.

3.2.11 Conversions

Type conversions are required when a user wishes to transfer a setting instance to a setting declaration that has a different definition from the instance and the setting declaration's definition is not a base definition of the instance's definition.

Figure 17:
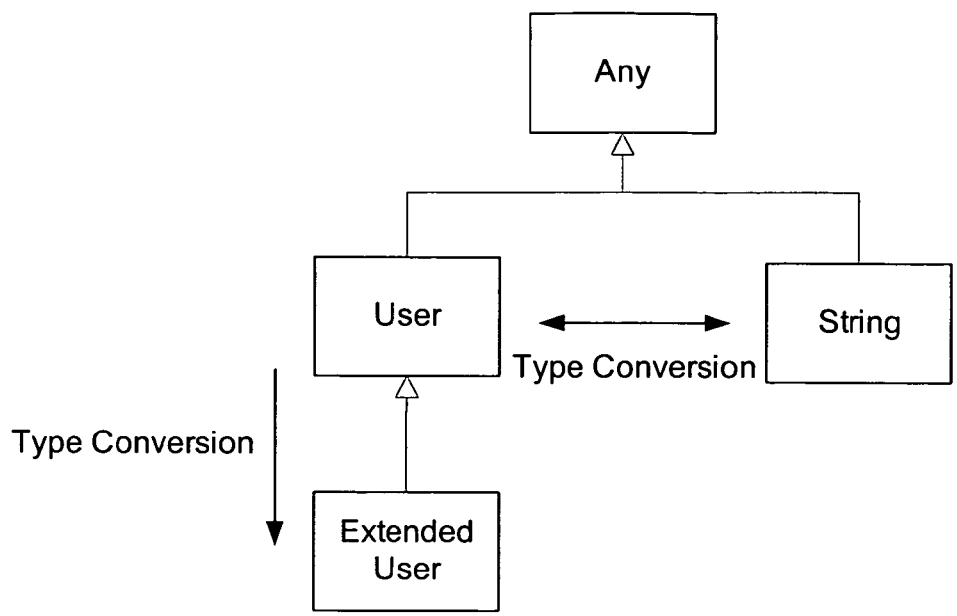
FIG. 17 illustrates an example of type conversion.

FIG. 17 illustrates an example of type conversion. As illustrated in FIG. 17, type conversion may occur between definitions that are in different branches of the inheritance tree and when the destination definition is below the source definition within a branch of the inheritance tree.

Type conversions are handled by setting managers. Both the source and target managers can expose conversion support. This means that given the definitions in FIG. 17 and an assignment from a User definition to a String definition, the manager for User could expose a conversion to String or the manager for String could expose a conversion from User.

The runtime will first ask the source manager to convert the instance, then the target manager, and finally return an error if there is no available conversion.

To request a type conversion the developer marks the attribute Convert as true on the setting transfer (input or output). If Convert is not specified and the source definition is not the same as or derived from the target definition then the compiler will return an error. If Convert is specified, the compiler will check if there is an available conversion between the two types by asking both managers whether they support the conversion.

If the instance is of a definition that is a derivation of the definition associated with the setting declaration, we will first try to convert the derived definition to the destination definition before falling back to upcasting and then converting the value. Note, if we do upcast, we may lose information as part of the conversion process. For example if we specified a conversion between User and String and the actual instance was an ExtendedUser, then we would first attempt to convert ExtendedUser to String before falling back to converting User to String.

3.2.12 CLR to SDM Type Mapping

In the SDM model, all setting definitions have corresponding CLR types. These types are defined by the manager associated with the SettingDefinitions element in the SDM model.

When a flow, constraint or deployment manager acts on behalf of an SDM definition it does so by acting on instances of CLR types rather than on instances of SDM Setting definitions. This provides a more natural programming model for the developer but also means that the SDM runtime should be able to map from SDM definition to CLR type in order to pass information from the SDM runtime to a manager and should be able to map from CLR type to SDM definition in order to accept information back from a manager.

For example, in an SDM model, a developer may define the following setting definition:

```
<xs:simpleType name="AppPoolIdentityType">
    <xs:restriction base="xs:string">
        <xs:enumeration value="LocalSystem"/>
        <xs:enumeration value="LocalService"/>
        <xs:enumeration value="NetworkService"/>
        <xs:enumeration value="UserDefined"/>
    </xs:restriction>
</xs:simpleType>
```

Then the developer may write a manager that processes a value associated with that setting definition that takes an instance of the following CLR type:

```
public enum AppPoolIdentityType
{
    LocalSystem,
    LocalService,
    NetworkService,
    UserDefined,
}
```

There are two parts to this problem: the first is being able to map from definition to type and back, the second is being able to map from SDM instance to clr instance and back.

3.2.12.1 Mapping Definition to Type

To map from setting definition to a clr type we use the manager declaration, the setting definition namespace and the setting definition name. From the manager declaration identified by the Manager attribute on the SettingDefinitions element we can obtain a strong name and location for the assembly that contains the type, from the ClrNamespaceName attribute on the SettingDefinitions element we can obtain the name of the namespace that contains the type. Finally, we can append the name of the setting definition to the namespace name to retrieve the clr type from the assembly.

The reverse process uses the same information to map from a clr type to an SDM definition. First, we get the assembly name from the type information provided by the runtime. We then find the manager declarations that reference the assembly, giving us one or more model files. From the setting definitions sections in the model files we then find a matching pair of namespace name and type name.

3.2.12.2 Converting Instance Values

To convert setting instances from their SDM representation in XML to a Clr object instance and back we again use the manager associated with SettingDefinitions element. In this case, the Clr class that implements the translation is identified by the combination of the ClrClassName attribute and the assembly information from the manager declaration identified by the Manager attribute.

The Clr class implements the ISettingSerialization interface described in the Manager Interface Specification (ref). This interface supports both conversion from SDM Xml representation to a Clr instance and conversion from a Clr object instance to an SDM Xml representation. The same developer that creates the setting definition within the Model file is responsible for writing the code that performs the conversion.

The Clr class should support conversion for all setting definitions within the SettingDefinitions element.

3.3 Attributes

Many of the objects in the SDM can be attributed to capture behavior that is orthogonal to core behavior of the object. We use a general attribution model defined as follows:

3.4 Definitions

Definitions are used to create reusable configurations of resources and systems. They are analogous to classes in an object oriented language.

3.4.1 Definition

Definition is the base from which object, relationship, constraint and flow definitions are derived. All definitions can include a description, setting members, setting values, and design surface data. Each definition is identified by a simple name and references a manager. The manager is responsible for providing support to the SDM runtime for this particular definition through the class identified by the definition.

The name of the definition should be unique for all definitions within the scope that contains the definition. The scope may be either an SDM document or another definition.

```
<xs:complexType name="Definition">
    <xs:sequence>
        <xs:element name="Description" type="Description"
            minOccurs="0"/>
        <xs:element name="DesignData" type="DesignData"
            minOccurs="0"/>
        <xs:choice minOccurs="0" maxOccurs="unbounded">
            <xs:element name="SettingDeclaration"
                type="SettingMember"/>
            <xs:element name="SettingValue"
                type="SettingValue"/>
            <xs:element name="SettingValueList"
                type="SettingValueList"/>
        </xs:choice>
    </xs:sequence>
    <xs:attribute name="Name" type="SimpleName"
        use="required"/>
    <xs:attribute name="Manager" type="QualifiedName"
        use="optional"/>
    <xs:attribute name="ClrClassName" type="xs:string"
        use="optional"/>
</xs:complexType>
```

| Attribute/<br>element | Description |
|---|---|
| SettingDeclaration | The declaration of a setting |
| SettingValue | A value for a setting on the definition or its base definition. A value can only be provided once for a setting declaration within a definition. |
| SettingValueList | A list of values for a writable list setting on the definition or its base definition. |
| DesignData | Design surface specific data |
| Name | A name for this definition that is unique within the scope of the containing SDM file. |
| Manager | A reference to the manager declaration for this definition. See section: 3.5 for a definition of the manager. |
| ClrClassName | The name of the clr class that supports this definition in the runtime. The class should exist in the assembly identified by the manager. The manager attribute should be present if this attribute is present. |
| Description | A text description of the definition. |

3.4.2 Object Definitions

An abstract object definition exposes a set of setting declarations, can contain constraints on the relationships that it participates in and has an associated manager in the runtime.

The following is an abstract system definition for a web server. The web server has two settings and has a relationship constraint that requires it to contain at least on vsite type.

```
<SystemDefinition Abstract="true"
            Name="WebServer"
            ClrClassName="micorosft.sdm.IISSupportClass"
            Manager="IISSupportCode">
    <SettingDeclaration Name="serverName" Definition="String"/>
    <SettingDeclaration Name="category" Definition="String"/>
    <SettingDeclaration Name="roles" Definition="String" List="true"/>
        <RelationshipConstraint    Name="containsVsites"
                        RelationshipDefinition="containmentRelationship"
                        TargetRole="Member"
                        TargetObjectDefinition="vsite"
                        MinOccurs="1"
                        MaxOccurs="unbounded"/>
</SystemDefinition>
```

The vsite is an abstract endpoint definition that contains server binding information.

```
<EndpointDefinition Abstract="true" Name="vsite">
    <SettingDeclaration Name="ipAddress" Definition="ipaddress"
        required="true"/
    <SettingDeclaration Name="port" Definition="Int"/>
    <SettingDeclaration Name="domainName" Definition="Int"/>
    <SettingDeclaration Name="securityModel"
        Definition="securityModelEnum"/>
</EndpointDefinition>
```

A concrete system definition for a frontend webserver identifies the webserver category as static content, contains a single byReference endpoint member which can represent between 1 and 100 endpoint instances. The concrete endpoint definition for the endpoint is nested inside the system definition and it defines the ip Endpoint for the vsite to be Endpoint 80.

```
<SystemDefinition Name="FrontendWebServer"
        Extends="WebServer">
    <SettingValue Path="serverName"
        Fixed="true">myFEServer</SettingValue>
    <SettingValueList Path="roles" Fixed="true" Replace="true">
        <Value>staticContent</Value>
        <Value>aspPages</Value>
    </SettingValueList>
    <EndpointDefinition Name="port80Vsite" Extends="vsite">
        <SettingValue Path="port"
            Fixed="true">80</SettingValue>
    </EndpointDefinition>
    <Endpoint Name="contentOnlyVsite" Definition="port80Vsite"
Reference="true" MinOccurs="1" MaxOccurs="100"/>
</SystemDefinition>
```

3.4.2.1 Object Definition

Abstract and concrete object extend the following base object definition. In addition to the elements of the base type Definition, they share the ability to constrain the relationships that the objects participate in.

```
<xs:complexType name="ObjectDefinition">
    <xs:complexContent>
        <xs:extension base="Definition">
            <xs:choice minOccurs="0" maxOccurs="unbounded">
                <xs:element name="Flow" type="FlowMember"
                    minOccurs="0" maxOccurs="unbounded"/>
```

-continued

```
            <xs:element name="RelationshipConstraintGroup"
                type="RelationshipConstraintGroup"/>
            <xs:element name="RelationshipConstraint"
                type="RelationshipConstraint"/>
            <xs:element name="Constraint"
                type="ConstraintMember"/>
        </xs:choice>
        <xs:attribute name="Visibility" type="VisibilityEnum"
            use="optional"/>
        <xs:attribute name="Layer" type="xs:string"
            use="optional"/>
        <xs:attribute name="Extends" type="QualifiedName"
            use="optional"/>
        <xs:attribute name="Abstract" type="xs:boolean"
            use="optional"/>
      </xs:extension>
  </xs:complexContent>
</xs:complexType>
```

| Attribute/element | Description |
| --- | --- |
| Flow | A flow members declaration |
| RelationshipConstraint | Constraints on the relationships that these types can participate in. |
| RelationshipConstraintGroup | A group of constraints on the relationships that these types can participate in. At least one member of the group should evaluate to true. |
| Layer | The layer attribute identifies the layer at which this abstract object definition can be used. If it is not provided, the abstract object definition can be used at any layer. |
| Extends | Identifies the base object definition that this object definition derives from. |
| Abstract | Indicates whether this object can be instantiated. If it is marked as abstract, then the definition must be extended in order to complete the missing elements. The default is false. |
| Visibility | Indicates whether the members of this class default to public or private. The default is public. |

Abstract object definitions are used to define building blocks that the design surface exposes and from which all concrete objects are derived: a concrete object definition implements an abstract object definition.

Abstract object definitions extend SDM object by adding simple inheritance: the "extends" attribute is used to identify a base object definition for an abstract object definition. The abstract object definition then inherits the settings and relationship constraints from that base object definition. Through inheritance, the object definition can extend the settings and constraints of the abstract object definition by adding new settings and constraints.

Abstract object definitions can also add constraints on the relationships that they wish to participate in. For example, an abstract object definition may require the existence of certain relationships, may constrain the object definitions that may be placed on the other end of the relationship or may constrain the settings on the instances that participate in a given relationship.

Object definitions can also contain declarations of nested definitions. These definitions can be used for members within the scope of the containing definitions and referenced in constraints outside the scope of the definition.

Concrete object definitions provide an implementation for an abstract object definition. The implementation is constructed from object and relationship members, values for the settings of implemented abstract definition, new settings declarations, flow between members and constraints on members.

3.4.2.2 Implicit Base Definitions

All object definitions that do not extend another object definition implicitly extend one of the endpoint, system or resource base definitions. These base definitions form a root for each of the trees that can be used in relationship and constraint declarations. This allows the relationship or constraint to indicate that any of the types derived from the root can be used in place of the identified root definition. These root types are always abstract and cannot be instantiated directly.

The definitions of these types include base constraints that control their instantiation within the model.

3.4.2.3 Endpoint Definition

Endpoint definitions extend the base object definition by adding the ability to declare nested resource types, resource members and host, containment and reference relationship members.

```
<xs:complexType name="EndpointDefinition">
    <xs:complexContent>
        <xs:extension base="ObjectDefinition">
            <xs:choice minOccurs="0" maxOccurs="unbounded">
                <xs:element name="ResourceDefinition"
                    type="ResourceDefinition"/>
                <xs:element name="Resource"
                    type="ResourceMember"/>
                <xs:element name="Hosting"
                    type="HostingMember"/>
                <xs:element name="Containment"
                    type="ContainmentMember"/>
                <xs:element name="Reference"
                    type="ReferenceMember"/>
            </xs:choice>
        </xs:extension>
    </xs:complexContent>
</xs:complexType>
```

| Attribute/element | Description |
| --- | --- |
| ResourceDefinition | A nested resource definition that can be used by type members within the scope of the outer type definition. |
| Resource | A resource member declaration that references a resource type. |
| Hosting | A hosting relationship member declaration. |
| Containment | A containment relationship member declaration. |
| Reference | A reference relationship member declaration. |

3.4.2.4 System Definition

A system type extends the base type by adding support for: nested endpoint, system and resource types; endpoint, system, and resource members and host, containment, connection, delegation and reference relationships.

```
<xs:complexType name="SystemDefinition">
    <xs:complexContent>
        <xs:extension base="ObjectDefinition">
            <xs:choice minOccurs="0"
                maxOccurs="unbounded">
                <xs:element name="EndpointDefinition"
                    type="EndpointDefinition"/>
```

-continued

```
            <xs:element name="SystemDefinition"
                type="SystemDefinition"/>
            <xs:element name="ResourceDefinition"
                type="ResourceDefinition"/>
            <xs:element name="Endpoint"
                type="EndpointMember"/>
            <xs:element name="Subsystem"
                type="SystemMember"/>
            <xs:element name="Resource"
                type="ResourceMember"/>
            <xs:element name="Hosting"
                type="HostingMember"/>
            <xs:element name="Containment"
                type="ContainmentMember"/>
            <xs:element name="Connection"
                type="CommunicationMember"/>
            <xs:element name="Delegation"
                type="DelegationMember"/>
            <xs:element name="Reference"
                type="ReferenceMember"/>
        </xs:choice>
        <xs:attribute name="SimulationRoot" type="xs:boolean"
            use="optional"/>
    </xs:extension>
</xs:complexContent>
</xs:complexType>
```

| Attribute/element | Description |
|---|---|
| EndpointDefinition | A nested endpoint definition that can be used by members within the scope of the outer system definition |
| ResourceDefinition | A nested resource definition that can be used by members within the scope of the outer system definition. |
| SystemDefinition | A nested system definition that can be used by members within the scope of the outer system definition |
| Endpoint | An endpoint member declaration that references an endpoint definition. |
| Subsystem | A subsystem member declaration that references a system definition. |
| Resource | A resource member declaration that references a resource definition. |
| Containment | A containment relationship member declaration. |
| Hosting | A hosting relationship member declaration. |
| Connection | A connection relationship member declaration. |
| Delegation | A delegation relationship member declaration. |
| Reference | A reference relationship member declaration. |
| SimulationRoot | Specifies weather the definition should have a root instance of it simulated during compilation of the SDM document to do design time checking. If this attribute is not specified then the default compiler rules for simulation apply. This attribute is needed when simulation would never pass cleanly but real usages of the definition would work fine. |

3.4.2.5 Resource Definition

A resource type may contain nested resource type definitions, resource members, and host, containment and reference relationship members.

```
<xs:complexType name="ResourceDefinition">
    <xs:complexContent>
        <xs:extension base="ObjectDefinition">
            <xs:choice minOccurs="0"
                maxOccurs="unbounded">
                <xs:element name="ResourceDefinition"
                    type="ResourceDefinition"/>
                <xs:element name="Resource"
                    type="ResourceMember"/>
                <xs:element name="Hosting"
                    type="HostingMember"/>
                <xs:element name="Containment"
                    type="ContainmentMember"/>
                <xs:element name="Reference"
                    type="ReferenceMember"/>
            </xs:choice>
        </xs:extension>
    </xs:complexContent>
</xs:complexType>
```

| Attribute/element | Description |
|---|---|
| ResourceDefinition | A nested resource definition that can be used by members within the scope of the outer resource definition. |
| Resource | A resource member declaration that references a resource defintion. |
| Hosting | A hosting relationship member declaration. |
| Containment | A containment relationship member declaration. |
| Reference | A reference relationship member declaration. |

3.4.2.6 Relationship Rules

For a particular instance of an object definition the following tables identify the cardinality associated with each of the roles that the instance can play.

3.4.2.6.1 System Rules

| Definition | Role | System | Endpoint | Resource |
|---|---|---|---|---|
| System | Parent(0 ... *) | Contains | Contains | Contains |
|  | Member(1 ... 1) | ContainedBy | Not Allowed | Not Allowed |
|  | Proxy(0 ... *) | Not Allowed | Not Allowed | Not Allowed |
|  | Delegate(0 ... *) | Not Allowed | Not Allowed | Not Allowed |
|  | Client(0 ... *) | Not Allowed | Not Allowed | Not Allowed |
|  | Server(0 ... *) | Not Allowed | Not Allowed | Not Allowed |
|  | Guest(1 ... 1) | HostedBy | HostedBy (??) | HostedBy |
|  | Host(0 ... *) | Hosts | Hosts | Hosts |
|  | Source(0 ... *) | Provides | Not Allowed | Not Allowed |
|  | Dependent(0 ... *) | Consumes | Not Allowed | Not Allowed |

3.4.2.6.2 Endpoint Rules

| | Role | System | Endpoint | Resource |
|---|---|---|---|---|
| Endpoint | Parent(0 ... *) | Not Allowed | Not Allowed | Contains |
|  | Member(1 ... 1) | ContainedBy | Not Allowed | Not Allowed |
|  | Proxy(0 ... *) | Not Allowed | DelegatesTo | Not Allowed |
|  | Delegate(0 ... *) | Not Allowed | Implements | Not Allowed |

-continued

| | Role | System | Endpoint | Resource |
|---|---|---|---|---|
| | Client(0 . . . *) | Not Allowed | ConnectsTo | Not Allowed |
| | Server(0 . . . *) | Not Allowed | ProvidesService | Not Allowed |
| | Guest(1 . . . 1) | HostedBy | HostedBy | HostedBy |
| | Host(0 . . . *) | Hosts | Hosts | Hosts |
| | Source(0 . . . *) | Not Allowed | Provides | Provides |
| | Dependent (0 . . . *) | Not Allowed | Consumes | Consumes |

3.4.2.6.3 Resource Rules

| | Role | System | Endpoint | Resource |
|---|---|---|---|---|
| Resource | Parent(0 . . . *) | Not Allowed | Not Allowed | Contains |
| | Member(1 . . . 1) | ContainedBy | ContainedBy | ContainedBy |
| | Proxy(0 . . . *) | Not Allowed | Not Allowed | Not Allowed |
| | Delegate(0 . . . *) | Not Allowed | Not Allowed | Not Allowed |
| | Client(0 . . . *) | Not Allowed | Not Allowed | Not Allowed |
| | Server(0 . . . *) | Not Allowed | Not Allowed | Not Allowed |
| | Guest(1 . . . 1) | HostedBy | HostedBy | HostedBy |
| | Host(0 . . . *) | Hosts | Hosts | Hosts |
| | Source(0 . . . *) | Not Allowed | Provides | Provides |
| | Dependent (0 . . . *) | Not Allowed | Consumes | Consumes |

3.4.2.6.4 Notes

Every instance should participate in exactly one containment relationship and at least one hosting relationship.

This means that:

A) non-reference (by-value) members should identify a containment relationship in the same definition b) in order to be constructed a reference member should identify a containment relationship 3.4.3 Relationship Definitions Relationships are used to identify possible interactions between types. They are binary and directed, each identifying the type of the instances that can participate in the relationship. Relationships can also constrain the settings of the instances that participate in the relationship and can flow setting values across the relationship.

The following is a possible hosting relationship for a webApplication on the webserver described in the types section. The relationship contains a constraint that verifies that the security models of the two systems are compatible and it contains a settings flow member that copies the server name from the vsite to the vdir.

```
<HostingDefinition Name="vsiteHostsVdir" GuestDefinition="vdir"
HostDefinition="vsite">
    <ObjectConstraint Name="checkCompatibility"
PrimaryRole="Guest" PrimaryObjectDefinition="vdir">
        <Constraint Name="constrainSecurityModel"
Definition="SimpleOperatorComparison">
            <SettingValue Path="operator">=</SettingValue>
            <Input Name="LHS" Path="host.securityModel"/>
            <Input Name="RHS" Path="guest.securityModel"/>
        </Constraint>
    </ObjectConstraint>
    <Flow Definition="copy" Name="copyServerToVdir">
        <Input Name="source" Path="host.server"/>
        <Output Name="desination" Path="guest.server"/>
    </Flow>
</HostingDefinition>
```

A relationship is used by declaring a relationship member that identifies the type members that will participate in the relationship.

```
<SystemDefinition Name="TestSystemt"
    Extends="DistributedApplication">
    <Resource Name="myVdir" Definition="vdir"
        Reference="false"/>
    <Resource Name="myVsite" Definition="vsite"
        Reference="false"/>
    <Hosting Name="HostMyVsite" Definition="vsiteHostsVdir"
        GuestMember="myVdir"
HostMember="myVsite"/>
</SystemDefinition>
```

3.4.3.1 Relationship Definition

The base relationship definition adds object constraints and flow to definitions. Object constraints are statements about the setting values for the object instances that participate in an instance of this relationship. For example, a communication relationship that represents a DCOM connection may check that the security settings for client and server are compatible. In this case, there is a strict relationship between settings that could easily be captured as part of the design process; there are four factorial setting combinations over the relationship but a much smaller number of valid combinations.

Flow gives the ability for the relationship developer to forward values from one instance to another. This allows the object definitions to be developed separately from their possible interactions and allows the instance to stand alone as a reference point for information rather than requiring a subset of the relationship graph in order to fully describe a particular instance.

Concrete relationships are relationships between two concrete object definitions. Each concrete relationship should implement an abstract relationship. The abstract relationship should be between a matching pair of abstract objects definitions that are directly or indirectly (through inheritance) implemented by the concrete object definitions.

The name for the relationship should be unique within the namespace that contains the relationship.

```
<xs:complexType name="RelationshipDefinition">
    <xs:complexContent>
        <xs:extension base="Definition">
            <xs:choice minOccurs="0"
                maxOccurs="unbounded">
                <xs:element name="ObjectConstraintGroup"
                    type="ObjectConstraintGroup"/>
                <xs:element name="ObjectConstraint"
                    type="ObjectConstraint"/>
                <xs:element name="Flow"
                    type="FlowMember"/>
            </xs:choice>
            <xs:attribute name="Extends" type="QualifiedName"
                use="optional"/>
```

```
            <xs:attribute name="Abstract" type="xs:boolean"
            use="optional"/>
        </xs:extension>
    </xs:complexContent>
</xs:complexType>
```

| Attribute/element | Description |
| --- | --- |
| ObjectConstraint (group) | Constraints on the instances that participate in this relationship. See section: 3.7 |
| Flow | Flow between the instances that participate in this relationship. |
| Extends | Identifies the base definition that this definition derives from. |
| Abstract | Indicates whether this relationship can be instantiated. If it is marked as abstract, then the definition should be extended in order to complete the missing elements. The default is false. |

3.4.3.2 Communication Relationship

Communication relationships are used to capture possible communication links between endpoint definitions. They are used to describe interaction between independently deployed software elements. The communication relationship schema extends the base relation schema by adding client and server endpoint references.

```
<xs:complexType name="CommunicationDefinition">
    <xs:complexContent>
        <xs:extension base="RelationshipDefinition">
            <xs:sequence>
                <xs:element name="Connection"
                    type="HostingMember" minOccurs="0"
                    maxOccurs="unbounded"/>
            </xs:sequence>
            <xs:attribute name="ClientDefinition"
                type="QualifiedName" use="required"/>
            <xs:attribute name="ServerDefinition"
                type="QualifiedName" use="required"/>
        </xs:extension>
    </xs:complexContent>
</xs:complexType>
```

| Attribute/ element | Description |
| --- | --- |
| ClientDefinition | The definition of the client instance involved in the communication relationship |
| ServerDefinition | The type of the server instance involved in the relationship |

The following combinations of abstract type pairs are valid for communication relationships:

| Client Type | Server Type |
| --- | --- |
| Endpoint | Endpoint |

3.4.3.3 Hosting Relationship

Hosting relationships are used to capture the fact that a guest requires a host in order to be constructed. Since there can be more than one possible host for a guest, this implies that the hosting relationship is also responsible for the construction of the guest on a host. So in order to create an instance of an object, a hosting relationship should exist from a guest to a compatible host.

For example, a hosting relationship may exist between a Webservice object definition and an IIS object definition. In this case, the relationship indicates that it may be possible to create an instance of system MyWebservice on an instance of system MyIIS using the manager on the hosting relationship assuming MyWebservice and MyIIS implement webservice and IIS respectively. We do not know whether it will be possible to create the relationship until we have evaluated constraints that exist on both the systems and the relationship.

When we deploy an application to a datacenter we need to resolve all the outstanding hosting relationships for the systems within the application. To do this the operator would need to create hosting members for each of the required hosting relationships. To simplify the task of the operator and to allow the developer to guide the deployment process, the developer can instead create a concrete hosting relationship. The concrete hosting relationship is used to group a set of hosting relationship members in such a way that the operator need only declare a single hosting member when deploying the application.

A guest can be bound to a host iff
For each guestMember in Guest
There exists one or more hostMember in Host where
guestMember.Type has a hosting relation with hostMember.type
and guestMember.hostConstraints validate against hostMember.settings
and hostMember.guestConstraints validate against guestMember.settings
and for each member of guestMember there exists a binding to a
member of hostMember For example the following concrete relationship binds a layer three system (Bike) to a layer two host (operating System). In this case, we define a setting for the hosting relationship with the default value of "system folder". We flow this setting to one of three hosting members that define the hosting relationship between systems of the layer 3 application and systems of the layer 2 host.

```
<HostingDefinition Name="DefaultBikePlacement" GuestDefinition="Bike"
            HostDefinition="OperatingSystem;OperatingSystem">
    <SettingDeclaration Name="fileLocationRelativeToRoot" Definition="xs:sting" Access="Readwrite" />
    <SettingValue Path="dirPath">systemFolder</SettingValue>
```

```
<Flow Name="copyPath" Definition="copy">
    <Input Name="source" Path="dirPath"/>
    <Output Name="destination" Path="bikeExecutableHost.hostRelativePath"/>
</Flow>
<Hosting Name="bikeExecutableHost" Definition="fileDirectoryHost" GuestMember="guest.bikeFile"
         HostMember="host.FileSystem"/>
<Hosting Name="bikeEventKeyHost" Definition="registryKeyRegistryKeyHost"
GuestMember="guest.bikeEventKey"
         HostMember="host.Registry.ApplicationEventKey"/>
<Hosting Name="bikeSoftwareKeyHost" Definition="registryKeyRegistryKeyHost"
         GuestMember="guest.bikeSoftwareKey" HostMember="host.Registry.HKLM"/>
</HostingDefinition>
    <xs:complexType name="HostingDefinition">
        <xs:complexContent>
            <xs:extension base="RelationshipDefinition">
                <xs:sequence>
                    <xs:element name="Hosting" type="HostingMember" minOccurs="0"
maxOccurs="unbounded"/>
                </xs:sequence>
                <xs:attribute name="GuestDefinition" type="QualifiedName" use="required"/>
                <xs:attribute name="HostDefinition" type="QualifiedName" use="required"/>
                <xs:attribute name="SimulationRoot" type="xs:boolean" use="optional"/>
            </xs:extension>
        </xs:complexContent>
</xs:complexType>
```

| Attribute/element | Description |
|---|---|
| GuestDefinition | Identifies the definition of the guest instance. |
| HostDefinition | Identifies the definition of the host instance. |
| SimulationRoot | Specifies weather the definition should have a root instance of it simulated during compilation of the SDM document to do design time checking. If this attribute is not specified then the default compiler rules for simulation apply. This attribute is needed when simulation would never pass cleanly but real usages of the definition would work fine. |

The following combinations of abstract definition pairs are valid for hosting relationships:

| Guest Type | Host Type |
|---|---|
| Endpoint | Endpoint |
| Resource | Resource |
| Resource | System |
| System | Resource |
| System | System |

3.4.3.4 Containment Relationship

A containment relationship between two abstract objects captures the fact that a concrete type based on the parentType can contain members based on the memberType. Containment implies that the parent instance can control the lifetime of the member instance and can delegate behavior to the member instance.

```
<xs:complexType name="ContainmentDefinition">
    <xs:complexContent>
        <xs:extension base="RelationshipDefinition">
            <xs:sequence>
                <xs:element name="Containment"
                    type="HostingMember" minOccurs="0"
                    maxOccurs="unbounded"/>
            </xs:sequence>
            <xs:attribute name="ParentDefinition"
                type="QualifiedName" use="required"/>
            <xs:attribute name="MemberDefinition"
                type="QualifiedName" use="required"/>
        </xs:extension>
    </xs:complexContent>
</xs:complexType>
```

| Attribute/element | Description |
|---|---|
| ParentDefinition | Identifies the definition of the instance that will contain the member. |
| MemberDefinition | Identifies the definition of the instance that will be the contained member |

The following combinations of abstract definition pairs are valid for containment relationships:

| Parent Type | Member Type |
|---|---|
| System | Endpoint |
| System | Resource |
| System | System |
| Endpoint | Resource |
| Resource | Resource |

3.4.3.5 Delegation Relationship

Delegation is used to forward behavior from an outer system to a contained system. The way we do this is by delegating the endpoints on the outer system to endpoints on the inner system. This effectively forwards all interaction that would have been directed to the outer system to the endpoint on the inner system. Delegation can be chained, allowing the inner system to further delegate its behavior to another system.

A delegation relationship defines pairs of abstract endpoint definitions that can participate in the delegation. Each relationship identifies an abstract endpoint definition that can act as a proxy and an abstract endpoint definition to which it can delegate behavior.

```
<xs:complexType name="DelegationDefinition">
    <xs:complexContent>
        <xs:extension base="RelationshipDefinition">
            <xs:sequence>
                <xs:element name="Delegation"
                    type="HostingMember" minOccurs="0"
                    maxOccurs="unbounded"/>
            </xs:sequence>
            <xs:attribute name="ProxyDefinition"
                type="QualifiedName" use="required"/>
            <xs:attribute name="DelegateDefinition"
                type="QualifiedName" use="required"/>
        </xs:extension>
    </xs:complexContent>
</xs:complexType>
```

| Attribute/element | Description |
| --- | --- |
| ProxyDefinition | Identifies the definition of the outer endpoint that delegates its behavior to the inner endpoint |
| DelegateDefinition | Identifies the definition of the inner endpoint that provides the required behavior. |

The following combinations of abstract type pairs are valid for delegation relationships:

| Proxy Type | Delegate Type |
| --- | --- |
| Endpoint | Endpoint |

We may allow resource and system delegation to support binding between layers. For example, to allow IIS to expose part of the file system without having to deploy it.

3.4.3.6 Reference Relationship

We use reference relationships to capture strong dependencies between instances that are in addition to the hosting relationship dependency. These dependencies are used to control construction order during deployment and flow parameters between systems during installation and update. Because reference relationships indicate a strong dependency, we cannot allow a reference relationship to cross a system boundary. This means that resources within one system cannot have dependencies on resources in another system. This would make the system no longer an independent unit of deployment. Where dependencies exist between systems, we use communication relationships. Communication relationships can change over time without requiring reinstallation of the system.

```
<xs:complexType name="ReferenceDefinition">
    <xs:complexContent>
        <xs:extension base="RelationshipDefinition">
            <xs:sequence>
                <xs:element name="Reference"
                    type="HostingMember" minOccurs="0"
                    maxOccurs="unbounded"/>
            </xs:sequence>
            <xs:attribute name="DependentDefinition"
                type="QualifiedName" use="required"/>
            <xs:attribute name="SourceDefinition"
                type="QualifiedName" use="required"/>
        </xs:extension>
    </xs:complexContent>
</xs:complexType>
```

| Attribute/element | Description |
| --- | --- |
| DependentDefinition | The definition of the instance that depends on the source instance |
| SourceDefinition | The definition of the source instance. This instance is not required to be aware of the dependency. |

The following combinations of abstract type pairs are valid for reference relationships:

| Dependent Type | Source Type |
| --- | --- |
| System | System |
| Resource | Resource |
| Resource | Endpoint |
| Endpoint | Resource |
| Endpoint | Endpoint |

3.4.3.7 Implicit Base Relationships

Figure 18:
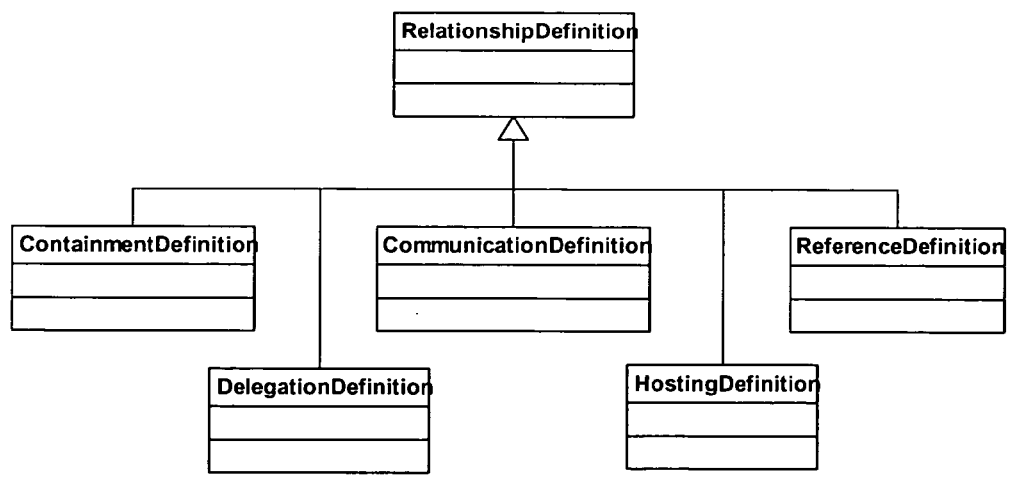
FIG. 18 illustrates an example relationship tree.

All abstract relationships implicitly extend one of the base relationships definitions. These definitions form a root for each of the relationship trees. FIG. 18 illustrates an example relationship tree. By doing this we can refer to the root definition from within constraint definitions and we can inherit common type constraints from the root type.

3.5 Members

3.5.1 Member

Members are used to identify instances of a particular definition that can exist at runtime. All members are identified by a name that is unique within the set of members in the scope of the definition that contains the member. A member can provide settings for the definition that it references. It can also contain design surface specific data.

```
<xs:complexType name="Member">
    <xs:sequence>
        <xs:element name="Description" type="Description"
            minOccurs="0"/>
        <xs:element name="DesignData" type="DesignData"
            minOccurs="0"/>
        <xs:choice minOccurs="0" maxOccurs="unbounded">
            <xs:element name="SettingValue"
                type="SettingValue"/>
            <xs:element name="SettingValueList"
                type="SettingValueList"/>
        </xs:choice>
    </xs:sequence>
    <xs:attribute name="Name" type="SimpleName"
        use="required"/>
```

```
<xs:attribute name="Definition" type="QualifiedName"
        use="required"/>
<xs:attribute name="Visibility" type="VisibilityEnum"
        use="optional"/>
</xs:complexType>
```

| Attribute/element | Description |
| --- | --- |
| Description | A description of the members |
| DesignData | Design surface specific information about the member |
| SettingValue | Values for settings that correspond to writeable settings on the referenced type. If these values are marked as fixed then they should be used when an instance is created for the member, if they are not fixed, then the values can be overridden by deployment or flowed parameters. |
| SettingValueList | A list of values for a writable list setting on the referenced type. |
| Name | A unique name for the member within the scope of the containing type. |
| Definition | The name of the definition that this member references. |
| Visibility | The visibility attribute is used to indicate whether the member is public or private. If is it private then it can only be references from within the definition that contains the member. If it is public then it can be referenced from outside the definition. The default behavior is defined by the visibility attribute on the definition. |

3.5.2 Object Member

Objects members should reference either an abstract or concrete object definition. They can represent an array of instances in which case they can define the upper and lower bounds for the array. If they are a reference member, then the user instantiating the object should explicitly construct an instance for the member. If they are not a reference member, then the runtime will create an instance at the same time as the outer object is created.

```
<xs:complexType name="ObjectMember">
    <xs:complexContent>
        <xs:extension base="Member">
            <xs:attribute name="MinOccurs"
                type="MinOccurs" use="optional"/>
            <xs:attribute name="MaxOccurs"
                type="MaxOccurs" use="optional"/>
            <xs:attribute name="Reference"
                type="xs:boolean" use="required"/>
        </xs:extension>
    </xs:complexContent>
</xs:complexType>
```

| Attribute/element | Description |
| --- | --- |
| MinOccurs | Lower bound on the number of instances associated with this member. If it is zero, then the member is optional. Default is one. |
| MaxOccurs | Upper bound on the number of instances associated with this member. Should be one or greater. Default is one. |
| Reference | If this value is true, then the instance associated with the member should be explicitly created by the operator or referenced in another type. If it is false, then the instance is created when the type is created. |

In an SDM model we need to differentiate members that get created when the parent is constructed and destroyed when the parent is destroyed from those that may have lifetimes independent from the parent. We use the IsReference attribute for this purpose. A simple analogy is with C++ declarations that allow stack based and heap based construction based on whether "new" is used to create an instance. If a member is marked as IsReference then an explicit new operation is required on the part of the operator to create an instance and associate it with the member.

There are a number of reasons that we do this:

1. When an operator constructs a system, we only expose the ability to construct isReference members. This greatly simplifies the operator experience.
2. When we process an SDM document we have clear boundaries at which the instance space of the document can vary from that of the concrete definition space.

3.5.3 Relationship Member

Relationship members identify the relationships that will exist between object members when they are created. Relationship instances are either explicitly created by the operator or implicitly created by runtime. Examples of the former are hosting relationships between instances, the latter, communication relationships between systems.

```
<xs:complexType name="RelationshipMember">
    <xs:complexContent>
        <xs:extension base="Member"/>
    </xs:complexContent>
</xs:complexType>
```

3.5.4 Endpoint Member

```
<xs:complexType name="EndpointMember">
    <xs:complexContent>
        <xs:extension base="ObjectMember"/>
    </xs:complexContent>
</xs:complexType>
```

3.5.5 System Member

```
<xs:complexType name="SystemMember">
    <xs:complexContent>
        <xs:extension base="ObjectMember"/>
    </xs:complexContent>
</xs:complexType>
```

3.5.6 Resource Member

```
<xs:complexType name="ResourceMember">
    <xs:complexContent>
        <xs:extension base="ObjectMember"/>
    </xs:complexContent>
</xs:complexType>
```

3.5.7 Hosting Member

Host members are used to declare a hosting relationship between two object members. The object members may be direct members of the containing definition or nested members that have a membership relationship with the definition. There should be a membership chain between the referenced member and the containing definition.

```
<xs:complexType name="HostingMember">
    <xs:complexContent>
        <xs:extension base="RelationshipMember">
            <xs:attribute name="GuestMember"
                type="Path" use="required"/>
            <xs:attribute name="HostMember"
                type="Path" use="required"/>
        </xs:extension>
    </xs:complexContent>
</xs:complexType>
```

| Attribute/element | Description |
| --- | --- |
| GuestMember | Identifies a member that has a definition compatible with the guest of the relationship. Member can be nested. |
| HostMember | Identifies a member that has a definition compatible with the host of the relationship. Member can be nested. |

3.5.8 Communication Member

A communication member is used to declare a communication relationship between endpoint members of immediate system members of the definition.

```
<xs:complexType name="CommunicationMember">
    <xs:complexContent>
        <xs:extension base="RelationshipMember">
            <xs:attribute name="ClientMember"
                type="Path" use="required"/>
            <xs:attribute name="ServerMember"
                type="Path" use="required"/>
        </xs:extension>
    </xs:complexContent>
</xs:complexType>
```

| Attribute/element | Description |
| --- | --- |
| ClientMember | Identifies an endpoint member that has a definition compatible with the client definition of the relationship. Endpoint member should be a member of an immediate system member of the definition. |
| ServerMember | Identifies an endpoint member that has a definition compatible with the server definition of the relationship. Endpoint member should be a member of an immediate system member of the definition. |

3.5.9 Containment Member

A containment member is used to declare that a type member is contained by the type. Each type member can either be contained or delegated. The containment member automatically sets the parent value of the containment relationship to be the this pointer of the relationship.

```
<xs:complexType name="ContainmentMember">
    <xs:complexContent>
        <xs:extension base="RelationshipMember">
            <xs:attribute name="ChildMember"
                type="Path" use="required"/>
        </xs:extension>
    </xs:complexContent>
</xs:complexType>
```

| Attribute/element | Description |
| --- | --- |
| ChildMember | Identifies an immediate object member that will be contained by the parent. |

3.5.10 Delegation Member

A delegation member is used to set up a delegation relationship between an endpoint definition member on the outer type and an endpoint definition member on an immediate system member of the outer type.

```
<xs:complexType name="DelegationMember">
    <xs:complexContent>
        <xs:extension base="RelationshipMember">
            <xs:attribute name="ProxyMember"
                type="Path" use="required"/>
            <xs:attribute name="DelegateMember"
                type="Path" use="required"/>
        </xs:extension>
    </xs:complexContent>
</xs:complexType>
```

| Attribute/element | Description |
| --- | --- |
| ProxyMember | Proxy identifies an immediate endpoint member on the system that does not have a containment relationship to the system. The definition of the member should match the definition of the proxy on the delegation relationship. |
| DelegateMember | Delegate identifies an endpoint member on an immediate member of the type. The type of the endpoint member should match the delegate type on the delegation relationship. |

3.5.11 Reference Member

A reference member is used to set up a reference relationship between two immediate or nested members of the outer definition.

```
<xs:complexType name="ReferenceMember">
    <xs:complexContent>
        <xs:extension base="RelationshipMember">
            <xs:attribute name="DependentMember"
                type="Path" use="required"/>
            <xs:attribute name="SourceMember"
                type="Path" use="required"/>
        </xs:extension>
    </xs:complexContent>
</xs:complexType>
```

| Attribute/element | Description |
|---|---|
| dependentMember | The object member that depends on the source member. Should match the definition of the dependent object in the reference relationship. |
| sourceMember | The source object member. Should match the definition of the source object in the reference relationship. |

3.6 Flow

Settings flow is used to pass parameters between members of an object definition and between participants in relationships. As part of a flow, the user can use transformations to combine or separate setting values and to calculate new setting values.

All settings flow members use a flow definition to implement the transform. The following is a flow definition that parses a url.

```
<FlowDefinition Name="urlToComponents">
    <SettingDeclaration Name="url"
    Definition="url" Access="Writeonly"/>
    <SettingDeclaration Name="protocol"
    Definition="String" Access="Readonly"/>
    <SettingDeclaration Name="server"
    Definition="String" Access="Readonly"/>
    <SettingDeclaration Name="Path"
    Definition="String" Access="Readonly"/>
    <SettingDeclaration Name="file"
    Definition="String" Access="Readonly"/>
</FlowDefinition>
```

A flow member is then declared within an object or relationship. The flow member provides the input for the flow definition and then directs the output from the flow to the target settings.

```
<Flow Name="deconstructUrl" Definition="urlToComponents">
    <Input Name="url" Path="webservice.url"/>
    <Output Name="server" Path="webservice.server" Replace="false"/>
</Flow>
```

3.6.1 Flow Definition

We use a flow definition to define a particular transform that we wish to apply to a set of setting values. The flow definition exposes a setting schema that defines the input settings (write-only settings) and the output settings (read-only settings), a DesignData section for design surface specific information such as an input interface for defining the transform and a description for use when browsing the SDM file. The flow definition is identified by name within the namespace in which it is defined. The definition also identifies a manager that will support the runtime when it evaluates the flow.

We expect that the runtime will include several standard flow definitions to simplify the construction of flow elements where straightforward transformations are required. Examples might include copy, merge and string substitution. Since flow definitions can be parameterized, we also expect there to be one or more simple transformations that perform different actions based on configuration parameters.

```
<xs:complexType name="FlowDefinition">
    <xs:complexContent>
        <xs:extension base="Definition"/>
    </xs:complexContent>
</xs:complexType>
```

3.6.2 Flow Member

Each flow member identifies one or more input settings, one or more destination settings, can provide fixed setting values and should identify a flow definition. When the flow is evaluated, source data is collected from the inputs, combined with fixed setting values and passed to the flow definition for transformation. The output from the definition is passed to the destination settings according to the outputs listed in the flow member.

Re-evaluation of the flow will be triggered whenever one of the source values changes. For this reason, we need to avoid circular flows that cause values to flip flop. If the value remains constant then the loop will terminate. The runtime will detect and terminate infinite loops by keeping track of the stack depth.

It is an error for the outputs from separate flow members to target the same setting member on an object instance.

```
<xs:complexType name="FlowMember">
    <xs:complexContent>
        <xs:extension base="Member">
            <xs:choice minOccurs="0" maxOccurs="unbounded">
                <xs:element name="Input" type="SettingTarget"/>
                <xs:element name="Output" type="OutputPath"/>
            </xs:choice>
        </xs:extension>
    </xs:complexContent>
</xs:complexType>
```

| Attribute/element | Description |
|---|---|
| Input | A list of paths to setting values that are used as input to the flow. Each input should identify a write only setting on the flow definition. |
| Output | A list of paths to settings that will be set as a result of this flow. Each output should identify a read only setting on the flow definition. |

3.7 Constraints

Constraints are used to identify restrictions on setting values of members of a definition or on the participants in a relationship. These restrictions are evaluated in the instance space at both design time and at deployment time.

All setting constraints use a constraint definition to evaluate the setting values. The constraint definition uses settings declarations to identify the values it constrains. The following constraint definition implements a simple comparison function that takes two arguments and an operator, then evaluates the constraint and finally returns success or error.

```
<ConstraintDefinition Name="SimpleOperatorComparison">
    <SettingDeclaration Name="LHS" Definition="Any"
    Access="Writeonly"/>
    <SettingDeclaration Name="operator" Definition="operator"
    Access="Writeonly"/>
    <SettingDeclaration Name="RHS" Definition="Any"
    Access="Writeonly"/>
</ConstraintDefinition>
```

A constraint member then used to provide the values to the constraint type for evaluation.

```
<Constraint Name="constraintSecurityMode"
Definition="SimpleOperatorComparison">
    <SettingValue Path="operator">=</SettingValue>
    <SettingValue Path="RHS">basicAuth</SettingValue>
    <Input Name="LHS" Path="webservice.securityMode"/>
</Constraint>
```

3.7.1 Constraint Definition

A constraint definition defines a constraint that acts on a set of input values. The constraint can be parameterized to select custom behavior or to support for a simple constraint engine that uses parameters to define its behavior. We expect that a set of standard constraint definitions will be written for simple parameter value constraints and a set of complex constraints to support known relationships between abstract objects.

```
<xs:complexType name="ConstraintDefinition">
    <xs:complexContent>
        <xs:extension base="Definition">
            <xs:choice minOccurs="0"
            maxOccurs="unbounded">
                <xs:element name="RelationshipConstraint"
                type="RelationshipConstraint"/>
                <xs:element name="RelationshipConstraintGroup"
                type="RelationshipConstraintGroup"/>
                <xs:element name="ObjectConstraint"
                type="ObjectConstraint"/>
                <xs:element name="ObjectConstraintGroup"
                type="ObjectConstraintGroup"/>
            </xs:choice>
            <xs:attribute name="TargetDefinition"
            type="QualifiedName" use="optional"/>
        </xs:extension>
    </xs:complexContent>
</xs:complexType>
```

| Attribute/element | Description |
|---|---|
| TargetDefinition | Identifies a target definition to which this constraint can be applied. If this is not supplied, then the constraint is assumed to be applicable to any object or relationship definition. |

3.7.2 Constraint Member

A constraint member identifies a set of input values for a particular constraint definition. The member can identify static values for settings and can use input statements to bind a constraint setting to a path.

```
<xs:complexType name="ConstraintMember">
    <xs:complexContent>
        <xs:extension base="Member">
            <xs:choice minOccurs="0" maxOccurs="unbounded">
                <xs:element name="Input" type="Input"/>
            </xs:choice>
        </xs:extension>
    </xs:complexContent>
</xs:complexType>
```

| Attribute/element | Description |
|---|---|
| input | A list of inputs to the constraint. An input identifies a path to the source setting value that will be passed to the constraint and constraint setting that will be set as a result. The source setting definition and the constraint setting definition should be compatible. |

3.7.3 Structural Constraints

We use object and relationship constraints to define the topology of the concrete space and to constrain the settings of objects when used in particular relationships.

For example within an abstract object definition (A) we may want to identify that implementations of this abstract definition should contain one instance of another abstract object definition (B). Assuming that at least one appropriate containment relationship already exists, to do this we would use a relationship constraint within A that looked as follows:

```
<RelationshipConstraint name="AContainsB"
    relationship="ContainmentDefinition"
    myRole="parent"
    targetType="B"
    minOccurs="1"
    maxOccurs="1"/>
```

The constraint identifies that there should exist a containment relationship in which the implementation of A plays the role of parent and the type at the other end of the relationship (the member) is of type B. If we want more control over the configuration of B we can add a constraint on the settings of type B as follows:

```
<RelationshipConstraint Name="AContainsB"
RelationshipDefinition="containementRelationship"
            TargetRole="Member"
            TargetObjectDefinition="B" MinOccurs="1"
MaxOccurs="1">
        <Constraint Definition="simpleValueConstraint"
        Name="BValueConstraint">
            <SettingValuePath="operator">=</SettingValue>
            <SettingValuePath="RHS">myPort</SettingValue>
            <Input Path="member.Name" Name="LHS"/>
        </Constraint>
    </RelationshipConstraint>
```

In this case, we added a constraint that required the name of the member to equal the string "myPort".

We can also add constraints to relationships; we call these object constraints. From within a relationship we constrain the objects that participate in the relationship. For each role in the relationship, we can identify a object definition and then we can add setting constraints to those object definitions. From the relationship perspective the cardinality is always minOccurs=1 and maxOccurs=1 so this does not appear in the constraint declaration.

```
<ObjectConstraint Name="allowedPair"
    PrimaryRole="Host"
    PrimaryObjectDefinition="IIS"
    SecondaryRole="Guest"
    SecondaryObjectDefinition="webApp"/>
```

Finally, we can nest constraints. This gives us the ability to chain constraints together; the outer constraint sets the context for the inner constraint. The following is an example of an IIS system that hosts webapp systems that it then constrains the webApp only containendpoints of a specific type.

In this case, we use a group of object constraints to specify a set of possibilities of which at least one should be true.

From the perspective of foo the following two scenarios should be equivalent. In the first foo places a nested constraint on a contained system bar, in the second, the type bar already contains the constraint.

Scenario 1:

```
< SystemDefinition name="foo">
    <RelationshipConstraint Name="containsBar"
        RelationshipDefinition="containment"
        TargetRole="Member"
        TargetObjectDefinition="bar"
        MinOccurs="1">
        <RelationshipConstraint Name="containsX"
            RelationshipDefinition="containment"
            TargetRole="Member"
            TargetObjectDefinition="X"
            MinOccurs="1"/>
    </ RelationshipConstraint >
</ SystemDefinition >
< SystemDefinition name="bar"/>
```

Scenario 2:

```
<SystemDefinition Name="foo">
    <RelationshipConstraint Name="containsBar"
        RelationshipDefinition="containment"
        TargetRole="Member"
        TargetObjectDefinition="bar"
        MinOccurs="1"/>
</SystemDefinition>
<SystemDefinition Name="bar">
    <RelationshipConstraint Name="containsX"
        RelationshipDefinition="containment"
        TargetRole="Member"
        TargetObjectDefinition="X"
        MinOccurs="1"/>
</SystemDefinition>
```

```
<SystemDefinition Name="test">
    <RelationshipConstraint Name="WebAppHostConstraint"
                RelationshipDefinition="HostingDefinition"
                TargetRole="Guest"
                TargetObjectDefinition="webApp">
        <RelationshipConstraint Name="WebAppContainsPort1"
                    RelationshipDefinition="containmentRelationship"
                    TargetRole="Member"
                    TargetObjectDefinition="EndpointDefinition"
                    MinOccurs="1"
                    MaxOccurs="unbounded">
            <ObjectConstraintGroup>
                <ObjectConstraint Name="hasWebPort" PrimaryRole="Member"
PrimaryObjectDefinition="webPort"/>
                <ObjectConstraint Name="hasSqlPort" PrimaryRole="Member"
PrimaryObjectDefinition="sqlPort"/>
            </ObjectConstraintGroup>
        </RelationshipConstraint>
    </RelationshipConstraint>
```

The nested constraints form a path that we can evaluate from the outside in. Each constraint on the path can access the settings of previous instances on the path as well as the current instance. The evaluation of nested constraints is conducted as if the constraint had been defined within the identified system.

3.7.3.1 Constraint Model

There are two parts to the constraint model: guards and predicates. We use guards to define the context in which we execute the predicate. For example within a relationship, we use guards to identify a particular combination of types for which we want to execute a predicate. Within a object, we use guards to identify a set of relationship to other objects.

Predicates are then executed when the requirement of their guards have been met. We have two forms of predicate: setting constraints that validate setting values and group constraints that validate a set of constraints.

We can nest guards within guards, in which case the inner guard is only checked when the outer guard is satisfied. This allows us to build paths that support verification of a relationship structure.

The combination of a guard and its predicates can have a cardinality that indicates the number of times that the guard should match and the predicate evaluate to true.

More formally,

```
Guard :== ObjectConstraint(ObjectDefintion, ObjectDefintion
,required)
        { (Guard | predicate) * } |
    RelationshipConstraint(RelationshipDefinition,
        TargetObject,lBound,uBound)
        { (Guard | predicate) * }
```

A guard is defined as either a ObjectConstraint or a RelationshipConstraint. Object constraints identify two object definitions that are associated with either end of the relationships. Relationship constraints identify a relationship definition and a target object definition. An object constraint can be optional or required while a relationship constraint has a lower bound and an upper bound. This difference in cardinality reflects the fact that a relationship can only ever identify two types while a type can participate in multiple relationships.

Predicate:==settingsconstraint(rule)|group{(guard)*}

A predicate is either a settings constraint that contains a rule or a group that contains a set of guards. The predicate is evaluated in the context of the guard. In the case of a settings constraint, the predicate can identify settings from the owner of the root guard and the context identified by each nested guard. Groups are used to identify a set of guards of which at least one should match and evaluate to true.

Examples:

```
1.   RelationshipConstraint(containmentRelationship,webapp,0,1){
     }
```

This example shows a guard that evaluates to true whenever there is a containment relationship to a webapp. This guard can evaluate true at most one time. Further matches will result in the return of an error to the user.

```
2.   RelationshipConstraint(containmentRelationship,webapp,0,1)
     {
         SettingsConstraint(webapp.name=2)
     }
```

This example adds a predicate to the guard. The guard will only evaluate to true when the relationship and target definitions match and the setting constraint evaluates to true. If the relationship and target definition match and the setting constraint is not true then an error will be returned to the user. If the relationship and target type match and the setting constraint evaluates true more than once, then an error is returned to the user.

```
3.   RelationshipConstraint(containmentRelationship,webapp,0,1)
     {
         RelationshipConstraint(containmentRelationship,vdir,0,1)
     }
```

In this example, we nest a guard within a guard. When the outer guard is true (the type that contains the constraint also contains a webapp), we then evaluate the inner guard in the context of the outer guard. That means the inner relationship constraint will be evaluated in the context of a webapp instance. The inner constraint will return true if the webApp contains zero or one vdirs, if it contains more than one vdir then the constraint will return an error to the user.

```
4.   ObjectConstraint(webapp,iis,0,1)
     {
         RelationshipConstraint(containmentRelationship,systemType,0,1)
         {
             ObjectConstraint(webapp,vdir,0,1)
         }
     }
```

The context of the object constraint is the primary object definition (the first object definition). This means that the relationship constraint will be evaluated in the context of webapp. The relationship constraint defines two possible contexts, the first is the relationship, which will be the context for object constraints, and the second is the target object defintion which is the context for relationship constraints.

```
5.   RelationshipConstraint(containmentRelationship,webapp,0,1)
     {
         group
         {
             RelationshipConstraint(containmentRelationship,vdir,0,1)
             RelationshipConstraint(containmentRelationship,directory,0,1)
         }
     }
```

In this example, we use a group to contain two relationships constraints that will both be evaluated in the context of the Webapp. The group will raise an error unless at least one of the relationships fire and return true. In this case, the Webapp should contain either a Vdir or a directory.

3.7.3.2 Base Constraint

All structural constraints derive from a common base constraint called StructuralConstraint. Each structural constraint can contain both a description element and design data. The description element will be returned as error messages when a required constraint fails. Each constraint also has a name and a flag indicating whether the constraint is required or is simply a test that forms part of a larger constraint. Finally the evaluate element of a constraint can be used to indicate when the constraint should be evaluated. See section 3.7.3.7 for more information on constraint evaluation.

```
<xs:complexType name="StructuralConstraint">
    <xs:sequence>
        <xs:element name="Description" type="Description"
            minOccurs="0"/>
        <xs:element name="DesignData" type="DesignData"
            minOccurs="0"/>
    </xs:sequence>
    <xs:attribute name="Name" type="SimpleName" use="required"/>
    <xs:attribute name="Evaluate" type="ConstraintEvaluation"
        use="optional"/>
    <xs:attribute name="Required" type="xs:boolean" use="optional"/>
</xs:complexType>
```

| Attribute/element | Description |
| --- | --- |
| Name | Name of this constraint |
| DesignData | Design surface specific information about this constraint |
| Description | A textual description of the constraint. |
| Evaluation | Information about when to evaluate the constraint. Default is Design time. |
| Required | Flag indicating whether a message should be returned to the user when this constraint fails. Default is true; |

3.7.3.3 Object Constraint

An object constraint describes a constraint to one or both of the roles of relationship. The constraint has a name to aid identification of the constraint in the case that it fails. An object may contain nested relationship constraints or constraint members that will be evaluated if the roles match the instances participating in the relationship.

The constraint is evaluated as follows:

a) Does the primary role and primary definition match an object instance, and if provided, does the secondary role and secondary definition match an object instance. If these don't match, then set matches=0 and skip to c)

b) Evaluate all nested constraints in the context of the primary object instance. If these all evaluate to true, set matches=1, otherwise set matches=0.

c) If matches>MinOccurs and matches<MaxOccurs set result=true, else set result=false.

d) If required is true and result is false return a message to the user e) Return result to the parent context

```
<xs:complexType name="ObjectConstraint">
    <xs:complexContent>
        <xs:extension base="StructuralConstraint">
            <xs:choice minOccurs="0"
                maxOccurs="unbounded">
                <xs:element name="Constraint"
                    type="ConstraintMember"/>
                <xs:element name="RelationshipConstraint"
                    type="RelationshipConstraint"/>
                <xs:element name="RelationshipConstraintGroup"
                    type="RelationshipConstraintGroup"/>
            </xs:choice>
            <xs:attribute name="PrimaryRole" type="RolesList"
                use="required"/>
            <xs:attribute name="PrimaryObjectDefinition"
                type="QualifiedName" use="required"/>
            <xs:attribute name="SecondaryRole" type="RolesList"
                use="optional"/>
```

-continued

```
            <xs:attribute name="SecondaryObjectDefinition"
                type="QualifiedName" use="optional"/
            <xs:attribute name="MinOccurs" type="MinOccurs"
                use="optional"/>
            <xs:attribute name="MaxOccurs" type="MaxOccurs"
                use="optional"/>
        </xs:extension>
    </xs:complexContent>
</xs:complexType>
```

| Attribute/element | Description |
| --- | --- |
| Constraint | A list of constraint members that are nested in this constraint. |
| RelationshipConstraint | A nested relationship constraint. The relationship is evaluated as if it had been declared on the definition associated with the primary role. |
| RelationshipConstraintGroup | A nested relationship group - the relationships in the group are evaluated as if it had been declared on the definition associated with the primary role. |
| PrimaryRole | The name of a role in the relationship that this constraint targets. |
| PrimaryObjectDefinition | The name of the object definition associated with the primary role. |
| SecondaryRole | The name of the other role on the relationship that this constraint targets. (optional) |
| SecondaryObjectDefinition | The name of the object definition associated with the secondary role on the relationship. This is required if a secondary role is specified. |
| MaxOccurs | The maximum number of times this constraint can match the objects on a relationship. |
| MinOccurs | The minimum number of times this constraint can match the objects on a relationship. |
| Required | If required is true then the constraint will generate an error when it evaluates to false. Default is true. |

3.7.3.4 Object Constraint Group

An object constraint group allows sets of object constraints to be grouped together so that they can be evaluated using at-least-one semantics. The group will return a false unless at least one of the constraints in the group evaluates to true. The constraint group is evaluated as follows:

a) Evaluate each nested constraint in turn. If at least one evaluates to true then set result=true otherwise set result=false.

b) If result=false and Required=true, then raise an error c) Return result to the parent context.

```
<xs:complexType name="ObjectConstraintGroup">
    <xs:complexContent>
        <xs:extension base="Constraint">
            <xs:sequence>
                <xs:element name="ObjectConstraint"
                    type="ObjectConstraint" maxOccurs="unbounded"/>
            </xs:sequence>
        </xs:extension>
    </xs:complexContent>
</xs:complexType>
```

| Attribute/element | Description |
|---|---|
| ObjectConstraint | A list of object constraints nested within the group |

3.7.3.5 Relationship Constraint

Relationship constraints are used to constrain the relationships in which an object can participate. A relationship constraint identifies the relationship definition, optionally the object definition of the instance at the other end of the relationship and the cardinality of the relationship. The constraint is given a name so that it can be identified in error messages. The body of the relationship constraint contains nested constraints that further refine this constraint.

Relationship constraints can be used for a number of purposes: simply using the cardinality without additional predicates, they can be used to identify relationships that should be provided for an instance to operate correctly, with predicates they can be used narrow the set of configurations for instances that this object is willing to interact with.

A relationship constraint is evaluated as follows:
a) Set matches=0
b) For each relationship instance that the object instance participates in
   a. Does the relationship definition match the definition of the relationship instance, does the relationship direction match the direction identified by the target role and if provided does the target object definition match the definition of the instance at the other end of the relations. If these don't match then skip to the next relationship.
   b. Evaluate all nested constraints in the context of the relationship instance. If these all evaluate to true, set matches=matches+1
c) If matches>MinOccurs and matches<MaxOccurs set result=true, else set result=false.
d) If required is true and result is false return a message to the user
e) Return result to the parent context

```
<xs:complexType name="RelationshipConstraint">
    <xs:complexContent>
        <xs:extension base="StructuralConstraint">
            <xs:choice minOccurs="0" maxOccurs="unbounded">
                <xs:element name="Constraint"
                    type="ConstraintMember"/>
                <xs:element name="RelationshipConstraint"
                    type="RelationshipConstraint"/>
                <xs:element name="RelationshipConstraintGroup"
                    type="RelationshipConstraintGroup"/>
                <xs:element name="ObjectConstraint"
                    type="ObjectConstraint"/>
                <xs:element name="ObjectConstraintGroup"
                    type="ObjectConstraintGroup"/>
            </xs:choice>
            <xs:attribute name="RelationshipDefinition"
                type="QualifiedName" use="required"/>
            <xs:attribute name="TargetRole" type="RolesList"
                use="required"/>
            <xs:attribute name="TargetObjectDefinition"
                type="QualifiedName" use="optional"/>
            <xs:attribute name="MinOccurs" type="MinOccurs"
                use="optional"/>
            <xs:attribute name="MaxOccurs" type="MaxOccurs"
                use="optional"/>
            <xs:attribute name="DelegationAware"
                type="xs:boolean" use="optional"/>
        </xs:extension>
    </xs:complexContent>
</xs:complexType>
```

| Attribute/element | Description |
|---|---|
| Constraint | Constraints on the values of settings within the relationship or on objects at the other end of the relationship. |
| RelationshipConstraint | This element defines a relationship constraint that will be evaluated in the context of the target object instance. |
| RelationshipConstraintGroup | This element defines a relationship group that is evaluated in the context of the target object instance. |
| ObjectConstraint | This element defines an object constraint that is evaluated in the context of the matched relationship instance. |
| ObjectConstraintGroup | This element defines an object constraint group that is evaluated in the context of the matched relationship instance. |
| Name | Unique name for the constraint within the scope of the containing definition |
| RelationshipDefinition | The definition of the relationships that will be matched. |
| TargetRole | The target role is used to identify the direction of the relationship. It is the name of the role in which the instance at the other end of the relationship participates. |
| TargetObjectDefinition | Optional name of the definition of the object instance that is on the other side of the relationship |
| MaxOccurs | The maximum number of relationship instances that this constraint can match. |
| MinOccurs | The minimum number of relationship instances that this constraint can match. |
| Required | If required is true then the constraint will generate an error when it evaluates to false. Default is true. |
| DelegationAware | Indicates that the constraint is delegation aware. Default is false. See section 3.8 for more information. |

3.7.3.6 Relationship Constraint Group

A relationship constraint group allows sets of relationship constraints to be grouped together so that they can be evaluated as a predicate with at-least-one semantics. The constraint group is evaluated as follows:
d) Evaluate each nested constraint in turn. If at least one evaluates to true then set result=true otherwise set result=false.
e) If result=false and Required=true, then raise an error
f) Return result to the parent context.

```
<xs:complexType name="RelationshipConstraintGroup">
    <xs:complexContent>
        <xs:extension base="StructuralConstraint">
            <xs:sequence>
                <xs:element name="RelationshipConstraint"
                    type="RelationshipConstraint"
                    maxOccurs="unbounded"/>
            </xs:sequence>
        </xs:extension>
    </xs:complexContent>
</xs:complexType>
```

| Attribute/element | Description |
|---|---|
| RelationshipConstraint | A relationship constraint nested within the group |

3.7.3.7 Constraint Evaluation

There are three distinct times that a constraint can be evaluated: during the design process, during deployment of an application and then once an application has been deployed at any time that an operator wants to check or update the configuration of an application.

The time at which a constraint is evaluated changes the set of information that is available to the constraint. Constraints that are evaluated at design time cannot depend on values that will only be supplied during deployment or will only be available after deployment. Constraints that are evaluated at deployment time cannot depend on values that will only be available after deployment. Constraints that are evaluated after deployment can access any setting in the application.

We allow a constraint developer to mark their constraint according to when it should run. This information is used to avoid errors that will occur if we try to run a constraint when inputs are not available. The compiler can then check that a design constraint does not depend on values that it knows will not be available until deployment or validation, similarly it can check that a deployment constraint does not depend on values that it knows will not be available until after deployment. If the compiler had complete knowledge of when settings will be available, then the time at which a constraint could run could be computed, but unfortunately, this is unlikely to be the case. The time at which a value may be provided for a setting can change, for example, a directory name could be known in advance or could be created during deployment using an algorithm that generated a unique identifier.

Constraints can be marked as follows:
a) Design—indicating that it can be run at design time, deployment time or during validation,
b) Deployment—indicating that it can be run at deployment or during validation,
c) Validation—indicating that it can only be run during validation, or
d) Never—indicating that it will never be executed.

The following enumeration is used to capture these options:

```
<xs:simpleType name="ConstraintEvaluation">
    <xs:restriction base="xs:string">
        <xs:enumeration value="Design"/>
        <xs:enumeration value="Deployment"/>
        <xs:enumeration value="Validate"/>
        <xs:enumeration value="Never"/>
    </xs:restriction>
</xs:simpleType>
```

The evaluation behavior of a constraint can be set on both structural constraints and on constraint members. In both cases, it applies to all nested constraints with either the structural constraint or the constraint member.

Constraints by default are marked as design time constraints and can be executed at any time.

3.8 Delegation

Figure 19:
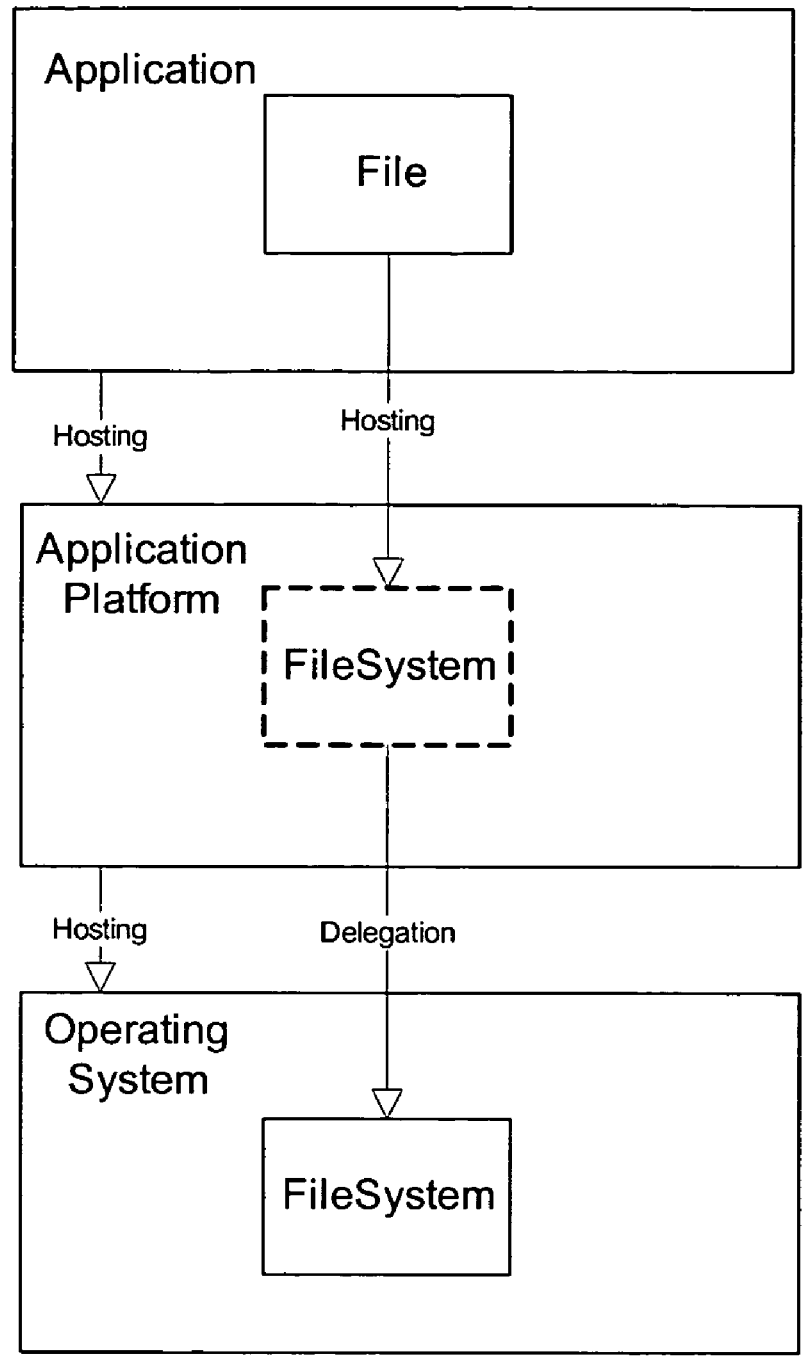
FIG. 19 illustrates an example of using delegation to expose a host's implementation to a guest.

The purpose of delegation is to allow a developer of a model to expose specific behavior from a host or from a contained component to a guest or parent. This allows the developer to design a component that reuses existing implementations and provides a more comprehensive implementation for its clients. FIG. 19 illustrates an example of using delegation to expose a host's implementation to a guest.

In FIG. 19, the Application Platform component uses a delegation relationship to expose the file system from its host, the operating system component, to its guest, the application. By doing this, the application platform can control what parts of the operating system are available to its guest without having to implement them directly.

Figure 20:
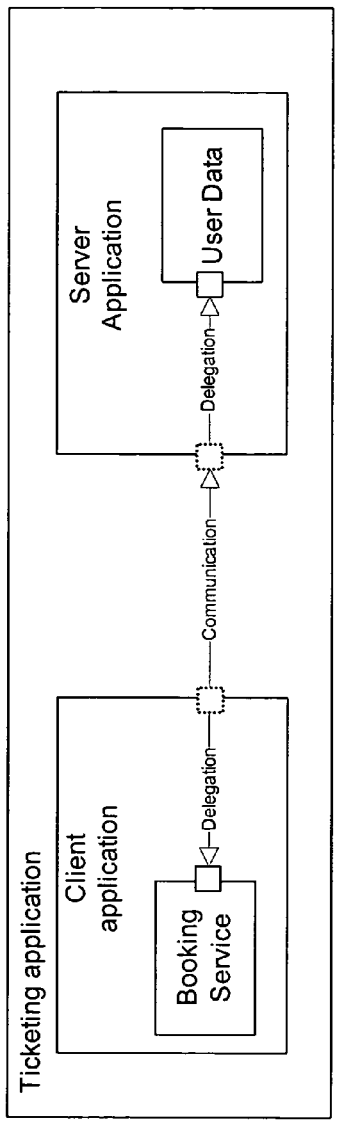
FIG. 20 illustrates an example of using delegation to expose a member's implementation to a parent.

FIG. 20 illustrates an example of using delegation to expose a member's implementation to a parent. In FIG. 20, the client application exposes the Booking service's endpoint to the ticketing application. This allows the ticketing application to then connect the endpoint to the Server application, which in turn delegates its endpoint to the UserData application.

3.8.1 Principles

The following principals guide the design of the delegation model.

The proxy does not exist in the target system. The proxy is a convenience for the model and will not have a physical manifestation. If this were not true, then the use of delegation would have side effects on the target system.

The proxy cannot change the behavior of the delegate unless the change is supported by the delegate. Since the proxy does not exist in the target system, the proxy can only change the modeled, not actual system behavior. If the delegate exposes settings that affect its behavior, then like other relationships, the delegation relationship can change those settings through flow.

From an external user's perspective, the user should not have to know whether a particular instance is a proxy or an actual implementation. If this were not true, then constraint and flow authors would have to cover both cases leading to complex and fragile code.

A user should be able to explicitly target proxies as part of a constraint expression. This is required in order to implement constraints that control the exposure of behavior through a component boundary.

3.8.2 Scenarios

The following are two scenarios that illustrate the issues associates with using delegates in a system

3.8.2.1 Communication Connectivity Validation

Figure 21:
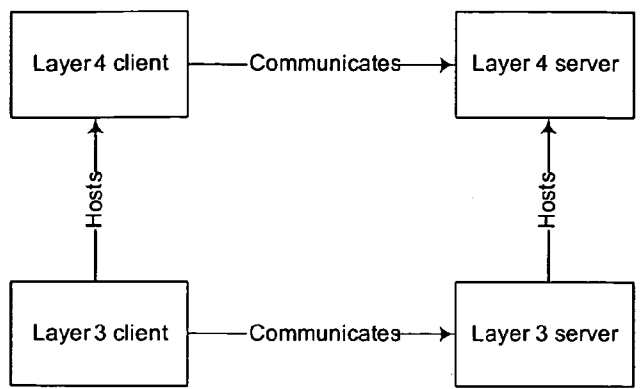

In order to validate that a client port can connect to a server port, a communication relationship contains a constraint that walks to the server, then to the server's host, then back along a communication relationship at layer 3, then up the hosting relationship to the layer 4 client and finally back to the communication relationship. This is illustrated in FIG. 21.

Figure 22:
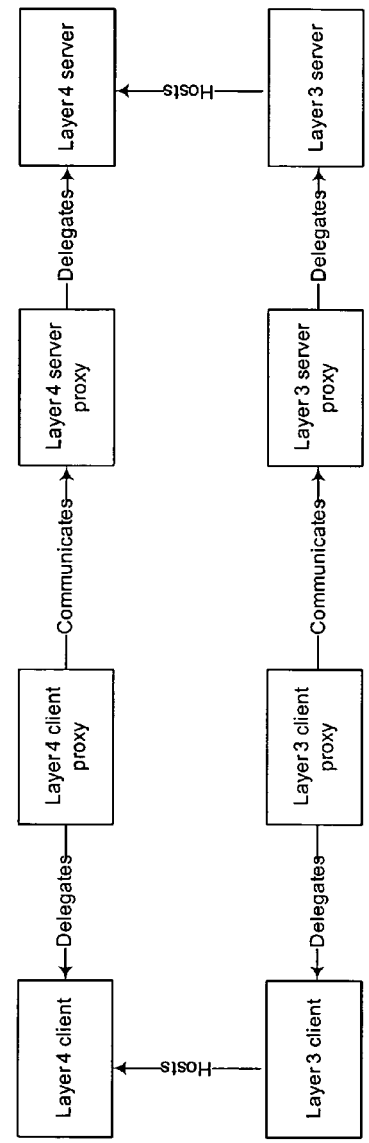
FIGS. 21 and 22 illustrate examples of communication connectivity validation.

It is likely that delegation relationships will exist between the clients and servers at both layers due to the existence of containment boundaries. An example of this is illustrated in FIG. 22. In order to write the constraint that follows this path, the user should then be able to cope with an arbitrary number of these relationships, which would complicate the description of the constraint and reduce the usability of the constraint language.

To avoid this we need the user to be able to write the constraint without knowing in advance, whether there will be proxies and how many there might be.

3.8.2.2 Zone Boundaries

Figure 23:
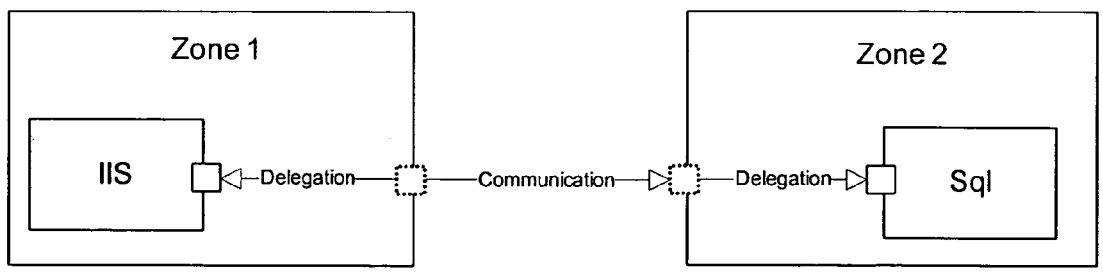
FIG. 23 illustrates an example of zone boundaries.

In datacenters, zones are often used to differentiate systems with different security requirements or behaviors. When a communication relationship crosses a zone boundary, the user may wish to place constraints on the behavior of that relationship. For example, a user may wish to only allow http communication over a certain port to the backend servers. In order to do this, the user should be able to identify the communication relationships as they cross the zone boundary: the proxy is the only way they can do this. FIG. 23 illustrates an example of zone boundaries.

In FIG. 23, if the developer may wished to constrain outgoing communication from zone1 to zone 2, then they would do they by constraining the endpoints that were delegated to the zone boundary. For example, they may write a constraint that only allows incoming http and outgoing sql communication flows. This constraint would fire for each proxy endpoint exposed by the zone.

To constrain a proxy, it should be visible to the constraint. This means that the constraint should be able to target the relationships that the proxy participates in separately from the delegate that implements the behavior. This complicates the behavior expected for the previous scenario as in some scenarios the proxy be not be transparent to the user.

3.8.3 Interaction with Other Parts of the Model

Figure 24:
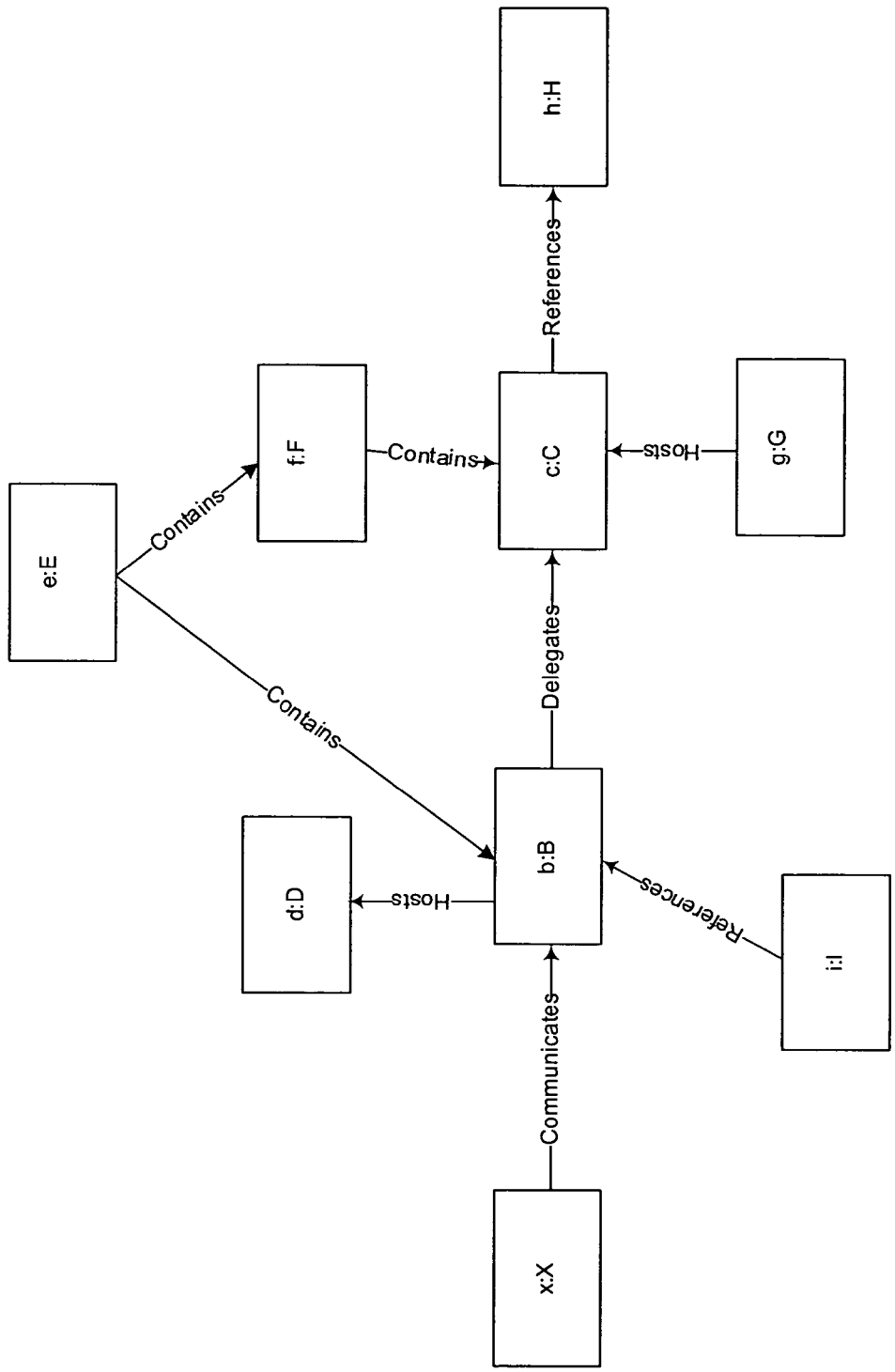
FIG. 24 illustrates an example instance space.

The rules for delegates are illustrated using an example instance space illustrated in FIG. 24.

3.8.3.1 Proxy and Delegate

The proxy should be the same or a base class of the delegate. In the example in FIG. 24, b, which acts as a proxy, should be the same or a base definition of c, the delegate. This is required because the proxy b can only expose the behavior of c. If the types were allowed to differ, then the exposed behavior of b could be different from the behavior of c but there would be no physical manifestation of b that could implement the required behavior.

In the instance space, a proxy instance can only have one delegate i.e. there can only be one delegation relationship from b where b acts as the proxy in the relationship. This constraint is required because without it, it would not be possible to return setting values or member collections from a delegate—the runtime would not know which delegate to choose as the source for the values.

3.8.3.2 Relationships Roles

A proxy can participate in the following relationship roles:

| | | | |
|---|---|---|---|
| Hosting | Host | Yes | When a hosting relationship targets a proxy, the guest is re-routed to the delegate. The outcome is as if the guest had been hosted directly on the delegate. |
| | Guest | No | This is not allowed. It would imply that either the proxy existed in the modeled system or that the delegate was deployed based on the configuration of the proxy. |
| Containment | Parent | No | The proxy cannot participate as a parent in a containment relationship. If it did, it would be changing the members of the delegate, which is not allowed. |
| | Member | Yes | The proxy exists in the containment structure of the application, so it should be able to participate as a member in a containment relationship. |
| Delegation | Proxy | Yes | A proxy should participate in a delegation relationship in order to be able to forward requests to the delegate. |
| | Delegate | Yes | A proxy can act as a delegate for another delegation relationship. This allows delegation to be chained, exposing an instance through multiple layers of containment. |
| Reference | Source | Yes | The proxy can act as a source for a reference relationship. Requests for the source are redirected to the delegate. |
| | Dependent | No | The proxy cannot act as a dependent in a reference relationship as this would imply that the delegate required the reference, thus changing the behavior of the delegate. |
| Communication | Client | Yes | Since we use delegation to expose endpoints through containers, a proxy should be able to act as a client. |
| | Server | Yes | Since we use delegation to expose endpoints through containers, a proxy should be able to act as a server. |

3.8.3.3 Member Filtering and Path Resolution

The proxy only exposes the members from the delegate that are defined as part of the proxy's definition. In the case where the proxy and delegate's definitions are the same, all the members of the delegate will be exposed by the proxy. When the proxy definition is a base definition of the delegate's definition then the proxy will only expose those members that are common to both definitions.

Given the following definitions for B and C in FIG. 24:

```
<Definition Name="B">
    <SettingDeclaration Name="height" Definition="Int"/>
</Definition>
<Definition Name="C" Extends="B">
    <SettingDeclaration Name="weight" Definition="Int"/>
</Definition>
```

Then the proxy b will only expose the height setting and not the weight setting.

When a setting value is set on a proxy, the action is forwarded through the delegation relationship to the delegate: the new setting value is recorded directly on the delegate and is visible to any other proxies that target that delegate.

When a setting value is retrieved from a proxy, the request is forwarded to the delegate and the setting value is returned directly from the delegate.

Object and relationship member filtering works the same way as setting filtering. Only the public members that are declared as part of the proxy's definition are exposed by the proxy. Changes to members immediately affect the members of the delegate and are visible to all proxies that target that delegate.

When a member path references a member on a proxy then the path is automatically resolved to the member on the delegate. This means that the path syntax does not change depending on whether a member is a proxy or a delegate.

3.8.3.4 Relationship Filtering

Each object instance participates in a set of relationships. These relationships are used to evaluate both constraints and flow and are also used to control the instantiation process. Both the proxy and the delegate participate in sets of relationships that should be combined together in order to present a coherent picture of both the proxy and the delegate to the user.

From the proxy we need to expose a subset of the delegate's relationships in combination with the proxy's relationships. If we are hiding implementation then the proxy needs to return its own containment relationships to the user and possibly only a small subset of the delegate's relationships. If we want the proxy to be completely transparent then we expose all the delegate's relationships and hide the relationships of the proxy.

From the delegate we need to expose its direct relationships in conjunction with a subset of the relationships that its proxies participate in. That is, if a proxy has a communication relationship with another endpoint then it should appear as though the delegate participates directly in this relationship. On the other hand, we do not wish to expose the proxy's containment relationship as part of the delegate. The roll up behavior for constraints is described in section 3.8.3.6.

3.8.3.4.1 Proxy Identity and Relationship Filtering

We have two types of proxy—transparent proxies and opaque proxies. A transparent proxy is used when the developer wishes to expose the implementation of the delegate to clients of the proxy and an opaque proxy is used when the developer wishes to hide the implementation of the delegate from clients of the proxy.

3.8.3.4.1.1 Transparent Proxy

A transparent proxy is used to expose the implementation of the delegate to a client. A typical example would be shown in FIG. 23, where the zones are purely for modeling purposes and should not hide the systems that they contain. In this case, a developer that is communicating with the Sql system in zone 2 should be aware that the implementation of the delegated endpoint is a Sql server rather than a zone.

A transparent proxy returns all identifying information from the delegate rather than the client. This means that the instance ID, definition, version and containment information are all sourced from the delegate rather than the proxy.

When queried, a transparent proxy will also return the set of relationships that the delegate participates in rather than those of the proxy.

3.8.3.4.1.2 Opaque Proxy

An opaque proxy is used to hide the implementation of the delegate so that the developer is free to change that implementation without breaking the client. For example in FIG. 19, the IIS system may use an opaque proxy to hide the file system implementation so that guests of IIS do not depend on the operating system that implements the file system.

An opaque proxy will return instance ID, definition and version and containment information from the proxy rather than the delegate.

When queried, an opaque proxy will only return relationships that it participates in directly not including its delegation relationship.

3.8.3.5 Flow

Flow that targets a proxy will automatically be redirected to the delegate without any need for the flow to be aware that the target is a proxy rather than the real implementation. Because proxies forward all requests for members to the instances associated with the delegate, the affects of the flow are forwarded directly to the delegate by the proxy.

Flow that is declared as part of a proxy will not be evaluated. This is because the flow will also be evaluated as part of the delegate since the delegate should be the same or a derivation of the proxy's definition. If it were evaluated, we would always have a duplicate flow error on the delegates setting values.

3.8.3.6 Constraints

Constraints can either be written to be delegation aware or not. If a constraint is delegation aware then it will be evaluated on each proxy instance without the any rollup of the relationships that the proxy participates in. Delegation relationships will be exposed to the constraint.

For example, a delegation aware communication constraint written from x targeting b in FIG. 24 would see the proxy b and the relationships that it participates with x, c, d, e and i. Then assuming it followed the delegation relationship to c, it would see the relationships from c to b, f, h and g.

If a constraint is not marked as delegation aware, then the constraint engine will automatically skip over transparent proxies when evaluating relationships that target a proxy. If the target instance of the constraint is a proxy, then the constraint engine will replace that by the delegate. The constraint will never see delegation relationships.

If the same constraint were evaluated without being delegation aware, it would not see b at all. Instead, it would only be evaluated against c. When evaluating c it would see relationships between c and x, d, f, h, g and i. Note that in this case we have rolled up all the relationships from b except for its containment relationship and we have hidden the delegation relationships.

A constraint is marked as delegation aware by setting the DelegationAware attribute to true on a structural constraint (either object or relationship constraint—see section 3.7.3).

Constraints that are declared as part of a proxy's definition will not be evaluated on the proxy. This is because the constraints will also be evaluated against the delegate since they should be common to both the proxy's and the delegate's definitions.

3.9 Manager

Managers are the mechanism by which types and relationships insert custom behavior into the runtime environment. There are several roles that a manager can support for each type that it manages: it can participate in the installation of the type, it can provide a CLR representation of the type, it can be involved in policy decisions about how bindings between types are resolved and it can provide the implementation for complex constraints and flow.

All object managers roles exposed through the CLR as entry points into strongly named classes. Object managers are packaged and versioned in the same manner as other types in the SDM; they are distributed in system distribution units and their version and strong name is derived from the SDM file in which they are declared.

```
<xs:complexType name="ManagerDeclaration">
    <xs:sequence>
        <xs:element name="Description" type="Description"
        minOccurs="0"/>
    </xs:sequence>
    <xs:attribute name="Name" type="SimpleName" use="required"/>
    <xs:attribute name="AssemblyName" type="xs:string"
```

-continued
```
        use="required"/>
    <xs:attribute name="Version" type="FourPartVersionType"
        use="optional"/>
    <xs:attribute name="PublicKeyToken" type="PublicKeyTokenType"
        use="optional"/>
    <xs:attribute name="Culture" type="CultureNeutral"
        use="optional"/>
    <xs:attribute name="Platform" type="xs:string" use="optional"/>
    <xs:attribute name="SourcePath" type="xs:string" use="optional"/>
</xs:complexType>
```

| Attribute/ element | Description |
| --- | --- |
| Name | A unique name for this manager in the scope of the containing SDM file. |
| Description | A text description of the manager |
| AssemblyName | The assembly name |
| Version | The assembly version |
| PublicKeyToken | The public key token for the assembly |
| Culture | The culture of the assembly |
| Platform | The platform of the assembly |
| SourcePath | The path to the assembly within the SDU |

3.9.1 Roles

An object manager can support one or more roles for each type that it supports. These roles include:

a) Evaluating constraints for the type or relationship
b) Evaluating flow for the type or relationship
c) Construction/destruction/update support for a type
d) Exposing an object representation for the settings on the type or relationship
e) Performing discovery for the type or relationship.
f) Supporting design surface specific UI around a type or relationship

3.9.2 Notes

Managers may have dependencies on other managers but these dependencies should be reflected in the import statemenst in the SDM files that the user manager. If these dependencies are not described, then the other managers that a particular manager depends on will not be loaded by the runtime and the manager will fail to execute.

3.10 Design Data and Descriptions

A description contains text that describes the associated SDM element. The text is in the language of the document identified by the DocumentLanguage attribute. To support localization of the text, a resource identifier can be provided. The runtime will ask either the manager identified on the description or if that is not supplied, the default manager for the document for the localized text associated with the description.

```
<xs:complexType name="Description" mixed="true">
    <xs:attribute name="ResourceId" type="xs:string" use="optional"/>
    <xs:attribute name="Manager" type="QualifiedName"
        use="optional"/>
</xs:complexType>
    A design data type contains structured data that defined by
    a design surface. Each design
    surface should use their own schema to identify and to
    structure the data.
```

-continued
```
<xs:complexType name="DesignData">
    <xs:sequence>
        <xs:any namespace="##other" processContents="lax"
            minOccurs="0" maxOccurs="unbounded"/>
    </xs:sequence>
</xs:complexType>
```

3.11 SDM Document Structures

An SDM document provides a strong identity, versioning and localization information for a set of relationships, objects and managers.

```
<xs:element name="SystemDefinitionModel">
    <xs:complexType>
        <xs:sequence>
            <xs:element name="Information" type="Information"
                minOccurs="0"/>
            <xs:element name="Import" type="Import" minOccurs="0"
                maxOccurs="unbounded"/>
            <xs:element name="DesignData" type="DesignData"
                minOccurs="0"/>
            <xs:element name="SettingDefinitions"
                type="SettingDefinitions"
                minOccurs="0"/>
            <xs:choice minOccurs="0" maxOccurs="unbounded">
                <xs:element name="CommunicationDefinition"
                    type="CommunicationDefinition"/>
                <xs:element name="ContainmentDefinition"
                    type="ContainmentDefinition"/>
                <xs:element name="DelegationDefinition"
                    type="DelegationDefinition"/>
                <xs:element name="ReferenceDefinition"
                    type="ReferenceDefinition"/>
                <xs:element name="HostingDefinition"
                    type="HostingDefinition"/>
                <xs:element name="EndpointDefinition"
                    type="EndpointDefinition"/>
                <xs:element name="ResourceDefinition"
                    type="ResourceDefinition"/>
                <xs:element name="SystemDefinition"
                    type="SystemDefinition"/>
                <xs:element name="ConstraintDefinition"
                    type="ConstraintDefinition"/>
                <xs:element name="FlowDefinition"
                    type="FlowDefinition"/>
                <xs:element name="Manager"
                    type="ManagerDeclaration"/>
            </xs:choice>
        </xs:sequence>
        <xs:attributeGroup ref="NamespaceIdentity"/>
        <xs:attribute name="DocumentLanguage" type="Culture"/>
    </xs:complexType>
</xs:element>
```

3.11.1 Information

The information section of an SDM document contains human readable information to support identification and management of SDM documents.

```
<xs:complexType name="Information">
    <xs:annotation>
        <xs:documentation>Human readable information about
        the SDM Definition
library.</xs:documentation>
    </xs:annotation>
    <xs:sequence>
        <xs:element name="FriendlyName" type="xs:string"
            minOccurs="0"/>
        <xs:element name="CompanyName" type="xs:string"
            minOccurs="0"/>
```

-continued

```
        <xs:element name="Copyright" type="xs:string"
            minOccurs="0"/>
        <xs:element name="Trademark" type="xs:string"
            minOccurs="0"/>
        <xs:element name="Description" type="Description"
            minOccurs="0"/>
        <xs:element name="Comments" type="xs:string"
            minOccurs="0"/>
    </xs:sequence>
</xs:complexType>
```

Example Computer Environment

Figure 25:
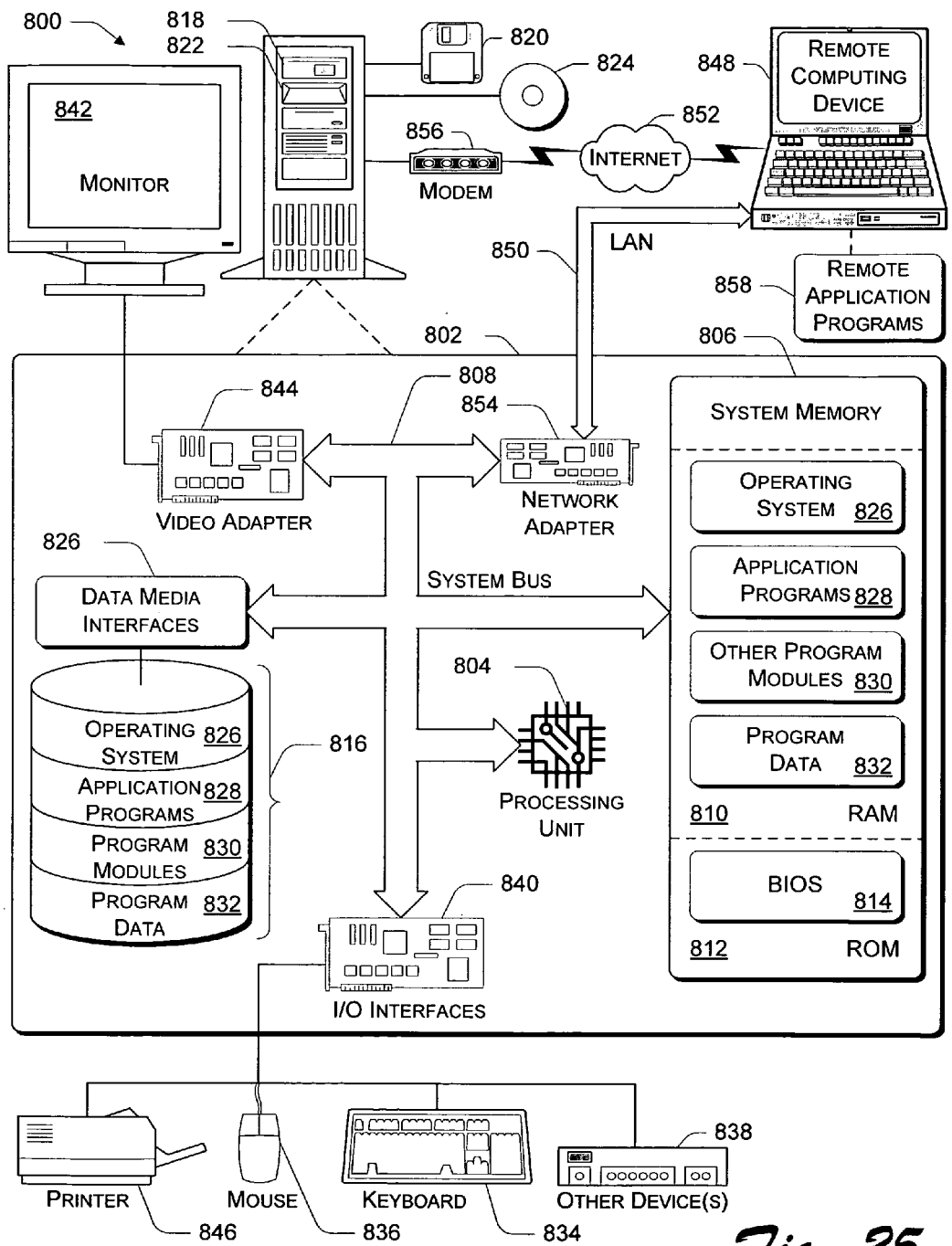
FIG. 25 illustrates an example general computer environment, which can be used to implement the techniques described herein.

FIG. 25 illustrates a general computer environment 800, which can be used to implement the techniques described herein. The computer environment 800 is only one example of a computing environment and is not intended to suggest any limitation as to the scope of use or functionality of the computer and network architectures. Neither should the computer environment 800 be interpreted as having any dependency or requirement relating to any one or combination of components illustrated in the exemplary computer environment 800.

Computer environment 800 includes a general-purpose computing device in the form of a computer 802. Computer 802 can be, for example, a computing device 102 of FIG. 1, or implement development system 202 or validation component 208 of FIG. 2. The components of computer 802 can include, but are not limited to, one or more processors or processing units 804, a system memory 806, and a system bus 808 that couples various system components including the processor 804 to the system memory 806.

The system bus 808 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 802 typically includes a variety of computer readable media. Such media can be any available media that is accessible by computer 802 and includes both volatile and non-volatile media, removable and non-removable media.

The system memory 806 includes computer readable media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is stored in ROM 812. RAM 810 typically contains data and/or program modules that are immediately accessible to and/or presently operated on by the processing unit 804.

Computer 802 may also include other removable/non-removable, volatile/non-volatile computer storage media. By way of example, FIG. 25 illustrates a hard disk drive 816 for reading from and writing to a non-removable, non-volatile magnetic media (not shown), a magnetic disk drive 818 for reading from and writing to a removable, non-volatile magnetic disk 820 (e.g., a "floppy disk"), and an optical disk drive 822 for reading from and/or writing to a removable, non-volatile optical disk 824 such as a CD-ROM, DVD-ROM, or other optical media. The hard disk drive 816, magnetic disk drive 818, and optical disk drive 822 are each connected to the system bus 808 by one or more data media interfaces 826. Alternatively, the hard disk drive 816, magnetic disk drive 818, and optical disk drive 822 can be connected to the system bus 808 by one or more interfaces (not shown).

The disk drives and their associated computer-readable media provide non-volatile storage of computer readable instructions, data structures, program modules, and other data for computer 802. Although the example illustrates a hard disk 816, a removable magnetic disk 820, and a removable optical disk 824, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 816, magnetic disk 820, optical disk 824, ROM 812, and/or RAM 810, including by way of example, an operating system 826, one or more application programs 828, other program modules 830, and program data 832. Each of such operating system 826, one or more application programs 828, other program modules 830, and program data 832 (or some combination thereof) may implement all or part of the resident components that support the distributed file system.

A user can enter commands and information into computer 802 via input devices such as a keyboard 834 and a pointing device 836 (e.g., a "mouse"). Other input devices 838 (not shown specifically) may include a microphone, joystick, game pad, satellite dish, serial port, scanner, and/or the like. These and other input devices are connected to the processing unit 804 via input/output interfaces 840 that are coupled to the system bus 808, but may be connected by other interface and bus structures, such as a parallel port, game port, or a universal serial bus (USB).

A monitor 842 or other type of display device can also be connected to the system bus 808 via an interface, such as a video adapter 844. In addition to the monitor 842, other output peripheral devices can include components such as speakers (not shown) and a printer 846 which can be connected to computer 802 via the input/output interfaces 840.

Computer 802 can operate in a networked environment using logical connections to one or more remote computers, such as a remote computing device 848. By way of example, the remote computing device 848 can be a personal computer, portable computer, a server, a router, a network computer, a peer device or other common network node, and the like. The remote computing device 848 is illustrated as a portable computer that can include many or all of the elements and features described herein relative to computer 802.

Logical connections between computer 802 and the remote computer 848 are depicted as a local area network (LAN) 850 and a general wide area network (WAN) 852. Such networking environments are commonplace in offices, enterprise-wide computer networks, intranets, and the Internet.

When implemented in a LAN networking environment, the computer 802 is connected to a local network 850 via a network interface or adapter 854. When implemented in a WAN networking environment, the computer 802 typically includes a modem 856 or other means for establishing communications over the wide network 852. The modem 856, which can be internal or external to computer 802, can be connected to the system bus 808 via the input/output interfaces 840 or other appropriate mechanisms. It is to be appreciated that the illustrated network connections are exemplary and that other means of establishing communication link(s) between the computers 802 and 848 can be employed.

In a networked environment, such as that illustrated with computing environment 800, program modules depicted relative to the computer 802, or portions thereof, may be stored in a remote memory storage device. By way of example, remote application programs 858 reside on a memory device of remote computer 848. For purposes of illustration, application programs and other executable program components such as the operating system are illustrated herein as discrete blocks, although it is recognized that such programs and components reside at various times in different storage components of the computing device 802, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternatively, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method for facilitating validation of a system being designed prior to attempting to deploy the system comprising:

receiving, by a system validation computing device configured to facilitate validation of a system being designed prior to attempting to deploy the system, a description of the system being designed to be used in an environment of a data center but not yet deployed to the data center;

receiving, by the system validation computing device, a description of an environment that simulates a target-deployment environment, wherein the target-deployment environment is the data center in which the system is to be deployed;

using, by the system validation computing device, both of the received descriptions to validate the system against the environment while the system is being designed and prior to attempting to deploy the system to the data center, wherein validating the system against the environment further comprises:

selecting a top-level definition from an application description;

generating an appropriate instance, as described by the top-level definition, for an instance space;

selecting an additional definition nested within the top-level definition;

generating an appropriate instance, as described by the additional definition, for the instance space based on whether the selected definition defines an object or a relationship; and continuing the selection of an additional definition and the generation of an appropriate instance, as described by the additional definition, until instances for all of the definitions nested within the top-level definition have been generated for the instance space.

2. A method as recited in claim 1, the description of the system comprising an SDM document.

3. A method as recited in claim 1, the description of the environment comprising a LIM document.

4. One or more computer readable media having stored thereon a plurality of instructions that, when executed by one or more processors, causes the one or more processors to perform a method comprising:

accessing an application description that describes an application in the process of being designed to be used in an environment of a data center, by a program running on the one or more processors;

validating the application, using the application description, against a simulated environment, the environment comprising a description of the data center and prior to deployment to the data center;

selecting a top-level definition from the application description;

generating an appropriate instance, as described by the top-level definition, for an instance space;

selecting an additional definition nested within the top-level definition;

generating an appropriate instance, as described by the additional definition, for the instance space based on whether the selected definition defines an object or a relationship; and continuing the selection of an additional definition and the generation of an appropriate instance, as described by the additional definition, until instances for all of the definitions nested within the top-level definition have been generated for the instance space.

5. One or more computer readable media as recited in claim 4, the plurality of instructions further causing the processor to:

receive, from a requestor, a request to validate the application; and return, to the requestor, a result of the validation.

6. One or more computer readable media as recited in claim 4, wherein the instructions that cause the one or more processors to validate the application against the simulated environment further cause the one or more processors to:

identify one or more flows in an instance space, the instance space describing the application;

for each of at least one of the one or more flows:
   identify one or more input values for the flow, the input values being obtained from other instances of the instance space; and
   generate, based at least in part on the input values, an output value for the flow.

7. One or more computer readable media as recited in claim 4, wherein the instructions that cause the one or more processors to validate the application against the simulated environment further cause the one or more processors to:
   identify one or more constraints in an instance space, the instance space describing the application;
   check whether the one or more constraints are satisfied; and
   return, for each of the one or more constraints, a value indicating whether the constraint is satisfied.

8. An apparatus for facilitating validation of a software application being designed to be used in an environment of a data center and prior to attempting to deploy the software application to one area of the data center, the apparatus comprising:
   a verifier configured to check one or more documents describing a software application for errors in order for the loader to load;
   a loader configured to load the one or more documents describing the software application, the software application being designed when the one or more documents are loaded; and
   a simulator configured to simulate an environment of a data center, the environment comprising a description of the data center, and validate the software application against the environment prior to deployment to the data center, and return a result of the validation;
   an expansion engine to identify a top-level definition from one of the one or more documents and expand the top-level definition to populate an instance space by instantiating members nested in the top-level definition, wherein the expansion engine:
      selects an additional definition nested within the top-level definition;
      generates an appropriate instance, as described by the additional definition, for the instance space based on whether the selected definition defines an object or a relationship; and
      continues the selection of an additional definition and the generation of an appropriate instance, as described by the additional definition, until instances for all of the definitions nested within the top-level definition have been generated for the instance space.

9. An apparatus as recited in claim 8, further comprising:
   a flow engine to identify flows in the instance space, identify the values of inputs to the flows, and setting an output of the flow based on the inputs to the flows.

10. An apparatus as recited in claim 9, further comprising:
   a constraint engine to identify and evaluate constraints in the instance space.

11. An apparatus for facilitating validation of a software application being designed to be used in an environment of a data center and prior to attempting to deploy the software application to one area of the data center, the apparatus comprising:
   a verifier configured to check one or more documents describing a software application for errors in order for a loader to load;
   a loader configured to load the one or more documents describing the software application;
   a simulator configured to simulate an environment of a data center, the environment comprising a description of the data center, to validate the software application against the environment prior to deployment to the data center, and to return a result of the validation;
   an expansion engine configured to identify a top-level definition from one of the one or more documents and expand the top-level definition to populate an instance space by instantiating members nested in the top-level definition, wherein the expansion engine:
      selects an additional definition nested within the top-level definition;
      generates an appropriate instance, as described by the additional definition, for the instance space based on whether the selected definition defines an object or a relationship; and
      continues the selection of an additional definition and the generation of an appropriate instance, as described by the additional definition, until instances for all of the definitions nested within the top-level definition have been generated for the instance space;
   a flow engine configured to identify flows in the instance space, to identify the values of inputs to the flows, and to set an output of the flow based on the inputs to the flows;
   a constraint engine configured to identify and evaluate constraints in the instance space;
   the apparatus being separate from the data center and the apparatus being comprised, at least in part, of a computer hardware component.

* * * * *